United States Patent
Fairweather et al.

(10) Patent No.: US 10,116,461 B2
(45) Date of Patent: Oct. 30, 2018

(54) CONTROL INFRASTRUCTURE

(71) Applicant: SYSTECH CORPORATION, San Diego, CA (US)

(72) Inventors: John Fairweather, San Diego, CA (US); Gabriel Jacobo, San Diego, CA (US); Robert Lutz, San Diego, CA (US); Jason Peressini, San Diego, CA (US); Jeff Rucker, San Diego, CA (US); La Vaughn F. Watts, Jr., San Diego, CA (US); Roger Wellington-Oguri, San Diego, CA (US); Anderson Wiese, San Diego, CA (US); Gretchen Wieshuber, San Diego, CA (US)

(73) Assignee: SYSTECH CORPORATION, San Diego, CA (US)

( * ) Notice: Subject to any disclaimer, the term of this patent is extended or adjusted under 35 U.S.C. 154(b) by 0 days.

(21) Appl. No.: 15/540,231

(22) PCT Filed: Dec. 21, 2015

(86) PCT No.: PCT/US2015/067002
§ 371 (c)(1),
(2) Date: Jun. 27, 2017

(87) PCT Pub. No.: WO2016/109277
PCT Pub. Date: Jul. 7, 2016

(65) Prior Publication Data
US 2018/0013579 A1 Jan. 11, 2018

Related U.S. Application Data

(60) Provisional application No. 62/099,367, filed on Jan. 2, 2015.

(51) Int. Cl.
*G06F 9/44* (2018.01)
*H04L 12/40* (2006.01)
(Continued)

(52) U.S. Cl.
CPC .......... *H04L 12/40032* (2013.01); *G06F 8/34* (2013.01); *G06F 8/41* (2013.01);
(Continued)

(58) Field of Classification Search
CPC ........ G06F 9/455512; G06F 8/34; G06F 8/41; G06F 8/76; H04L 12/40032; H04L 2012/4026; H04L 67/34
See application file for complete search history.

(56) References Cited

U.S. PATENT DOCUMENTS

| 7,555,506 B2 * | 6/2009 | Venkatesh | G06F 9/4493 |
| 7,707,563 B2 * | 4/2010 | Wei | G06F 8/41 717/140 |

(Continued)

FOREIGN PATENT DOCUMENTS

| EP | 1905205 B1 | 5/2014 |
| WO | 2005/117389 A1 | 12/2005 |

OTHER PUBLICATIONS

Extended European Search Report for related EP Patent Application No. 15876006.6, dated Apr. 17, 2018, in 10 pages.

(Continued)

*Primary Examiner* — Marina Lee
(74) *Attorney, Agent, or Firm* — Procopio, Cory, Hargreaves & Savitch LLP

(57) ABSTRACT

Control infrastructure. In an embodiment, the infrastructure comprises a script execution module that comprises a compiler that compiles scripts, having instructions that reference device properties, into virtual-machine programs, a virtual machine that executes virtual-machine programs, and a
(Continued)

script manager that stores scripts, retrieves scripts, and loads scripts into the compiler. In addition, the infrastructure may comprise gateway(s), communicatively connected to physical device(s). The gateway(s) may each comprise processor(s), driver(s) that each communicate with at least one physical device using a communication protocol to read and/or write device properties of the physical device, and a device manager that maps device properties referenced in the virtual-machine programs to device properties used by the driver(s).

40 Claims, 18 Drawing Sheets

(51) Int. Cl.
| | |
|---|---|
| G06F 9/455 | (2018.01) |
| G06F 8/41 | (2018.01) |
| G06F 8/34 | (2018.01) |
| G06F 8/76 | (2018.01) |
| H04L 29/08 | (2006.01) |

(52) U.S. Cl.
CPC ............ *G06F 8/76* (2013.01); *G06F 9/45512* (2013.01); *H04L 67/34* (2013.01); *H04L 2012/4026* (2013.01)

(56) References Cited

U.S. PATENT DOCUMENTS

| | | | | |
|---|---|---|---|---|
| 7,912,801 | B2* | 3/2011 | Proctor | G06N 5/022 706/46 |
| 8,423,981 | B2* | 4/2013 | Hudson, III | G06F 8/34 717/114 |
| 8,776,050 | B2* | 7/2014 | Plouffe | G06F 9/45537 718/1 |
| 9,389,890 | B2* | 7/2016 | Hamby | G06F 8/41 |
| 9,510,277 | B2* | 11/2016 | Cheng | H04L 47/10 |
| 2004/0143823 | A1* | 7/2004 | Wei | G06F 8/41 717/140 |
| 2004/0158624 | A1 | 8/2004 | Bodin et al. | |
| 2005/0120160 | A1* | 6/2005 | Plouffe | G06F 9/45537 711/1 |
| 2008/0301079 | A1* | 12/2008 | Proctor | G06N 5/022 706/47 |
| 2010/0325617 | A1* | 12/2010 | Hudson, III | G06F 8/34 717/140 |
| 2014/0098758 | A1* | 4/2014 | Cheng | H04L 47/10 370/329 |
| 2015/0046194 | A1* | 2/2015 | Waddell | G06Q 40/04 705/4 |
| 2015/0264138 | A1* | 9/2015 | Watts, Jr. | H04L 67/1095 709/203 |
| 2015/0277899 | A1* | 10/2015 | Hamby | G06F 8/41 717/120 |
| 2017/0147337 | A1* | 5/2017 | Hamby | G06F 8/73 |
| 2018/0013579 | A1* | 1/2018 | Fairweather | H04L 12/40032 |

OTHER PUBLICATIONS

Dobrev et al. "Device and Service Discovery in Home Networks with OSGi." IEEE Communications Magazine, IEEE Service Center, Piscataway, US. 40(8):86-92 (Aug. 1, 2002).

International Search Report and Written Opinion for related PCT application No. PCT/US2015/067002, dated May 25, 2016, in 18 pages.

* cited by examiner

```
Gateways
Gateways: developer
─────────────────────────────────────────────
 ⊘  ╱  New Gateways
─────────────────────────────────────────────
 ⓘ  Alpha Test ( SCRIPTS )( DEVICES )( DETAILS )( LOG ) DISCONNECTED
 ⓘ  Arugula Bistro - Springfield ( SCRIPTS )( DEVICES )( DETAILS )( LOG ) DISCONNECTED
 ⓘ  No Devices Gateway ( SCRIPTS )( DEVICES )( DETAILS )( LOG ) DISCONNECTED
 ⓘ  Warehouse ( SCRIPTS )( DEVICES )( DETAILS )( LOG ) DISCONNECTED
 ⓘ  Jason's Gateway ( SCRIPTS )( DEVICES )( DETAILS )( LOG )
 ⓘ  John's Gateway ( SCRIPTS )( DEVICES )( DETAILS )( LOG ) DISCONNECTED
 ⓘ  Arugula Bistro-Champaign ( SCRIPTS )( DEVICES )( DETAILS )( LOG ) DISCONNECTED
 ⓘ  2way GW904436 ( SCRIPTS )( DEVICES )( DETAILS )( LOG )
 ⓘ   904458   ( SCRIPTS )( DEVICES )( DETAILS )( LOG ) DISCONNECTED
 ⓘ  Alpha Test 903982 ( SCRIPTS )( DEVICES )( DETAILS )( LOG ) DISCONNECTED
( EDIT CATEGORIES )
```

FIG. 5A

```
You are editing Gateways categories.  Tap DONE EDITING to exit.

Gateways
Gateways: developer
─────────────────────────────────────────────
 +  ╱  New Gateways                                                  ⋮⋮⋮
─────────────────────────────────────────────
 +  Alpha Test ( SCRIPTS )( DEVICES )( DETAILS )( LOG ) DISCONNECTED
 +  Arugula Bistro - Springfield ( SCRIPTS )( DEVICES )( DETAILS )( LOG ) DISCONNECTED
 +  No Devices Gateway ( SCRIPTS )( DEVICES )( DETAILS )( LOG ) DISCONNECTED
 +  Warehouse ( SCRIPTS )( DEVICES )( DETAILS )( LOG ) DISCONNECTED
 +  Jason's Gateway ( SCRIPTS )( DEVICES )( DETAILS )( LOG )
 +  ╱  Second Gateway Category                                       ⋮⋮⋮
 +  John's Gateway ( SCRIPTS )( DEVICES )( DETAILS )( LOG ) DISCONNECTED
 +  Arugula Bistro-Champaign ( SCRIPTS )( DEVICES )( DETAILS )( LOG ) DISCONNECTED
The SysLINK M2M Gateway is a full-function router, including DHCP, NAT, VPN, and firewall capabilities.  With
enterprise quality remote management, network configuration options can be changed or updated via remote control.
 +  2way GW904436 ( SCRIPTS )( DEVICES )( DETAILS )( LOG )
 +  904458    ( SCRIPTS )( DEVICES )( DETAILS )( LOG ) DISCONNECTED
 +  Alpha Test 903982 ( SCRIPTS )( DEVICES )( DETAILS )( LOG ) DISCONNECTED
 >  ╱  New Category
( DONE EDITING )
```

FIG. 5B

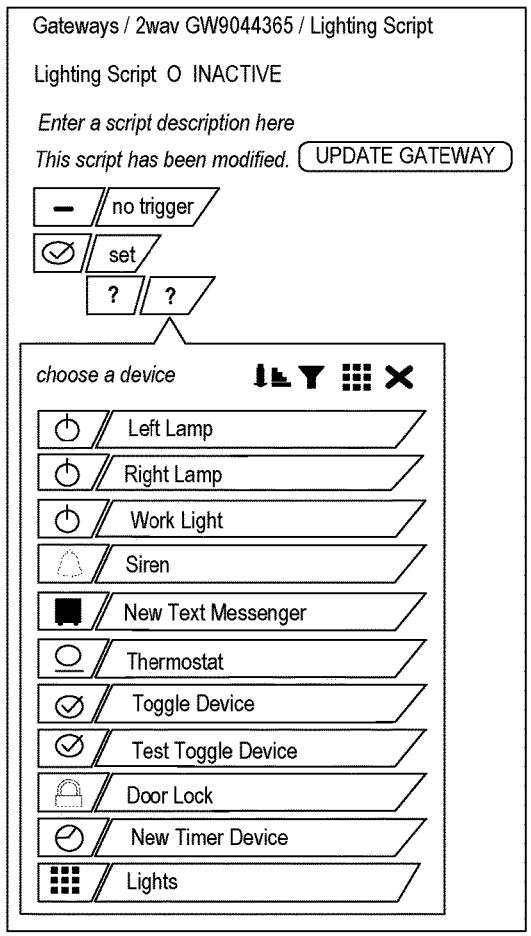
FIG. 5F
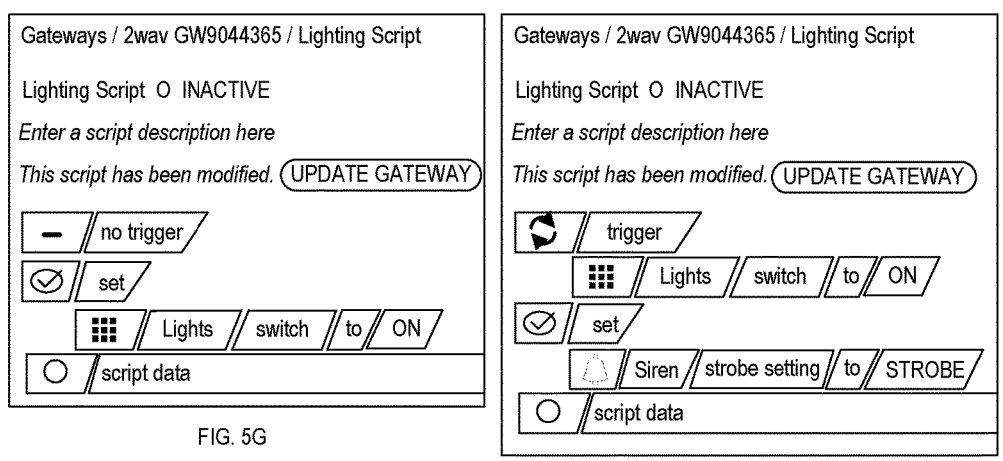
FIG. 5G
FIG. 5H

CONTROL INFRASTRUCTURE

REFERENCE TO A COMPUTER PROGRAM LISTING APPENDIX

Reference is made herein to a computer program listing appendix, which was submitted in duplicate on two, identical compact discs, and which is hereby incorporated herein by reference. Each compact disc includes the following files:
OutputForScriptingGUIShownInFIG. 6B.txt;
OutputForScriptingGUIShownInFIG. 6C.txt;
OutputForScriptingGUIShownInFIG. 6D.txt;
OutputForScriptingGUIShownInFIG. 6E.txt;
OutputForScriptingGUIShownInFIG. 6F.txt;
OutputForScriptingGUIShownInFIG. 6G.txt;
OutputForScriptingGUIShownInFIG. 6H.txt; and
OutputForScriptingGUIShownInFIG. 6I.txt.

BACKGROUND

Field of the Invention

The embodiments described herein are generally directed to various components of a control infrastructure.

Description of the Related Art

Currently, there exists a need to unify and streamline the domains of industrial control and home automation. While both domains share the same basic goal of controlling external devices, there are massive differences and complexity in the existing solutions available for each field.

For instance, in the domain of industrial control, systems are generally hand-crafted, by systems integration companies, to the complex requirements of each specific customer. Even when such integration is based on widely-available components, the configuration of those components vary from one integration to the next, thereby driving up the cost of industrial automation systems. These costs include both the initial development costs, as well as the costs for maintenance and upgrades. Thus, the domain of industrial control would benefit from a building-block architecture that is capable of interfacing with virtually any device, but which is simple enough to be constructed and configured by less sophisticated users. Such de-sophistication of industrial control could eliminate the need for the middlemen (i.e., systems integration companies) and drive down the development and maintenance costs to customers.

In the domain of home automation, price constraints are, by necessity, much tighter than in the domain of industrial control. Accordingly, only relatively simple forms of control and automation can be attempted by the average consumer. Unfortunately, there are currently a large number of incompatible and overlapping architectures available in the domain of home automation. Thus, the domain of home automation would benefit from an architecture that can handle all potential underpinnings, and which can be rapidly, inexpensively, and continuously upgraded as new technologies emerge.

In addition, there currently exists a wide diversity of silo'ed transport protocols for each vertically-oriented market solution. For residential applications, there exist X-10™, ZigBee™, Z-Wave™, and Komex™. For commercial applications, there exist BACnet™ and Lonworks™. For lighting applications, there exists DALI™. For industrial applications, there exists Modbus™, ProfileBus™, DeviceNet™, and ControlNet™. For automotive applications, there exists CAN-Bus™. For metering applications, there exists M-Bus™.

Accordingly, what is needed is a control infrastructure that can unify the various control domains with a platform-independent, protocol-independent, transport-independent, scalable, distributed, building-block architecture.

SUMMARY

Accordingly, a unifying control infrastructure is disclosed.

In an embodiment, a system is disclosed. The system may comprise a script execution module comprising a compiler that compiles scripts, represented in a base scripting language, into virtual-machine programs, wherein the scripts comprise instructions that reference device properties, a virtual machine that executes virtual-machine programs, and a script manager that stores scripts in a script registry, retrieves scripts from the script registry, and loads scripts into the compiler; and one or more gateways, wherein each of the one or more gateways is communicatively connected to one or more physical devices, and wherein each of the one or more gateways comprises at least one hardware processor, one or more drivers, wherein each of the one or more drivers communicates with at least one of the one or more physical devices using a communication protocol to read, write, or read and write device properties of the physical device, and a device manager that, when executed by the at least one hardware processor, maps device properties referenced in the virtual-machine programs to device properties used by the one or more drivers, according to a mapping. The one or more gateways may comprise a plurality of gateways. Each of the one or more gateways may further comprise the script execution module. For each of the one or more gateways, the script execution module and the device manager may be executed, by the at least one hardware processor of the gateway, as a single unified process. For each of the one or more gateways, each of the one or more drivers may be executed, by the at least one hardware processor of the gateway, in a separate process from the other ones of the one or more drivers and the single unified process. Each of the one or more gateways may further comprise a communications layer, and, for each of the one or more gateways, the script execution module and the device manager may be executed, by the at least one hardware processor of the gateways, as separate processes, and the process of the script execution module and the process of the device manager may communicate with each other via the communications layer of the gateway. The system may further comprise a platform that is communicatively connected to each of the one or more gateways via at least one network. The platform may comprise at least one hardware processor and the script execution module, each of the plurality of gateways may further comprise a communications layer, the script execution module may be executed, by the at least one hardware processor of the platform, as a first process, for each of the plurality of gateways, the device manager may be executed, by the at least one hardware processor of the gateway, as a second process, and, for each of the plurality of gateways, the first process may communicate with the second process on the gateway via the at least one network and the communications layers on the gateway. The platform may comprise a memory that stores a schema that defines the mapping used by the device manager, and each of the one or more gateways, upon initialization, may download the schema from the platform over the at least one network. The schema may define the mapping using an adapter programming language that is a subet of the base scripting language. The platform may comprise a web application that, when executed by the at least one hardware processor of the platform, generates a scripting graphical user interface (GUI) for creating scripts. The scripting GUI may comprise one or more inputs for linking graphical elements, each representing a construct of the base scripting language, into a graphical representation of a script, and the at least one hardware processor of the platform may convert the graphical representation of the script into an intermediate text-based format. The script execution module may further comprise a script converter that converts the intermediate text-based format of the script into a script conforming to the base scripting language. Each device property for each of the one or more physical devices communicatively connected to each of the one or more gateways may be associated with a value for the device property, and a status that indicates whether or not an authority has acknowledged that the value for the device property represents an actual value for the device property. The authority may be the driver that communicates with a physical device having the device property. The base scripting language may provide an assign-and-wait-while-pending operator that, when used in an instruction that assigns a value to a device property within a script that is compiled into a virtual-machine program and executed by the virtual machine, causes the virtual machine to assign the value to the device property and wait until the status associated with the device property indicates that the authority has acknowledged that the assigned value represents an actual value for the device property before proceeding to any other compiled instruction in the virtual-machine program. The base scripting language may provide a trigger construct comprising a trigger condition and a body, wherein the trigger construct, when used in a script that is compiled into a virtual-machine program and executed by the virtual machine, causes the virtual machine to execute instructions corresponding to the body whenever a transition occurs from a first state in which the trigger condition is not satisfied to a second state in which the trigger condition is satisfied. The trigger construct may further comprise a hysteresis amount by which the trigger condition must be satisfied before a transition occurs from the first state to the second state. The base scripting language may provide an every construct defining a time interval and comprising a body, wherein the every construct, when used in a script that is compiled into a virtual-machine program and executed by the virtual machine, causes the virtual machine to execute instructions corresponding to the body after each of a plurality of consecutive lapses of the defined time interval. The base scripting language may provide a pause construct defining a time period, wherein the pause construct, when used in a script that is compiled into a virtual-machine program and executed by the virtual machine, causes the virtual machine to pause for a length of the defined time period before proceeding to any other compiled instruction in the virtual-machine program. The base scripting language may provide an activation construct identifying a script, wherein the activation construct, when used in a parent script that is compiled into a parent virtual-machine program and executed by the virtual machine, causes the virtual machine to activate the identified script as a child script to the parent script. Activating the identified script as a child script may comprise executing a child virtual-machine program compiled from the child script. The base scripting language may provide a keyword that, when used with the activation construct in the parent script that is compiled into the parent virtual-machine program and executed by the virtual machine, causes the virtual machine to execute the child virtual-machine program in parallel with the parent virtual-machine program. When the keyword is not used with the activation construct in the parent script that is compiled into the parent virtual-machine program and executed by the virtual machine, the virtual machine may execute the child virtual-machine program before proceeding to any other compiled instruction in the parent virtual-machine program. The virtual machine may execute a plurality of virtual machine programs in parallel. Each of the one or more gateways may further comprise the script execution module, wherein, for each of the one or more gateways, the script manager of the gateway synchronizes its script registry over the at least one network with a mirrored script registry associated with the gateway and stored on the platform. For each of the one or more gateways, even when the gateway is unable to communicate with the platform over the at least one network, the script manager may retrieve scripts from the script registry, the compiler may compile the retrieved scripts into virtual-machine programs, and the virtual machine may execute the virtual-machine programs. Each of the one or more gateways may further comprise the script execution module, wherein the platform comprises a web application that, when executed by the at least one hardware processor of the platform, generates a graphical user interface (GUI) for selecting one or more scripts to be sent to and stored in the script registry of at least each of a subset of the one or more gateways. The GUI may comprise one or more inputs for grouping a plurality of physical devices into a device group that is represented as a virtual device, wherein the base scripting language treats references to virtual devices identically to references to physical devices. A device group may comprise one or more virtual devices. The device manager may, when performing the mapping for a device property of a virtual device that is referenced in a virtual-machine program and represents a device group, for each physical device in the device group: when the physical device does not possess a device property corresponding to the device property of the virtual device, not map the device property of the virtual device to any device property used by the one or more drivers, and, when the physical device does possess a device property corresponding to the device property of the virtual device, map the device property of the virtual device to the corresponding device property. The device manager may further comprise: a device manager abstraction layer that maps device properties referenced in the virtual-machine program to logical device properties, according to a first mapping; and a universal driver abstraction layer that maps the logical device properties to physical device properties used by the one or more physical devices, according to a second mapping. The first mapping may be defined using a first variant of the base scripting language, and the second mapping may be defined using a second variant of the base scripting language that is different than the first variant. For at least one of the one or more drivers that communicates with at least one of the one or more physical devices, the universal driver abstraction layer may store values for device properties of the at least one physical device in one or more internal registries, and the universal driver abstraction layer may update the values stored in the one or more internal registries by polling the at least one physical device using one or more callback functions that the at least one driver has registered with the universal driver abstraction layer. The at least one driver may comprise a plurality of drivers. The at least one physical device may comprise a plurality of physical devices. The device manager may comprise a user interface, wherein the user interface comprises a text-based console which is configured to receive one or more text-based commands from a user and display text-based output in response to the one or more commands. The console may be further configured to switch between a first context which provides user interaction with the device manager and a second context which provides user interaction with at least one of the one or more drivers.

In an embodiment, a method is disclosed. The method comprises using at least one hardware processor on a gateway device that is communicatively connected to one or more physical devices to: receive a script from a platform over at least one network; automatically compile the received script into a virtual-machine program; and, in response to an activation command for the script, load the virtual-machine program into a virtual machine, by the virtual machine, execute the virtual-machine program, wherein execution of the virtual-machine program comprises one or more references to device properties, in response to one or more of the references to device properties during execution of the virtual-machine program, automatically map at least one device property referenced during execution of the virtual-machine program to a device property used by at least one driver stored on the gateway device, and, by the at least one driver, communicate with at least one of the one or more physical devices using a communication protocol to read, write, or read and write an actual property, of the at least one physical device, corresponding to the device property used by the at least one driver.

In an embodiment, a non-transitory computer-readable medium is disclosed. The medium has instructions stored thereon that, when executed by a processor, cause the processor to: receive a script from a platform over at least one network; automatically compile the received script into a virtual-machine program; and, in response to an activation command for the script, load the virtual-machine program into a virtual machine, by the virtual machine, execute the virtual-machine program, wherein execution of the virtual-machine program comprises one or more references to device properties, in response to one or more of the references to device properties during execution of the virtual-machine program, automatically map at least one device property referenced during execution of the virtual-machine program to a device property used by at least one driver stored on the gateway device, and, by the at least one driver, communicate with at least one of the one or more physical devices using a communication protocol to read, write, or read and write an actual property, of the at least one physical device, corresponding to the device property used by the at least one driver.

In an embodiment, a method is disclosed. The method comprises using at least one hardware processor to: provide a scripting graphical user interface (GUI), wherein the scripting GUI comprises one or more inputs for graphically combining a plurality of visual script components, wherein each of the plurality of visual script components corresponds to a construct of a base scripting language; receive a graphical combination of a plurality of visual script components via the scripting GUI; and convert the received graphical combination of the plurality of visual script components into a script written in the base scripting language. The method may further comprise using at least one hardware processor to compile the script written in the base scripting language into a virtual-machine program to be executed by a virtual machine. One or more of the visual script components in the received graphical combination of a plurality of visual script components may correspond to a trigger construct of the base scripting language, the one or more visual script components corresponding to the trigger construct may comprise visual representations of a trigger condition and a body, and the trigger construct, when executed within the script, may cause the execution of instructions representing the body whenever a transition occurs from a first state in which the trigger condition is not satisfied to a second state in which the trigger condition is satisfied. The plurality of visual script components may comprise, for a device to be controlled by the script, a representation of a device identifier and a representation of a device property. The method may further comprise using the at least one hardware device to: populate a list of selectable device identifiers; when the representation of a device identifier is selected by a user, providing the populated list of selectable device identifiers in the scripting GUI; receiving a selection of one of the selectable device identifiers from the populated list of selectable device identifiers; and updating the representation of the device identifier to reflect the selected one of the selectable device identifiers. The method may further compusing using the at least one hardware processor to: populate a list of selectable device properties associated with the selected one of the selectable device identifier; when the representation of the device property is selected by a user, providing the populated list of selectable device properties in the scripting GUI; receiving a selection of one of the selectable device properties from the populated list of selectable device properties; and updating the representation of the device property to reflect the selected one of the selectable device properties.

In an embodiment, a method is disclosed. The method comprises using at least one hardware processor to compile a script into a virtual-machine program by: whenever an assignment construct is detected in the script that uses an assign-and-wait-while-pending operator to assign a value to a device property for a device, compiling the assignment construct into one or more instructions that assign the value to the device property and wait until a status associated with the device property indicates that a driver that communicates with the device has acknowledged that the assigned value represents an actual value for the device property before proceeding to any other instruction compiled from the script; whenever a trigger construct is detected in the script, compiling the trigger construct into one or more instructions that perform a body of the trigger construct whenever a transition occurs from a first state in which a condition of the trigger construct is not satisfied to a second state in which the condition of the trigger construct is satisfied; whenever an every construct is detected in the script, compiling the every construct into one or more instructions that perform a body of the every construct after each of a plurality of consecutive lapses of a time interval defined in the every construct; whenever a pause construct is detected in the script, compiling the pause construct into one or more instructions that pause for a length of a time period defined in the pause construct before proceeding to any other instruction compiled from the script; and, whenever an activation construct is detected in the script, compiling the activation construct into one or more instructions that activate a script identified in the activation construct as a child script to the script being compiled. When the activation construct is detected in the script with a predetermined keyword, the one or more instructions that are compiled from the activation construct may activate the child script to execute in parallel with the script being compiled, and, when the activation construct is detected in the script without the predetermined keyword, the one or more instructions that are compiled from the activation construct may activate the child script to execute to completion before proceeding to any other instruction compiled from the script being compiled.

In an embodiment, a method is disclosed. The method comprises using at least one hardware processor on a gateway device to: store a plurality of device properties, wherein each of the plurality of device properties represents a physical device property of at least one physical device communicatively connected to the gateway device via at least a driver that communicates with the at least one physical device, wherein each of the plurality of device properties comprises an identifier, a value, and a status of either acknowledged, pending, or unknown; execute a control script; and, whenever execution of the control script causes the value of one of the plurality of device properties to change, set the status of the one device property being changed to pending until the driver that communicates with the at least one physical device whose physical device property is represented by the one device property acknowledges that the value of the one device property matches an actual value of the physical device property represented by the one device property; and, once the driver that communicates with the physical device whose physical device property is represented by the one device property acknowledges that the value of the one device property matches an actual value of the physical device property represented by the one device property, set the status of the one device property to acknowledged. Executing a control script may comprise: instantiating a parser for parsing a base scripting language; and, by the instantiated parser, parsing instructions with the control script, and executing those instructions as the control script is parsed. Executing a control script may comprise: compiling the control script into a virtual-machine program; and by a virtual machine on the gateway device, executing the virtual-machine program.

It should be understood that any of the embodiments of methods disclosed herein may also be implemented as a system comprising at least one hardware processor configured to perform the methods and/or as instructions, stored on a non-transitory computer-readable medium, which cause a processor to perform the methods.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 5A-5H illustrate user interfaces for gateway management, according to an embodiment;

DETAILED DESCRIPTION

In an embodiment, a control infrastructure, including a scripting language, is disclosed. The control infrastructure may comprise a data architecture that unifies the various domains. The control infrastructure may also comprise one or a plurality of gateways capable of interfacing with one or a plurality of plug-in hardware modules that comprise or interface with physical, hardware devices. Each gateway may be capable of connecting to the hardware modules using any given transport and communicating with a cloud-based platform, and may be addressable through Internet Protocol (IP). In addition, each gateway may comprise a device manager which abstracts the logic necessary to convert between a standardized representation of data within the data architecture and a plurality of device-specific representations of data.

The scripting language of the control infrastructure may be a device control language that unifies and addresses the needs of all applications. A base scripting language may be paired, in a simplified form, with a user interface (graphical or text-based) for creating and editing scripts. For instance, a graphical user interface (GUI) may be provided to allow users to create scripts using a subset of the base scripting language.

While certain function names, procedure names, command names, keywords, etc. will be used herein, it should be understood that the selection of particular names and keywords is arbitrary, and therefore, that such names and keywords may be substituted with other names or keywords without departing from the scope of the present application.

After reading this description, it will become apparent to one skilled in the art how to implement various alternative embodiments for various alternative applications. Thus, even though certain embodiments will be described herein, it is understood that these embodiments are presented by way of example and illustration only, and not limitation. As such, this detailed description of various embodiments should not be construed to limit the scope or breadth of the present application as set forth in the appended claims.

1. Platform

Figure 1:
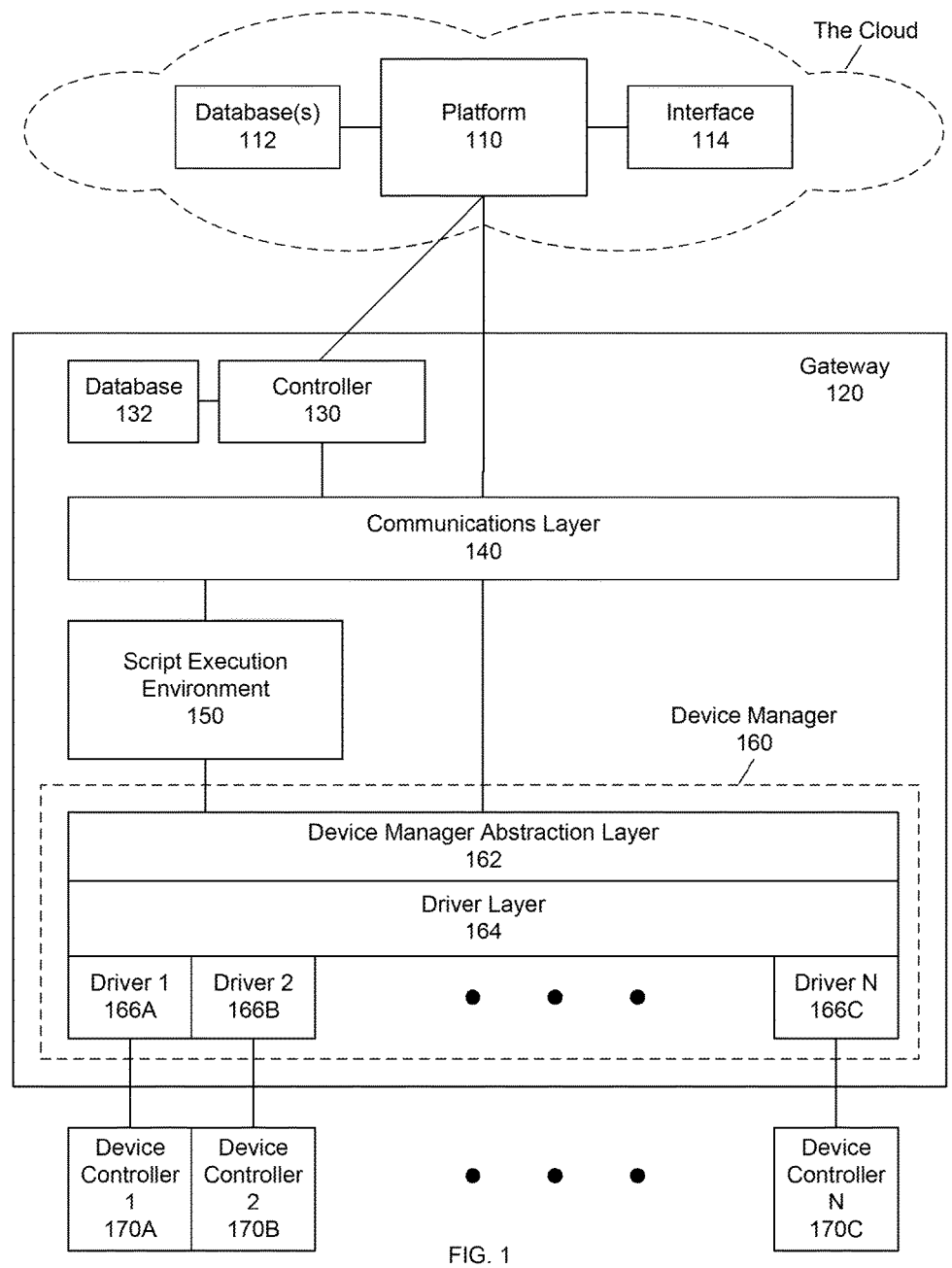
FIG. 1 illustrates a control infrastructure, according to an embodiment.

FIG. 1 illustrates an infrastructure in which the systems and processes, described herein, may operate, according to an embodiment. The infrastructure comprises a platform 110, which comprises or is interfaced with a database 112, and provides an interface 114 (e.g., a web application and/or a web server). As illustrated, platform 110 and database 112 may be implemented in "the cloud." Cloud computing is a form of Internet-based computing in which shared resources and information are provided to devices on demand. However, it should be understood that, alternatively, platform 110 and database 112 may be implemented as one or more dedicated servers.

In an embodiment, interface 114 comprises a web application that provides a graphical user interface (GUI). The GUI may comprise one or more webpages generated in HyperText Markup Language (HTML) or other language. Platform 110 transmits or serves the GUI in response to requests from a user system (not shown). In some applications, the GUI may be served in the form of a wizard, in which case two or more user interfaces (e.g., webpages) may be served in a sequential manner, and one or more of the sequential user interfaces may depend on an interaction of the user or user system with one or more preceding user interfaces. In an embodiment, the GUI may comprise a scripting GUI that enables a user to graphically construct scripts by stringing together visual representations of elements of an underlying scripting language. The GUI may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in database(s) 112 that may be locally and/or remotely accessible to platform 110. Platform 110 may also respond to other requests from user system(s).

Alternatively or additionally to the web application, interface 114 may comprise a web service. In this case, platform 110 may receive requests from user system(s), and provide responses in eXtensible Markup Language (XML) and/or any other suitable or desired format. In such embodiments, platform 110 may provide an application programming interface (API) which defines the manner in which user system(s) may interact with the web service. Thus, user system(s), which may themselves be servers, can define their own user interfaces, and rely on the web service to implement or otherwise provide the backend processes, methods, functionality, storage, etc., described herein.

It should be understood that any requests to platform 110 and the responses from platform 110, including the GUI, may both be communicated through a network, which may include the Internet, using standard communication protocols (e.g., HTTP, HTTPS).

2. Gateways

In an embodiment, the infrastructure comprises one or more gateways 120. Each gateway 120 may be selected from the family of modular gateways offered by Systech Corporation of San Diego, Calif. The SysLINK® family of products, offered by Systech Corporation, includes multiple models that provide maximum flexibility for multiple configuration options. For example, the SysLINK® 500/800/1000/15000 model line encompasses low cost, single-purpose gateways that are typically used for simple bridging applications, as well as for simple Automatic Teller Machine (ATM), point-of-sale (POS), and vending applications. The SysLINK® 2000, 3000, and 4000 model lines are full-featured general-purpose gateways, bridges, and routers that support the connection of multiple devices across multiple local or remote networks, and are typically used in multi-purpose building, home, and remote-site applications. The SysLINK® family of devices can support combinations that include multiple local network connections and multiple broadband networks for Internet connectivity. However, it should be understood that other gateways from other manufacturers may also be utilized as one or more of the gateway(s) 120.

Each gateway 120 may be configured to communicate with platform 110 over wide-range transport protocols, such as the Internet. While gateway 120 will be primarily described as communicating with platform 110 over the Internet, it should be understood that gateway 120 may be configured to communicate with platform 110 using any conventional communication protocols.

In an embodiment, gateway 120 is also able to communicate with one or more hardware device controllers 170 via one or more local-area transport protocols, such as ThingWorx™, Z-Wave™, ZigBee™, Bluetooth™, and/or the like. This ability to communicate over multiple protocols allows gateway 120 to be transport-agnostic and protocol-agnostic, and to address control systems over a wide-range of complexity.

The specific options that are available for any particular configuration of gateway(s) may be controlled by the physical presence of hardware capabilities and/or, locally or remotely, by electronic configuration which is independent of the physical presence of hardware capabilities. The SysLINK® family of gateways, which may be used as one or more of gateways 120, comprise one or more of the following:

one or more hardware upgrade slots that support cellular modules and/or other hardware options, including future hardware options;

architectures that support 2G, 3G, and 4G cellular technologies (e.g., code division multiple access (CDMA), Evolution-Data Optimized (EVDO), Long-Term Evolution (LTE), Global System for Mobile Communications (GSM), Single-Carrier Radio Transmission Technology (1×RTT), High-Speed Packet Access (SPA+)), as well as future cellular technologies;

one or more multiple Ethernet ports, including multiple Ethernet ports with multiple independent Internet Protocol (IP) addresses;

one or more plain old telephone service (POTS) ports (e.g., v.90, v.92);

one or more serial ports (e.g., with RS232, RS422, and/or RS485 physical interfaces) that may be configured as standard serial ports (e.g., for POS and/or security applications) and/or DEX and MDB ports (e.g., for vending applications);

one or more Universal Serial Bus (USB) ports;

one or more microSD slots;

support for one or more local wireless technologies including Wi-Fi™ (e.g., 802.11 a/b/g/n), ZigBee™, Z-Wave™, Bluetooth™, near-field communication (NFC), ANT, etc.;

one or more sensors (e.g., temperature sensor, motion sensor, etc.);

one or more connectors for external general-purpose input/output (GPIO), for example, using GPIO and/or USB interfaces;

one or more internal or external batteries; and/or support for local applications.

3. Data Architecture

In an embodiment, the data architecture, used by platform 110 and gateway 120 for the communication, processing, and storage of data (e.g., in databases 112 and/or 132), enables widely-distributed components to be connected through standard Internet protocol layers, such that changes in data values (e.g., which may represent hardware measurements or settings, choices made in a web-based user interface, etc.) may reliably propagate throughout the components of the infrastructure (e.g., platform 110 and/or gateway(s) 120).

In an embodiment, the data architecture is implemented by software which runs both on platform 110 and within controller 130 of gateway 120, to provide data propagation between platform 110 and gateway(s) 120. In an embodiment, the data architecture utilizes a data format based on the JavaScript Object Notation (JSON) standard. However, it should be understood that different data standards may be used as the basis of the data format discussed herein.

In an embodiment, the data architecture implements a distributed data server federation, which allows data coordination between on-premises gateways 120 and cloud-based management services on platform 110 for centralized control and configuration of the on-premises gateways 120, while allowing on-premises gateways 120 and platform 110 to operate independently of each other when communication between the distributed components is interrupted. In addition, the data architecture may improve on conventional approaches for representing the transitional data states created by the latencies of communication across distributed systems. The data architecture may allow platform 110 and gateway(s) 120 to operate independently when communication between these distributed components is interrupted.

In an embodiment, the data architecture supports one or more of the following:
- Extensible, federated, multi-server, networking environment;
- Synchronization of status property for data integrity;
- Central synchronization authority (e.g., platform 110) for each property, to which any number of client services may subscribe;
- Off-line work and subsequent re-synchronization; and/or
- API for components and/or third-party applications.

Fundamentally, the data architecture may represent a data persistence strategy and communications protocol, which allows web applications, scripting languages, hardware interfaces, and third-party applications to interact with a shared data through a common abstraction and query language (e.g., via an API). The data architecture may be adapted for implementation on small hardware devices (e.g., gateway 120) as well as large Internet servers (e.g., a web portal). The data architecture protocol may be transport-agnostic and work over common Internet communications transports (e.g., HTTP, WebSocket, Transmission Control Protocol (TCP), etc.).

As mentioned above, in an embodiment, the data format of the data architecture is JSON. However, it should be understood that formats, other than JSON, can be used without changing the essential characteristics of the data architecture. For example, this JSON data may be transformed by components into a format that is internal to that component. For example, JSON data, received by device manager 160 of each gateway 120, may be transformed into an internal format of the device manager 160. In addition, each instance of platform 110 may retain its local data in any manner suitable to its operating environment.

Figure 3:
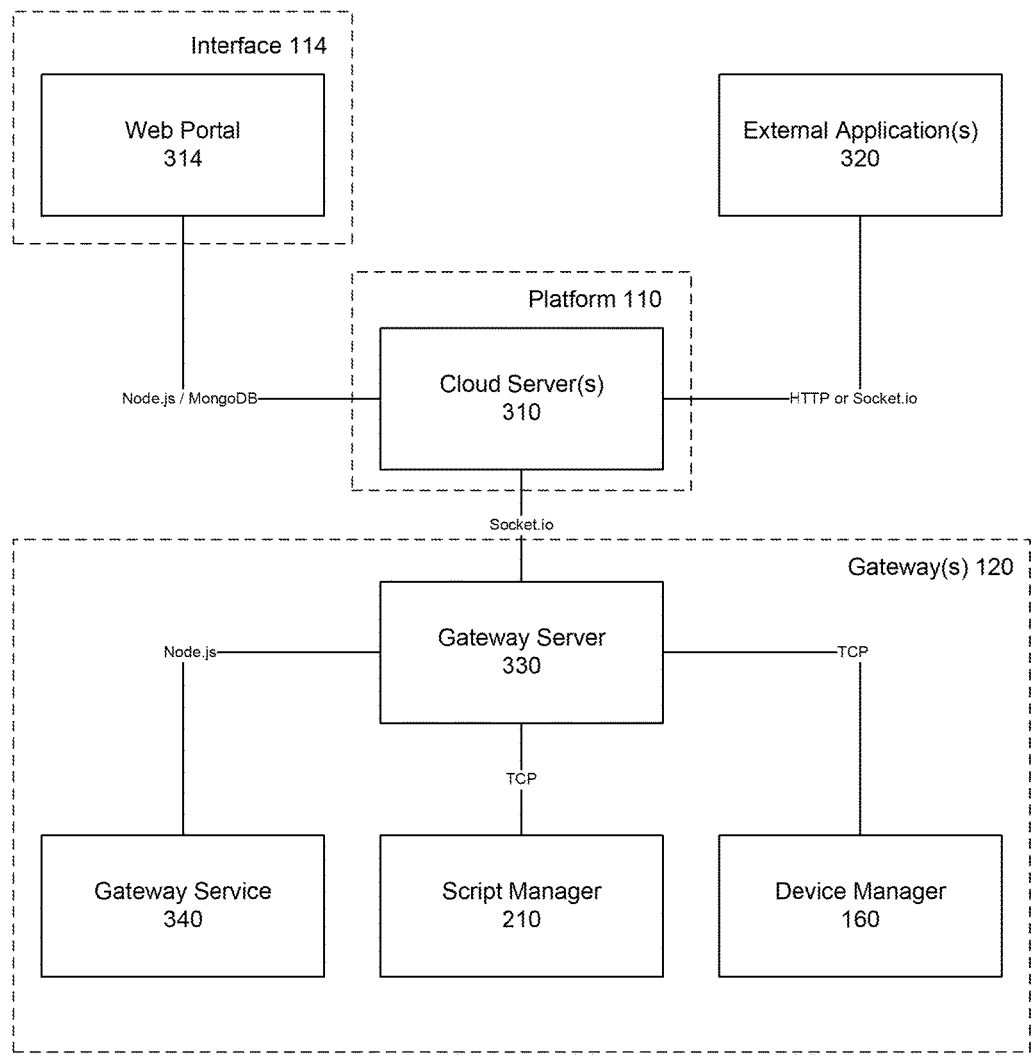
FIG. 3 illustrates an example relationship between a cloud-based platform and gateway(s), according to an embodiment.

FIG. 3 illustrates an example relationship between a cloud-based platform 110 and gateways 120, according to an embodiment. Platform 110 may comprise one or more data servers 310 which synchronize data with multiple gateway servers 330 (e.g., executing in controllers 130) of multiple gateways 120 or other clients. A client is any software module that connects to a data server 310 using an API provided by data server 310. Each of data servers 310 may present exactly the same API to each other and to external or internal clients. Web portal 314 (e.g., of interface 114) and external application 320 (e.g., ThingWorx™) may use this API to provide user interfaces for the control and configuration of the gateways 120 via data servers 310. In embodiments, gateways 120 and any other clients can interface to data servers 310 via a node.js, HTTP, Socket.io, or TCP.

In an embodiment, each gateway server 330 is a lightweight implementation of data server 310. For example, gateway server 330 may be streamlined to run in a small Linux environment executing as the operating system in controller 130 of gateway 120. Internal services on gateway 120, such as gateway service 340, script manager 210, and device manager 160, may connect directly to their local gateway server 330 via node.js, Socket.io, or localhost TCP.

In an embodiment, data servers 310 may be or comprise one or a plurality of cloud servers. A cloud server offers the same connection protocols and API, but is more scalable and may be addressed via a unique gateway identifier, just like gateway server 330. Each cloud server may be similar to gateway server 330, with the exception that, since a cloud server may serve as a communication hub for a group of gateway servers 330, certain internal behaviors within the cloud server may be different when it is connected to a gateway server 330. In an embodiment, each gateway server 330 is a client of one cloud server, whereas one cloud server may have multiple clients (although it is not necessary that a cloud server have any clients). In addition, one cloud server may be the client of another cloud server.

Gateway service 340, script manager 210, and device manager 160 are processes that, in an embodiment, are internal to each gateway 120, and may use the API of data servers 310 to integrate device control with the data architecture as described elsewhere herein.

3.1. Offline Operation

In an embodiment, platform 110 enables users to operate on scripts and device data for each gateway 120, even when the gateway 120 is not connected to platform 110 (e.g., as a result of a network failure, mechanical failure at gateway 120, etc.). This may be accomplished by maintaining a mirror of the relevant data (e.g., the scripts and drivers executing on each gateway) for each gateway 120 at platform 110. This mirrored data is synchronized with the data at the gateway 120 when a connection between platform 110 and gateway 120 is established.

In an embodiment, each gateway 120 operates independently, even when it has been disconnected from platform 110 (e.g., as a result of a network failure). This may be accomplished by maintaining all data needed for operation of the gateway 120 in a mirrored local repository (e.g., database 132 and/or script registry 214) on the gateway. When a connection between platform 110 and gateway 120 is established, the data is synchronized with the relevant data stored at platform 110 (e.g., within database(s) 112).

3.2. Data Synchronization

When platform 110 is connected with gateway 120, the mirrored data repositories of platform 110 and gateway 120 are continually synchronized. In addition, data changes made at platform 110 (e.g., via interface 114) are propagated throughout platform 110 (e.g., from one data architecture server in the federation to all other data architecture servers in the federation).

In an embodiment, clients of platform 110, such as script manager 210 and device manager 160, use the API of platform 110 to subscribe to relevant data. When subscribed to relevant data, clients are notified of any data changes that should effect an action at the client. This may result in platform 110 sending a command to a device (e.g., via device manager 160), changing a user interface (e.g., in ThingWorx), etc.

3.3. Synchronization Status

Conventional distributed control systems typically have difficulty in accurately representing the latency between the time that a user requests a change to remote data and the time that change is known to have taken effect. In an embodiment, the data architecture solves this problem using a per-property synchronization status. This mechanism may be used to drive a visual user interface, such as a GUI of interface 114.

Specifically, each device property stored at platform 110 may be represented by both a value and a status. In an embodiment, for each device property, the value and status must be set together. The value represents the value of that device property, and the status represents the synchronization state of that device property as it is currently known to platform 110. For example, in an embodiment, the status may be either "acknowledged," "pending," or "unknown."

In an embodiment, for each data element (e.g., a device property) in the data architecture federation, there is exactly one actor appointed to be the "authority" for that data element. For example, device manager 160 on gateway 120 is the authority for device properties representing the physical devices connected to that gateway 120. When an authority sets a device property value to a known value, the device property status is set to "acknowledged," indicating that the authority acknowledges this device property. When any other actor (e.g., a user interface, such as a GUI of interface 114) changes a device property value, the device property status is set to "pending," and will remain "pending" until the device property value has been successfully propagated to the authority, at which point the authority will set the device property status to "acknowledged". Generally, the authority interprets a device property with a "pending" status as a request to take an external action, after which the authority will set the device property to an appropriate value and set the status of the device property to "acknowledged". An authority may set a device property status to "unknown" when the current state of the device property cannot be determined (e.g., in the case that a physical device is defective).

4. Simplified Graphical User Interface (GUI) Scripting

In an embodiment, a scripting graphical user interface (GUI) provides simplified usage, of a base scripting language, by novice or non-technical users. The scripting GUI allows users to utilize a GUI of interface 114 to intuitively construct moderately-complex scripting behaviors, which are then automatically converted into the base scripting language, for example, for parsing or compilation within script execution environment 150. The capabilities provided by the scripting GUI may be a simplified subset of the capabilities of the base scripting language and specifically directed towards controlling behaviors on remote gateways 120 by reading and/or writing data in the data architecture for gateways 120 and/or devices. In an embodiment, interface 114 may also comprise one or more tools for managing the deployment and activation and/or deactivation of scripts on one or more gateways 120.

The scripting GUI may comprise one or more simple-scripting user interfaces that comprise inputs for connecting visual representations of script elements into a complete script, which can then be translated into an intermediate representation (referred to herein as a "GUI script") before being converted into the base scripting language. Alternatively, the visually-created script may be converted directly into the base scripting language without an intermediate representation. In addition, the user interfaces of the scripting GUI may allow users to insert script text (i.e., in the base scripting language) directly into the GUI scripts. Additionally or alternatively, the scripting GUI may comprise one or more base-scripting user interfaces that enable a user to write a script directly using the base scripting language. When used together, a user may gradually transition from using the simple-scripting user interfaces to create simple scripts to using the base-scripting user interfaces to create more complex scripts directly in the base scripting language.

In an embodiment, the scripting GUI includes one or more of the following attributes:

A multi-featured portal (e.g., implemented by interface 114), which allows authorized users to compose and manage scripts and script libraries, and install those script libraries or specific sets of one or more scripts from those script libraries on remote gateways 120;

one or more user interfaces for generating GUI scripts that control behaviors on remote gateways 120 by reading and writing device and gateway data in the data format of the data architecture;

Ability to store GUI scripts as data in the data format of the data architecture; and/or Tools for managing the deployment and activation of scripts to one or more gateways 120.

Figure 4A:
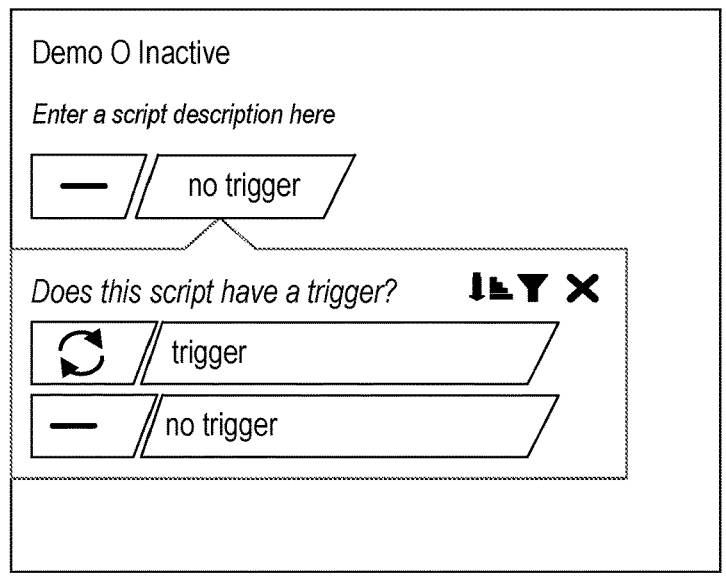
FIGS. 4A-4E illustrate user interfaces for creating a script, according to an embodiment.
Figure 4B:
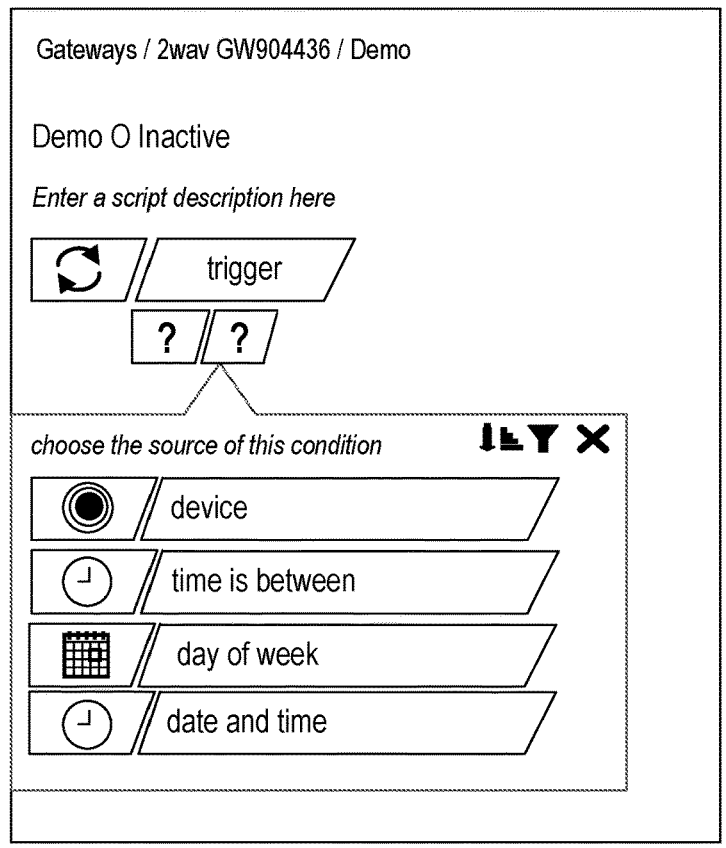
Figure 4C:
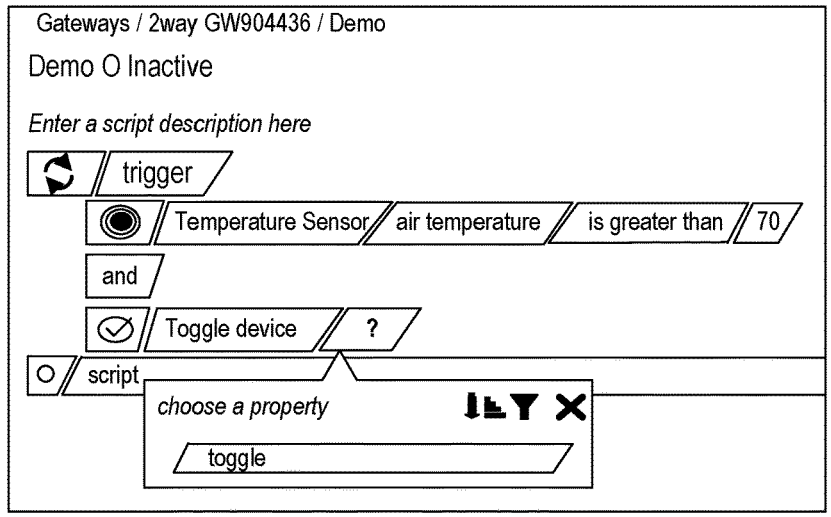
Figure 4D:
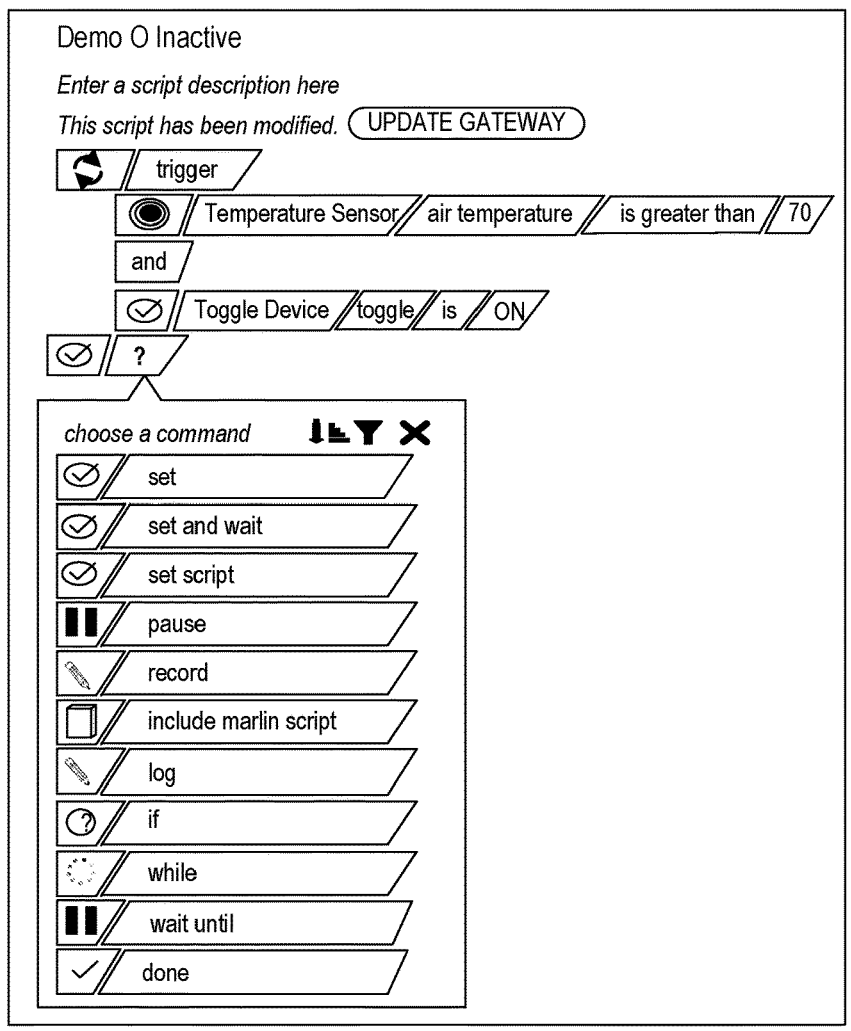
Figure 4E:
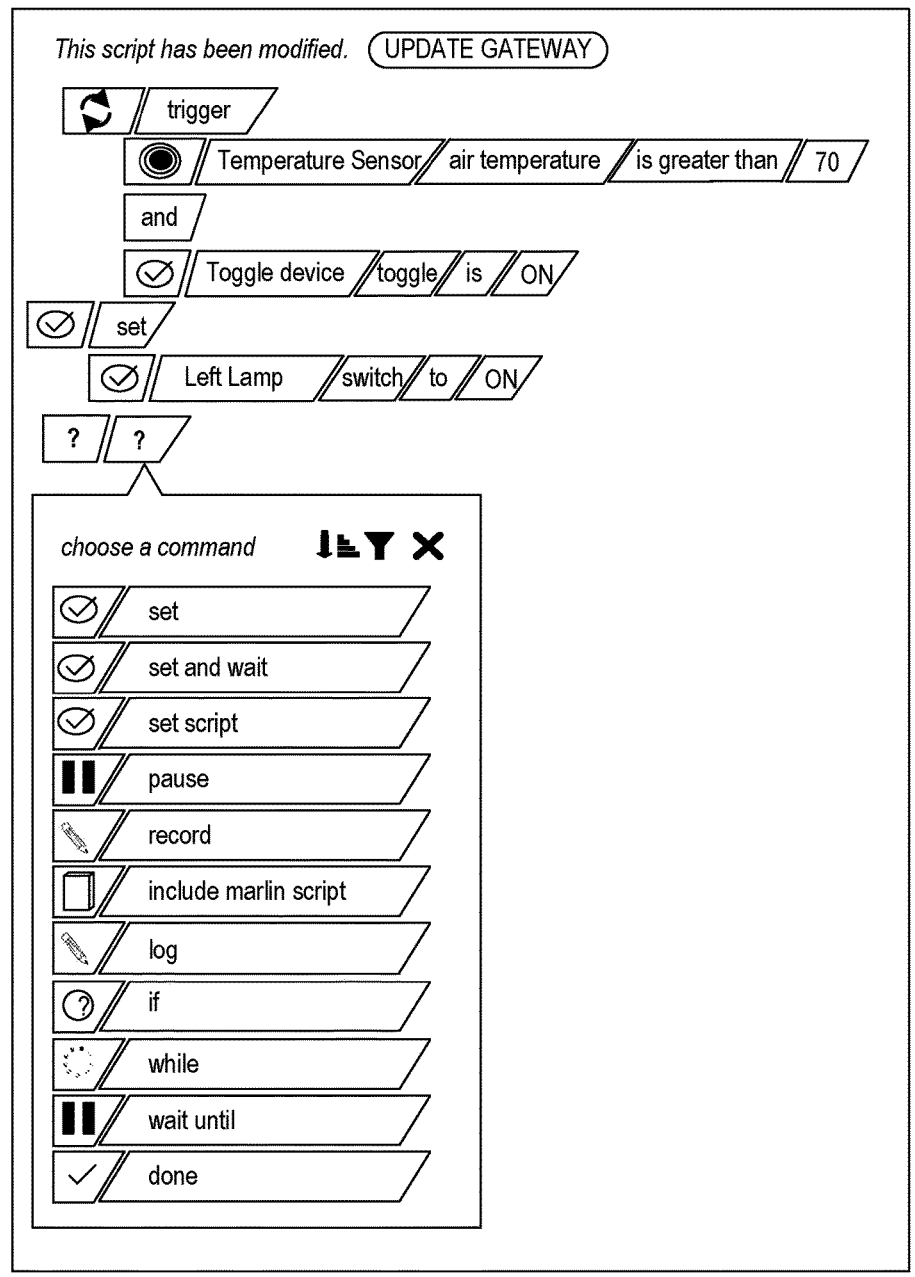

In an embodiment, the scripting GUI comprises an intuitive set of one or more simple-scripting user interfaces that walks users through the process of creating a GUI script. An example script creation process will be described with reference to FIGS. 4A-4E:

(1) As shown in FIG. 4A, a user determines whether the script will have a trigger condition, or be activated separately, either by the user or by another script;

(2) If the user specifies that the script will have a trigger condition, as shown in FIGS. 4B and 4C, the user selects one or more trigger conditions, which may include, for example, "and", "or", and "not" operators;

(3) As shown in FIGS. 4D and 4E, the user selects the action(s) that will be executed upon satisfaction of the "trigger" condition; and (4) The user saves the script, for example, to database 112 of platform 110 and/or script registry 214 of one or more gateways 120.

4.1. Updating Gateways

In an embodiment, after a user has successfully created or edited a script using the scripting GUI, the scripting GUI presents the user with an input for sending the script to one or more gateways. If the user chooses to send the GUI script to the gateway(s) (e.g., by selecting the input and/or selecting or otherwise specifying the destination gateway(s)), platform 110 sends the GUI script to the gateway(s) 120 (e.g., via the Internet). In this manner, platform 110 enables a user to make numerous edits over time and replace the script on the gateway(s) 120 only after each completion of each edit.

4.2. Activating Scripts

In an embodiment, a script that has been deployed on a gateway 120 will only executed when it is activated. A script on the gateway 120 may be activated either by an action of the user (e.g., via interface 114) or by an "activation" instruction in another script being executed (e.g., in script execution environment 150).

4.3. Creating Scripts Offline

A problem in traditional Internet-based hardware arrangements is the requirement for a constant Internet connection. This problem is compounded by the use of inconsistent cellular data connections. In the event that a hardware device loses its Internet connection, a user of a traditional arrangement would be unable to perform any updates to that hardware device, such as the addition or modification of scripts on that hardware device.

Embodiments of the synchronization feature of the data architecture described herein avoid this problem. A user may log into the GUI of interface 114 of platform 110, even when a gateway 120 managed by the user is not connected to the Internet. In this case, the GUI may inform the user that the gateway 120 is offline, either proactively (e.g., before the user attempts to update the gateway) or reactively (e.g., after the user attempts to update the gateway). All updates that are performed by the user via the GUI for the off-line gateway 120 may be stored with a status of "pending". When the previously-offline gateway 120 reconnects to the Internet and subscribes to platform 110, the reconnected gateway 120 will receive all pending updates and set the status of the updated data to "acknowledged." The "acknowledged" status will be send back to platform 110, so that it may synchronize the status of the corresponding data stored on platform 110 to "acknowledged". Thereafter, the synchronized status of the data will be reflected in the GUI of interface 114.

4.4. Managing Multiple Gateways

Figure 5C:
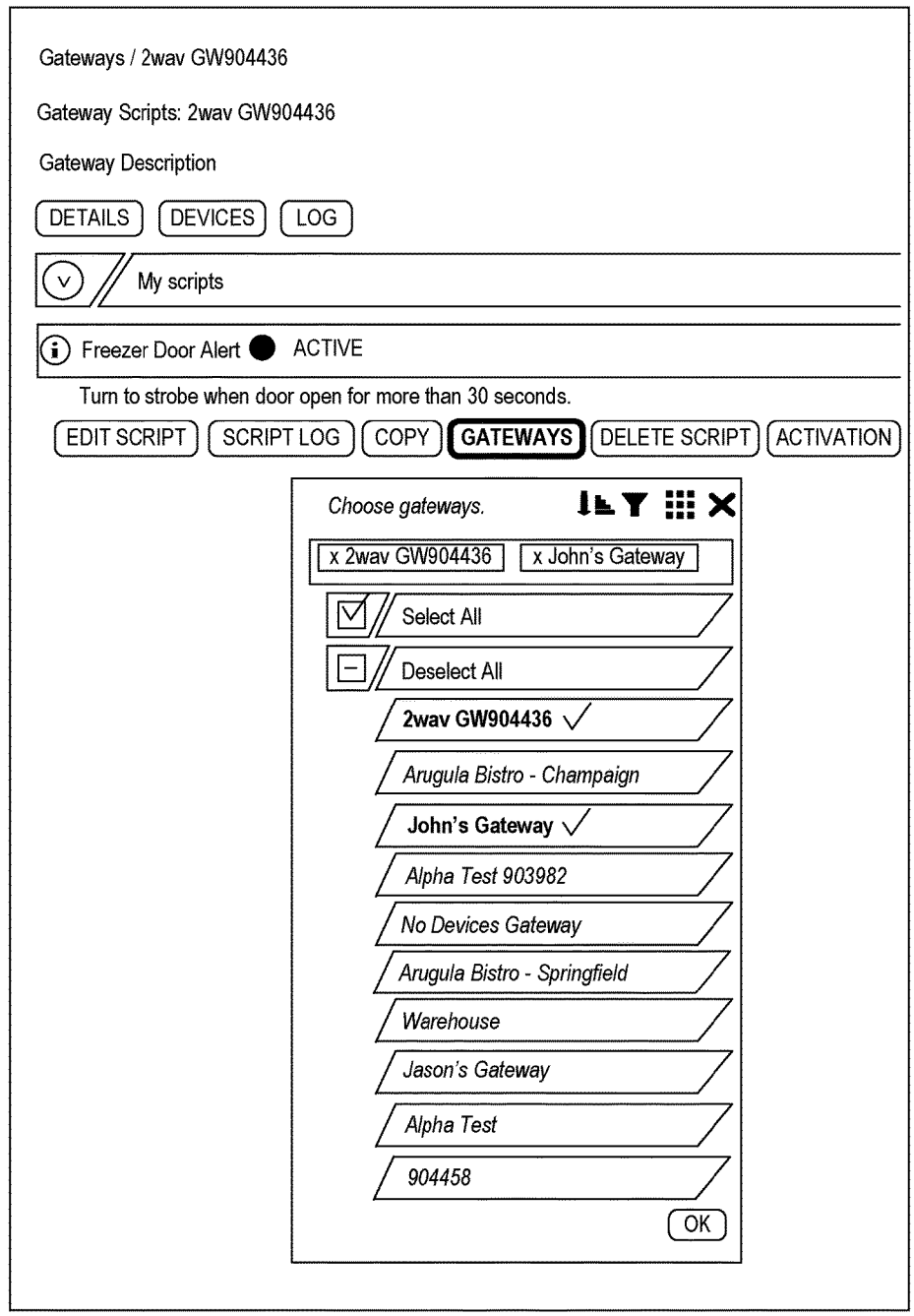

In an embodiment, platform 110 enables a many-to-many relationship between, users and gateways 120. Once gateways 120 are registered for a user (e.g., via a management GUI of interface 114), the GUI of interface 114 may present all gateways to which the user has access to the authenticated user, as illustrated in FIG. 5A according to an embodiment.

In an embodiment, the user may categorize the gateway(s) 120, to which the user has access, via the GUI of interface 114. For example, the user may create categories and move one or more representations of gateways 120 into each created category. Any categorization may apply only to the current user, allowing other users with access to the same gateway(s) 120 to categorize the same gateway(s) 120 differently. Alternatively, any categorization of gateway(s) 120 by one user may be automatically applied to the categorizations of the same gateway(s) 120 for another user. An example of a GUI providing an example categorization of gateways 120 is illustrated in FIG. 5B, according to an embodiment. Notably, the GUI illustrated in FIGS. 5A and 5B also indicates the status of each gateway (i.e., "disconnected" or "connected").

4.5. Deploying and Activating a Script on Multiple Gateways

In an embodiment, the scripting GUI is capable of building a script to function on some or all of a user's gateways without having to be created for each specific device to be controlled by the script. This enables a single user to manage hundreds of gateways within a concise user experience.

For example, the GUI of interface 114 may comprise a user interface with input(s) for selecting one or more scripts and input(s) for selecting one or more gateways. As illustrated in the example embodiment of FIG. 5C, each script is associated with a "gateways" input. When a user selects a script and the "gateways" input for that script, a representation of all of the user's gateways is displayed (e.g., in a list in a frame overlaid on a particular web page of the GUI). The user may then select one or more gateways, from that representation of all gateways, on which the selected script should be available. Once the user has selected the gateway(s) and/or confirmed the selection of the gateway(s) via the GUI, platform 110 may ensure that the selected script is installed on the selected gateway(s), and the GUI may display the number of gateways on which the script has been installed.

Figure 5D:
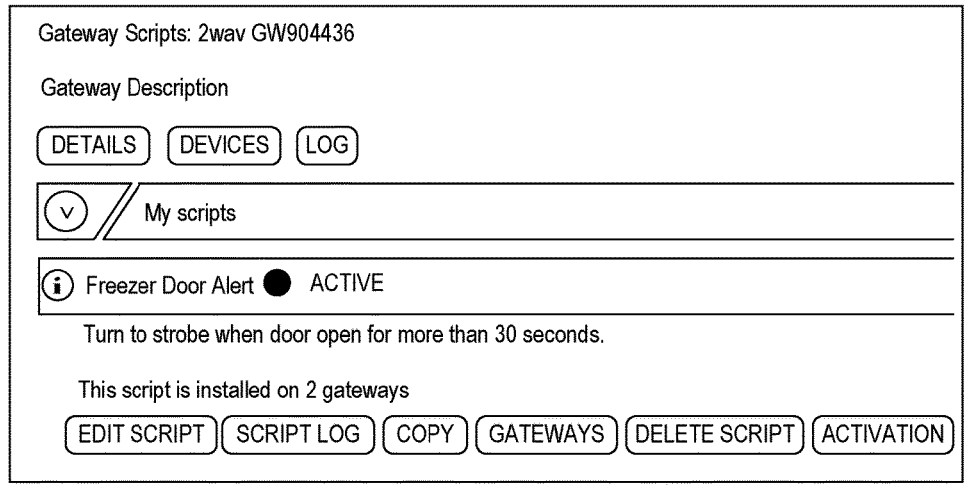
Figure 5E:
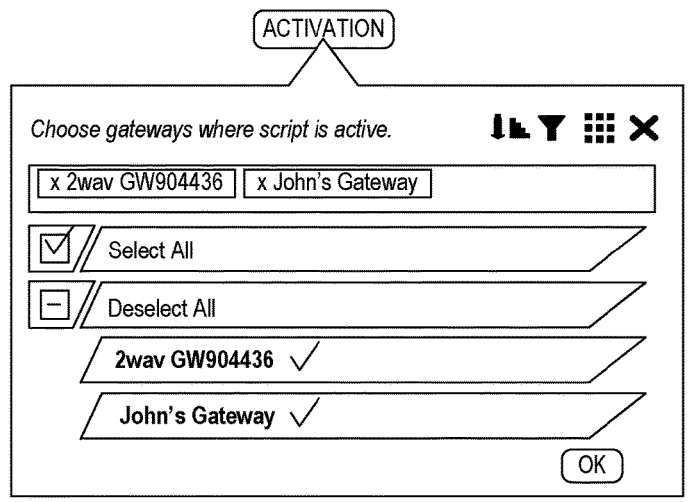

Once a script has been distributed to the selected gateway(s), the user may then activate that script on those gateway(s). As illustrated in the example embodiment of FIG. 5D, each script is associated with an "activate" input. When a user selects a script and the "activation" input for that script, a representation of all the user's gateways on which the selected script is installed is displayed (e.g., in a list in a frame overall on a particular web page of the GUI), as illustrated in an example embodiment in FIG. 5E. The user may then select one or more gateways, from that representation of all gateways, on which the selected script is installed, for which the selected script should be activated. In response, platform 110 may activate the selected script on the select gateway(s), via communication with controller 130 and/or script execution environment 150.

4.6. Identifying Similar Devices on Multiple Gateways

A difficulty with duplicating scripts across multiple gateways 120 is ensuring that those scripts are able to interface with the different set of devices on each of the multiple gateways 120. In conventional control systems, a user would have to rebuild the script on each gateway, selecting the appropriate set of devices for each of the multiple gateways. This process is not feasible for a very large number of gateways and/or devices.

In an embodiment of the data architecture, each device is identified in two ways: (1) a unique alphanumeric identifier; and (2) a name with no specificity requirements. In the event that a script references a device identifier, and script execution environment 150 (e.g., compiler 220 or VM 230) is unable to locate a device with a matching identifier connected to the gateway 120 (e.g., because that script has been copied from another gateway), script execution environment 150 automatically searches for a device of the same name, that is connected to the gateway 120, to be used instead. Thus, as long as the gateway 120 contains a device that has an identical name, the script can function properly without user intervention.

4.7. Operating on Groups of Devices

In an embodiment, the data architecture provides device grouping. Specifically, a user may create a group through the GUI of interface 114. Once a group has been created, a user may place any number of devices in the group. A particular device may be in one or multiple device groups. The scripting GUI may enable a user to create script operations on one or more of these device groups, as well as on individual devices. FIGS. 5F and 5G illustrate the selection of device groups in the scripting GUI, according to an embodiment. In the illustrated example, the scripting GUI may query the device groups and provide a selectable list of device groups along with individual devices. The user may select one of these individual devices or device groups for an operation. In FIGS. 5F and 5G, the user selects the "Lights" device group and specifies an operation of switching the "Lights" device group to "on".

A script operation on a device group acts on all of the devices in the device group, for example, relaying any changes or queries to each individual device included in the device group. In the illustrated example of FIGS. 5F and 5G, the script would switch all devices in the "Lights" device group to "on". In this manner, a single script operation may set the value of a property for all devices in a device group. In the event that particular device(s) within the device group does not have the property that is being set (e.g., setting a binary switch value to "on" for a group that contains both binary switches and non-binary devices), the operation may be ignored for those particular device(s).

Similarly, the scripting GUI may enable a user to create triggers based on a device group. For example, the scripting GUI may query the device groups and provide a selectable list of device groups along with individual devices to be used in trigger conditions. In an embodiment, if a "trigger" condition is based on a device group, the "trigger" body will be executed when any device within the device group satisfies the "trigger" condition. For example, FIG. 5H illustrates an example script which sets a siren to "strobe" when any device in a "Lights" device group is switched to "on."

Advantageously, the use of device groups simplifies the management of a large number of devices having the same function. For example, a single script could notify an administrator if any motion sensor within a device group detects motion in a facility: This is in contrast to conventional systems which would require a script to be written for each motion sensor.

5. Script Execution Environment

In an embodiment, gateway 120 provides a script execution environment 150 that supports a base scripting language for controlling gateway 120. The base scripting language and script execution environment 150 may be designed to allow for the creation of complex control systems in multiple domains by those with minimal familiarity with programming concepts. As described herein, by careful layering, abstracting, and partitioning, and by the use of new advanced language and parsing techniques, combined with pervasive use of data-driven techniques, a simple, powerful, and adaptive universal control language may be implemented.

Figure 2:
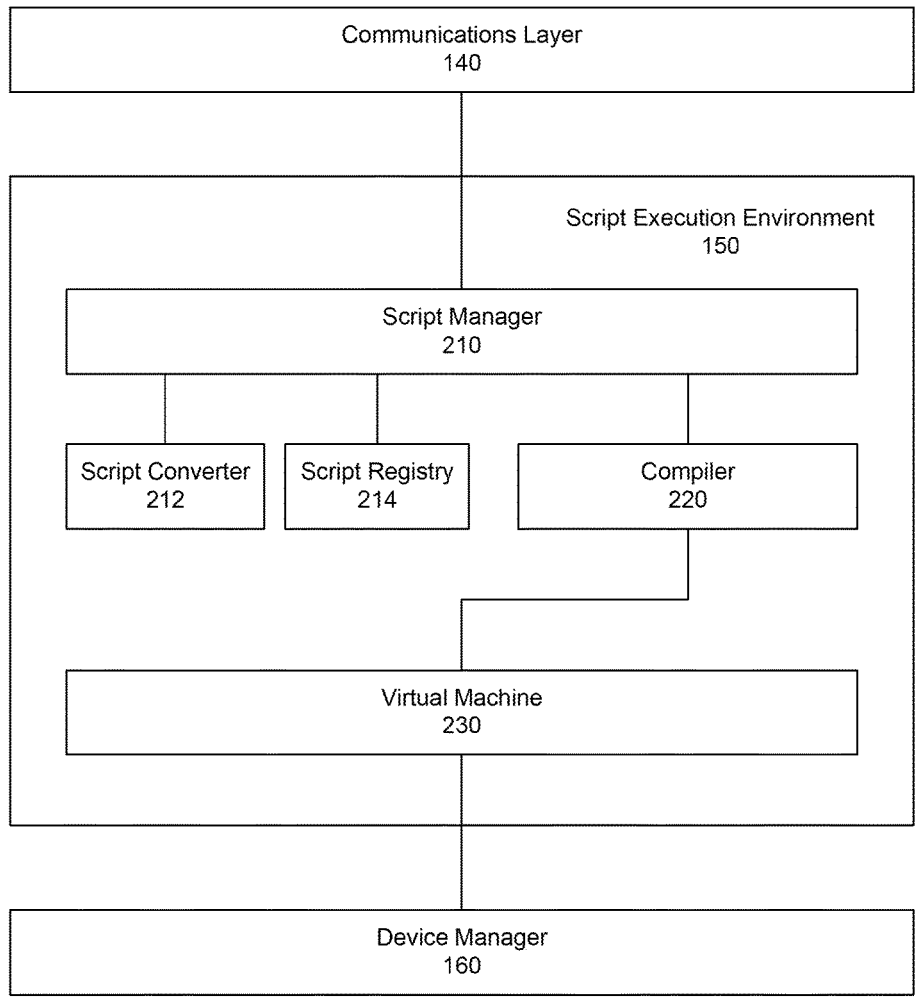
FIG. 2 illustrates a script execution environment, according to an embodiment.

FIG. 2 illustrates script execution environment 150, according to an embodiment. As illustrated, script execution environment 150 comprises a script manager 210. In an embodiment, script manager 210:

receives scripts;

provides automatic conversion of scripts from the intermediate GUI scripts (e.g., expressed in the data architecture as an output from the scripting GUI) to the base scripting language, via script converter 212;

provides simultaneous syntax checking of both the received GUI script and the converted script in the base scripting language, via script converter 212, to ensure correctness;

stores scripts in script registry 214;

retrieves scripts from script registry 214;

handles script-related commands and notifications, such as adding a script to script registry 214, deleting a script from script registry 214, activating or deactivating a script in script registry 214, and/or the like; and/or executes activated scripts even if communication with platform 110 is lost and/or power is cycled for gateway 120.

As discussed above, in an embodiment, script manager 210 comprises or has access to a local script registry 214. Local script registry 214 may store local versions of any scripts that are to be executed by gateway 120, thereby enabling autonomous operation by gateway 120. This ensures that gateway 120 may continue to operate even if communication with platform 110 is lost.

In an embodiment, the base scripting language is similar to C, syntactically and at the expression level, but is simplified (e.g., lacking declarations) and specialized for the specification of control system concepts. The base scripting language may implemented to address one or more of the following:

allow the specification of control system concepts without any limitations on programmer expressiveness, through a small and familiar language that can be learned quickly, even by novice programmers;

allow addressing and manipulation of external devices and properties directly within the syntax of the language;

provide a threading metaphor that makes it easy to create a set of independent, but intercommunicating, script threads;

eliminate the need for programmers to "declare" variables and manipulate data types (e.g., by providing a dynamic data-type model with support for just four built-in types, such as Boolean, 64-bit integer, real double, and string);

allow language extensibility to support an ever-growing library of utility functions;

have a small "footprint" in memory and processor time, while allowing thread-like execution of scripts in parallel (e.g., on an Advanced Reduced Instruction Set Computing Machine (ARM) processor), for example, by implementing a virtual machine (VM) with a completely orthogonal op-code set and simple programming metaphor to execute scripts written in the base scripting language;

enable all functionality provided by the base scripting language to be executed on multiple processors (e.g., multiple servers of platform 110) as part of a heterogeneous, interconnected network, including one or more gateways 120;

enable scripts written in the base scripting language to execute either as (i) a stand-alone process that is separate from the process for device manager 160, and/or (ii) a unified process with the device manager 160 to make direct driver calls for maximum efficiency and minimal overhead;

support extensive debugging capabilities, error logging, stack trace-back, breakpoints, etc., for developers;

rapidly adapt to changes in other infrastructure components, such as the data architecture and device manager 160, with no changes to existing scripts; and/or support a threadless version of the base scripting language using identical, but constrained, syntax, for direct use by driver layer 164 within a dynamically-created parser (i.e., not within VM 230), such that scripts written in the base scripting language are capable of being executed in both threadless (via the dynamically-created parser) and threaded (via VM 230) modes.

In an embodiment, the base scripting language also possesses one or more of the following attributes:

Easy to use, but powerful, generalized device control language;

Easy to use due to commonality with C, including support for virtually all C logical, arithmetic, and bitwise operators, with the same operator precedence as C;

Classic "if-elsif-else" and "while" statements (e.g., with "break" and "continue"), similar to C;

Built-in types, including Boolean, 64-bit integer, double, string (e.g., UTF-8 text), and/or unknown;

Arbitrarily nested expressions and function calls, similar to C;

Variable argument counts for functions;

Functions can support multiple parameter types;

Block structured, similar to C;

Line and block comments, similar to C;

Support for date, time, time of day, calendars, etc., for example, represented as a double and subject to all appropriate operators;

Data types, device properties, and device types are dynamically determined at run time, such that no declarations are required, thereby rendering the scripts simple and adaptive;

Dynamic compilation to a VM program upon activation, with no recompilation of scripts required;

Threading model that is tightly integrated with function-call metaphor and includes parameter passing (e.g., by value and/or by reference);

Devices and device properties are referenced directly using standard language tokens;

Suite of built-in library functions, that may be extended by developers;

Local and global symbol types are dynamically determined, such that they are created simply by assignment;

Scripts can activate, deactivate, launch, and unload other scripts either synchronously or asynchronously, and pass parameters/output to other scripts;

Hierarchical symbol scopes from an activating script (i.e., ancestral or parent script) to activated scripts (i.e., descendant or child scripts);

Dynamically-constructed parser, which allows rapid modification and/or extension of the language;

Trigger statement (with optional "else" statement) to respond to state transitions with optional hysteresis term;

Any symbol or property may have an unknown value, and the language logic behaves appropriately with unknown values;

A "pause" operation that provides precise delays;

A "when" construct that blocks one or more instructions in the script until a specified condition is satisfied;

An "every" construct that executes one or more instructions in the script on precise time intervals;

Built-in console and output logging;

Orthogonal set manipulations and indexing functions;

An "assign and wait while pending" operator (e.g., ":=") that addresses the classical asynchronism problems plaguing generalized programming languages;

High performance with a small memory footprint that is ideal for embedded systems;

Pushdown automaton VM assembler programming model;

Uses American National Standards Institute (ANSI) C and requires no third-party external libraries, to enhance portability;

Interpreted within a virtual machine; and/or

Hierarchical symbol scope via activating ancestral scripts, with all scripts sharing an ultimate ancestor whose scope defines a set of shared dynamic global parameters available to all executing scripts.

In addition, script execution environment 150 may possess or support one or more of the following:

Ability to convert a representation of a GUI script into the base scripting language;

Ability to insert statements in the base scripting language directly the scripting GUI;

Ability by VM 230 to execute multiple scripts (e.g., hundreds of scripts) in parallel, each in a separate simulated thread;

Compilation of scripts into a VM program for fast execution;

Ability to run on other platforms (e.g., PCs), while still controlling devices accessed over IP and connected to multiple distributed gateways 120 and platform 110;

Debugging facilities;

Hides details of the transport layer and device-specific protocols;

Ability by VM 230 to run scripts even when disconnected from platform 110;

Device resolution by name and identifier;

Hides driver-specified artifacts from the base scripting language;

Dynamic discovery of devices and device properties;

Local script registry 214 for autonomous operation;

Commonality with adapter language used in device manager 160, as well as for the physical-to-logical mapping language used within the provided universal driver abstraction, for ease of learning;

Dynamic download of new and/or revised scripts from platform 110, with automatic update of gateway 120 upon a change in the scripts;

Script status and logs accessible in the cloud via a GUI of interface 114;

Ability to reference and resolve devices by name or identifier, and arrange devices into groups, such that generic (i.e., non-device-specific) scripts can be created and run on multiple dissimilar installations (e.g., gateways 120 with different external hardware device installations), and properties can be assigned to a group of devices by simply assigning the property to a virtual device representing a device group;

Ability to create hierarchies of gateways 120 and write meta-scripts (i.e., scripts that control gateways and other scripts) mediated through virtual devices;

5.1. Base Scripting Language

In an embodiment, the base scripting language operates within a general-purpose parsing or interpreter framework which can be used to specify custom language syntax that is specific to each interface and to implement behaviors through the provision of callbacks. Technical approaches to such a framework are described, for example, in U.S. Pat. No. 7,210,130 ("the '130 patent"), titled "System and Method for Parsing Data" and issued on Apr. 24, 2007, and U.S. Pat. No. 7,328,430 ("the '430 patent"), titled "Method for Analyzing Data and Performing Lexical Analysis" and issued Feb. 5, 2008, which are both hereby incorporated herein by reference. The language syntax of the base scripting language will be described herein using the extended Backus-Naur Form (BNF) described in the '130 patent, and the described code implementation is organized using the registered "resolver" and "plugin" architecture described in the '130 patent. The lexical structure of the base scripting language will be described herein using the formalism defined in the '430 patent. While it is possible to implement the capabilities of the disclosed base scripting language using other parser-generation tools, in an embodiment, the base scripting language is built based on the libraries described in the '130 patent and the '430 patent.

5.1.1. Lexical Structure

Listing 1 below represents the lexical structure of the base scripting language according to the formalism defined in the '430 patent, according to an embodiment:

| Listing 1-Lexical Structure of Base Scripting Language | | | | | |
|---|---|---|---|---|---|
| <begin> Marlin | | | | | |
| = kNoCaseStates | | | | | |
| 64 +. | - . | * . | / . | % . | <eol> 64 .. 68 |
| &. | l. | ^ . | ( . | ) . | <eol> 69 .. 73 |
| ? . | : . | = . | != . | and | <eol> 74 .. 78 |
| not | ~ . | or | < . | <= . | <eol> 79 .. 83 |
| > . | >= . | << . | >> . | == . | <eol> 84 .. 88 |

| Listing 1-Lexical Structure of Base Scripting Language |
|---|
| ; .           , .           true      false       unknown        <eol> 89 .. 93 |
| if            else          { .       } .                        <eol> 94 .. 97 |
| // .          /*.           */ .      [ .         ] .            <eol> 98.. 102 |
| elseif        := .          while     continue    break          <eol> 103 .. 107 |
| ..                                                               <eol> 108 .. 108 |
| // NOTE: the OneCat specification from here upwards is shared by kPhysLogLanguage and |
| kAdapterLanguage |
| trigger       pause         script    concurrently every         <eol> 109 .. 113 |
| value         reference     when      activate    deactivate     <eol> 114 .. 118 |
| lock          unlock                                             <eol> 119 .. 120 |
| <next> |
| // NOTE: the Catrange specification from here on is shared by kPhysLogLanguage and kAdapterLanguage |
| 0 1 1 a z                   <eol> 1 = Identifier |
| 0 1 1 _ _                   <eol> more identifier |
| 1 1 1 0 9                   <eol> more identifier |
| 0 0 100 ' '                 <eol> ' begins character constant |
| 100 100 101 W W             <eol> a down slash begins character escape sequence |
| 101 102 102 0 7             <eol> numeric character escape sequence |
| 101 101 103 x x             <eol> hexadecimal numeric character escape sequence |
| 103 103 103 a f             <eol> more hexadecimal escape sequence |
| 103 103 103 0 9             <eol> more hexadecimal escape sequence |
| 100 100 2 ' '               <eol> ' terminates the character sequence |
| 102 103 2 ' '               <eol> obviously you can have multiple char constants |
| 100 103 100                 <eol> 2 = character constant |
| 0 0 10 0 0                  <eol> 10 = octal constant |
| 10 10 10 0 7                <eol> more octal constant |
| 0 0 3 1 9                   <eol> 3 = decimal number |
| 3 3 3 0 9                   <eol> more decimal number |
| 0 0 110 ..                  <eol> start of fp number |
| 3 3 4 ..                    <eol> 4 = floating point number |
| 10 10 4 ..                  <eol> change octal constant to fp # |
| 4 4 4 0 9                   <eol> more fp number |
| 110 110 4 ..                <eol> more fp number |
| 3 4 111 e e                 <eol> 5 = fp number with exponent |
| 10 10 111 e e               <eol> change octal constant to fp # |
| 111 111 5 0 9               <eol> more exponent |
| 111 111 112 + +             <eol> more exponent |
| 0 0 0 W W                   <eol> a continuation that does not belong to anything |
| 111 111 112 - -             <eol> more exponent |
| 112 112 5 0 9               <eol> more exponent |
| 5 5 5 0 9                   <eol> more exponent |
| 10 10 120 x x               <eol> beginning hex number |
| 120 120 7 0 9               <eol> 7 = hexadecimal number |
| 120 120 7 a f               <eol> more hexadecimal |
| 7 7 7 0 9                   <eol> more hexadecimal |
| 7 7 7 a f                   <eol> more hexadecimal |
| 0 0 130 " "                 <eol> begin string constant... |
| 0 0 140 @ @                 <eol> beginning a device property or function? |
| 140 141 141 a z             <eol> ...device name part of 'device.attOrFn' |
| 141 141 141 _ _             <eol> ... |
| 141 141 141 0 9             <eol> ... |
| 140 141 143 [ [             <eol> opt_deviceName[opt deviceID].propertyName begins |
| 143 144 145 ] ]             <eol> ... |
| 143 144 144                 <eol> stuff between [ ID string |
|                             can contain any character except ] |
| 145 145 142 ..              <eol> |
| 140 141 142 ..              <eol> start of property or function name |
| 142 142 6 a z               <eol> 6 = @deviceName.propertyName |
| 6 6 6 a z                   <eol> ... |
| 6 6 6 _ _                   <eol> ... |
| 6 6 6 0 9                   <eol> ... |
| // NOTE:token numbers 8,9,11 currently unused (only one size for an integer or a real - max precision) |
| 130 130 12 " "              <eol> 12 = string constant |
| 130 130 13 W W              <eol> 13 = string constant terminated by |
|                             line continuation 'W' |
| 13 13 131 0 7               <eol> numeric character escape sequence |
| 131 131 131 0 7             <eol> numeric character escape sequence |
| 13 13 132 x x               <eol> hexadecimal numeric character escape sequence |
| 131 132 12 " "              <eol> end of string |
| 13 13 130                   <eol> anything else must be character or escape char |
| 132 132 132 a f             <eol> more hexadecimal escape sequence |
| 132 132 132 0 9             <eol> more hexadecimal escape sequence |
| 130 132 130                 <eol> anything else is part of the string |
| <end> |

In an embodiment, in addition to the various keywords and operators between the "<begin>" and "<next>" delimiters in Listing 1, the base scripting language supports the following variable lexical tokens:

Token 1: a variable or symbolic value (e.g., counter, idx_1, a, varName, etc.);

Token 2: a single or multi-character constant with escapes (e.g., "x", "\n", "\x34", "abed");

Token 3: a decimal 64-bit integer (e.g., 1234);

Tokens 4 & 5: a floating point double with optional exponent (e.g., 1.234, 1.3e5);

Token 6: a device property (e.g., @dev.temperature, @[xxydd].contact, @.prop, etc.);

Token 7: a hexadecimal 64-bit integer (e.g., 0xFFFF, 0x34ab);

Tokens 8 & 9: unused since all integers are of the same size;

Token 10: an octal 64-bit integer constant (e.g., 03777);

Token 11: unused since all integers are of the same size; and/or

Tokens 12 & 13: a string constant with escapes (e.g., "hello world\n").

In an embodiment, the operator set supported by the base scripting language is similar to that supported within the standard C language, with the exception that the base scripting language may exclude the automatic increment/decrement forms, and the C logical operations (i.e., &&, ||, !) may be replaced by the keywords "and", "or", and "not", respectively, for ease of understanding by novice programmers.

In an embodiment, the base scripting language does not allow types to be defined, other than built-in types, which may correspond closely to the lexical tokens. The built-in types may comprise:

Boolean: a Boolean value (e.g., held as a 64-bit integer) which may take the value of "true" or "false".

Integer: a 64-bit integer value (although different-sized integer values may be used);

Real: a double precision floating point value (e.g., equivalent to a double in C);

String: an arbitrary-length string value (e.g., "hello world");

symbol: a symbol value which automatically takes on the data type and value of anything that is assigned to it (e.g., myVariableName), such that symbols may be of any basic type (e.g., Boolean, Integer, Real, String, or unknown); and/or property: a device property value (e.g., @dev.temperature), where the data type of a property is determined, by the schema and the device driver that handles it, to be of any of the basic types (e.g., Boolean, Integer, Real, String, or unknown).

In an embodiment, the base scripting language is a dynamically-typed language that utilizes data-driven run-time discovery of all fields and properties associated with devices. In other words, a symbol takes on the data type and value of whatever was most recently assigned to the symbol. This obviates the need for syntax or logic associated with type definitions, which complicates other programming languages.

As mentioned above, in an embodiment, the symbol and property data types may be assigned any of the basic data types, as well as a value representing "unknown". As will be described elsewhere herein, the "unknown" value can have special significance, particularly when evaluating expressions.

In an embodiment, the base scripting language supports both block and line comments, similar to C. The base scripting language may also support block statements (e.g., surrounded by brackets "{" and "}"), similar to C. The usage and semantics of other keywords, illustrated in Listing 1, will be described elsewhere herein with reference to the syntax of the base scripting language.

5.1.2. Syntax

Listing 2 below represents the syntax of the base scripting language, given the lexical structure defined in Listing 1 and according to the formalism defined in the '130 patent, according to an embodiment:

```
Listing 2-Syntax of Base Scripting Language

<begin> Marlin
= kBeGreedyParser+kPreserveBNFsymbols+kNoProgress
program           ::= function opt_more_funcs <endf>
function          ::= script script_prototype { more_statements } <@1:29>
opt_more_funcs    ::= <null> <or> function opt_more_funcs
script_prototype  ::= <@1:6> <1:Identifier> opt_SysSCRIPT_id rstof_script_decl opt_description
                      <@1:18>
rstof_script_decl ::= <null> <or> ( opt_io <@1:7> )      // possible script parameters
opt_description   ::= <null> <or> <12:String> <@1:9>     // optional description of the script
opt_io            ::= <null> <or> value <1:Identifier> more_opt_io <or> reference <1:Identifier>
                      more_opt_io
more_opt_io       ::= <null> <or> , opt_io
opt_SysSCRIPT_id  ::= <null> <or> [ <12:String> end_sfishID
end_sfishID       ::= <@1:12> ]
more_statements   ::= <null> <or> statement <@1:17> more_statements
statement         ::= simple_stmt <or> <@1:24> conditional_stmt <@1:25> <or> <@1:24> loop_stmt
                      <@1:25>
simple_stmt       ::= activate rstof_activate ; <or>
                      deactivate <1:Identifier> opt_ID <opnd> ( ) <@1:27> ; <or>
                      <6:devAtt> rstof_dobject dev_assign <or>
                      <1:Identifier> assign_or_call <or>
                      <13:global> = expression ; <@1:0> <or>
                      [ more_statements ] <or>
                      pause <opnd> <@1:23> ( parameter_list ) <@1:16> <or>
                      lock <12:String> <@1:36> ; <or> // mutext lock/unlock
                      unlock <12:String> <@1:37> ; <or>
                      continue <@1:10> ; <or>   // only valid within a loop, otherwise silently ignored
                      break <@1:4> ; <or>       // only valid within a loop, otherwise silently ignored
                      ;                          // you are allowed an empty statement
```

| Listing 2-Syntax of Base Scripting Language | |
|---|---|
| dev_assign | ::= = expression ; <@1:0> <or> := expression ; <@1:0> <@1:30> |
| rstof_activate | ::= <1:Identifier> opt_ID <opnd> <@1:23> ( parameter_list ) <@1:26> <or> concurrently <1:Identifier> opt_ID <opnd> <@1:23> ( parameter_list ) <@1:28> |
| assign_or_call | ::= = expression ; <@1:0> <or> <opnd> <@1:23> ( parameter_list ) <@1:15> ; |
| opt_ID | ::= <null> <or> [ <12:String> <@1:31> ] |
| conditional_stmt | ::= if <@1:19:if> ( expression <@1:21:if> ) middle_if opt_else <@1:41:if> <or> <@1:20:if> trigger <@1:19:trigger> ( expression <@1:21:trigger> ) rstof_trigger <or> every <@1:19:every> ( expression <@1:21:every> ) rstof_every <or> when <@1:19:when> ( expression <@1:21:when> ) rstof_when |
| loop_stmt | ::= while <@1:19:while> ( loop_condn <@1:21:while> ) rstof_while <@1:11> |
| loop_condn | ::= <@1:3> expression <@1:5> |
| middle_if | ::= <@1:1> simple_stmt <@1:42:if> opt_elif |
| opt_elif | ::= <null> <or> elseif <@1:19:elseif> ( expression <@1:21:elseif> ) middle_if |
| rstof_trigger | ::= <@1:2> simple_stmt opt_telse <@1:20:trigger> |
| rstof_while | ::= simple_stmt <@1:20:while> |
| rstof_every | ::= simple_stmt <@1:20:every> |
| rstof_when | ::= simple_stmt <@1:20:when> |
| opt_telse | ::= <null> <or> else <@1:19:elset> else_body |
| opt_else | ::= <null> <or> else <@1:19:else> else_body |
| else_body | ::= <@1:8> simple_stmt |
| // NOTE: the BNF from here on is shared by kPhysLogLanguage and kAdapterLanguage | |
| expression | ::= lor_expr rstof_ternary |
| rstof_ternary | ::= <null> <or> ? lor_expr : lor_expr <@0:1> |
| lor_expr | ::= land_expr rstof_lor_expr |
| rstof_lor_expr | ::= <null> <or> or land_expr <@0:2> rstof_lor_expr |
| land_expr | ::= bor_expr rstof_land |
| rstof_land | ::= <null> <or> and bor_expr <@0:3> rstof_land |
| bor_expr | ::= bxor_expr rstof_bor |
| rstof_bor | ::= <null> <or> \| bxor_expr <@0:4> rstof_bor |
| bxor_expr | ::= band_expr rstof_bxor |
| rstof_bxor | ::= <null> <or> ^ band_expr <@0:5> rstof_bxor |
| band_expr | ::= beq_expr rstof_band |
| rstof_band | ::= <null> <or> & beq_expr <@0:6> rstof_band |
| beq_expr | ::= cmp_expr rstof_beq |
| rstof_beq | ::= <null> <or> == cmp_expr <@0:7> rstof_beq <or> !=cmp_expr <@0:8> rstof_beq |
| cmp_expr | ::= shift_expr rstof_cmp |
| rstof_cmp | ::= <null> <or> < shift_expr <@0:9> <or> <= shift_expr <@0:11> <> > shift_expr <@0:10> <or> > = shift_expr <@0:12> |
| shift_expr | ::= add_expr rstof_shift |
| rstof_shift | ::= <null> <or> << add_expr <@0:13> rstof_shift <or> >> add_expr <@0:14> rstof_shift |
| add_expr | ::= mult_expr rstof_add |
| rstof_add | ::= <null> <or> + mult_expr <@0:15> rstof_add <or> − mult_expr <@0:16> rstof_add |
| mult_expr | ::= factor rstof_multexpr |
| rstof_multexpr | ::= <null> <or> *factor <@0:17> rstof_multexpr <or> / factor <@0:18> <or> rstof_multexpr % factor <@0:19> rstof_multexpr |
| factor | ::= primary <or> not primary <@0:21> <or> ~ primary <@0:22> <or> − primary <@0:20> |
| primary | ::= object <or> Integer <or> Real <or> <2:Char> <or> ( expression ) <or> <12:String> <or> unknown |
| Integer | ::= <3:DecInt> <or> <7:HexInt> <or> <10:OctInt> <or> true <or> false |
| Real | ::= <4:Float> <or> <5:FloatExp> |
| object | ::= <1:Identifier> rstof_object <or> <6:devAtt> rstof_dobject <or> <13:global> |
| rstof_object | ::= <null> <or> <opnd> <@1:23> ( parameter_list ) <@1:15> |
| rstof_dobject | ::= opt_substructPart <or> [ opt_indexDim ] opt_2ndIndex opt_substructPart |
| opt_indexDim | ::= <null> <or> expression <@1:40>    // unbounded array allowed only in type def |
| opt_2ndIndex | ::= <null> <or> [ expression <@1:40> ] |
| opt_substructPart | ::= <null> <or> . <1:Identifier> <@1:43> opt_subIndexPart |
| opt_subIndexPart | ::= <null> <or> [ expression <@1:40> ] |
| parameter_list | ::= <null> <or> expression <@1:22> rstof_param_list |
| rstof_param_list | ::= <null> <or> , expression <@1:22> rstof_param_list |
| <end> | |

The section of the BNF in Listing 2, starting from the left hand side (LHS) production for "expression" and ending with the LHS production for "Real", essentially specifies all the operators that can be utilized within expressions and the corresponding operator precedence rules that are enforced by the declaration sequence within the BNF.

In an embodiment, the syntax of the base scripting language is fundamentally similar or identical to the C programming language, and therefore, will not be described in detail. Furthermore, in an embodiment, all of these language capabilities are implemented by code built into a library based on the parser technology of the '130 patent, as indicated by the grammar elements in the form "<@0:n>". For this reason, these aspects of the base scripting language, including the evaluation of nested expressions of arbitrary depth, will also not be described in detail herein. In an embodiment, the only syntactic difference with the standard C programming language is the substitution of the logical operator "and" instead of "&&", "or" instead of "||", and "not" instead of "!", and the allowance of a value "unknown" in the production for "primary".

In an embodiment, the base scripting language supports calls to built-in functions (return a value) and procedures (return a value of "unknown"), to which zero or more comma-separated parameters may be passed. Each parameter may be an arbitrary expression (including nested function calls), resulting in a parameter value that may take the form of any of the basic data types. The grammar productions associated with this capability include "object", "rstof_object", "parameter_list", and "rstof_param_list". Functions can determine the number and data type of parameters passed to them, and many functions can accept more than one data type for any given parameter and operate according to the data type passed as the given parameter. A sampling of available built-in functions are described elsewhere herein for illustrative purposes.

It should be understood that, while certain specific keywords will be used and described herein, any number of different keywords may be used (e.g., conveying the same or similar idea) as substitutes for those described.

5.1.3. Declaration and Parameterization

The productions in Listing 2, beginning at "program" and ending at "end_sfishID", relate to the declaration and parameterization of scripts written in the base scripting language. Scripts comprise one or more function declarations and bodies. In an embodiment, the first declaration encountered within a script source file is taken to be the "main" function of the script. The main function represents the code that is actually executed once the script has been compiled into a VM program by compiler 220 and loaded into VM 230 for execution.

In an embodiment, if additional function definitions appear after the main function definition, these additional functions represent additional statically-scoped scripts that can only be activated from code with the same script source file (e.g., by code within the "main" function or another function). As with the main function, these additional functions may take zero or more parameters. The productions "program", "function", and "opt_more_funcs", in Listing 2, describe the overall main and subroutine content of a script.

In an embodiment, a script may have an optional associated ID (see, e.g., production "script_prototype" in Listing 2) and string description. The ID value is generally identical to the ID of the GUI script, described elsewhere herein, from which a base-language script may be derived (e.g., via script converter 212). This script ID forms a convenient means by which the script can be referenced back to the original GUI script source, if appropriate. The description for the base-language script may also generally correspond to that of the GUI script. Descriptions form a convenient human-readable means for identifying which script is executing and its purpose. Both the ID and description may be utilized within debugging interfaces. In the case of a base-language script derived from a GUI script, the conversion process (e.g., implemented by script converter 212) may prepend the original name of the GUI script to the front of the base-language script's description (e.g., in the form "[original GUI script name] [remainder of description]"). This allows script manager 210 to, when necessary, recover the original GUI script name, which may or may not conform to base-language naming requirements.

In an embodiment, all scripts can accept zero or more comma-separated parameters, which may be passed by value or by reference (see, e.g., productions "opt_io" and "more_opt_io" in Listing 2). When the identifier within the script prototype is preceded by the keyword "value", within a given script, that identifier will be in scope and will be initialized to the value and data type of whatever expression was passed by the invoking script as the value of that parameter. When a parameter is passed by value in this manner, a change to the passed value in the parent or activating script will not impact the value in the child script. Child scripts also cannot return a value via a parameter that has been passed by value.

On the other hand, if the parameter to the script is preceded by the keyword "reference", the parent or activating script must pass a string value containing the name of the symbol or device property to be passed by reference. In this case, code executing within the child script may access the parameter by its local name, but all such accesses automatically resolve to a reference to the original named symbol or property. The result is that, if the child script alters the value of the parameter that has been passed by reference, that value is immediately changed in the parent script, and vice versa. Since symbols have a scope that is defined by the script in which they are used, the child script has the ability to reference and alter symbol values within the scope of the parent script. This mechanism allows simple communication between scripts and allows a child script to return result values to the parent script (i.e., by altering the values of symbols or properties within the parent script's scope). The use of script parameters is discussed in more detail elsewhere herein.

5.1.4. Simple Statements

In an embodiment, the base scripting language provides a number of simple statements. Each of these simple statements may be separated from the next by a semicolon, which is the statement delimiter in an embodiment. As illustrated by the "simple_stmt" production in Listing 2, wherever a simple statement may exist, it can be replaced by a block statement containing further inner statements (i.e., "{more_statements}"). In addition, the empty statement (i.e., nothing but ";") is legal wherever any simple statement is legal.

In an embodiment, the simple statements available in the base scripting language comprise one or more of:
"break": can be used within any loop to immediately break out of the loop that contains it. The "break" statement is functionally identical to the "break" statement in C. A "break" statement occurring outside of any loop may be ignored;
"continue": can be used within any loop to immediately cause the next iteration of the loop to begin. The "continue" statement is functionally identical to the "continue" statement in C. A "continue" statement occurring outside of any loop may be ignored;

"pause": causes the script to pause for the specified amount of time and do nothing else. The "pause" statement looks exactly like a function call to a function whose name is "pause" (see, e.g., the "simple_stmt" production). However, its implementation may be handled differently, as explained elsewhere herein. In an embodiment, the "pause" statement accepts two parameters: (a) an integer or real expression that specifies the number of time units constituting the pause, and (b) a string value containing a name of one of the legal fixed length time units (e.g., "week", "day", "hour", "minute", "second", or "tick", and/or the plural forms of these words, e.g., "weeks", . . . "ticks"). Thus, the statement "pause(1.5, 'seconds')" would cause the activity of the current script to pause for 1.5 seconds, while allowing any other scripts, executing in parallel, to continue normal execution during the pause. As an example, the "pause" statement can be used to introduce simple delays into scripts while waiting for real-world events to reach a stable state;

"@devName.property=x" (i.e., a form, where x represents any arbitrarily complex expression, devName represents any device name, and property represents any device property for the device represented by devName): assigns the value (i.e., the value represented by "x") of the right-hand side of the assignment operator (i.e., "=" or ":="") to the device property specified by "@devName.property";

"symbolName=x" (i.e., a form, where x represents any arbitrarily complex expression, and symbolName represents the name of any symbol): assigns the value (i.e., the value represented by "x") of the right-hand side of the assignment operator (i.e., "=" or ":="") to the symbol specified by "symbolName". If "symbolName" is the name of a parameter that has been passed to the script by reference (as opposed to value), the ultimate assignment could be to either a device property or a referenced symbol in the scope of the parent script;

A call to a built-in procedure or built-in function (discarding the result value) constitutes a valid simple statement (see, e.g., "assign_or_call" in Listing 2);

"deactivate myScriptName( )" (i.e., a form, wherein myScriptName represents the name of any arbitrary script): immediately deactivates the named script represented by "myScriptName". Scripts can be activated concurrently (i.e., in parallel in separate VM threads), or not (i.e., in serial). The "deactivate" statement is used to deactivate a concurrently running script. In an embodiment, the "deactivate" statement does not apply to a script that has been activated without the keyword "concurrently". Whenever a script is deactivated, all descendant scripts may also be deactivated. Deactivation removes the script from the VM environment; and/or "activate myScriptName( . . . )" (i.e., a form, wherein myScriptName represents the name of any arbitrary script, and " . . . " represents an arbitrarily long set of comma-delimited parameters, including zero parameters): activates the named script represented by "myScriptName", and optionally passes one or more parameters to the script by value or by reference. In an embodiment, the activated script is a child of the script that invokes the "activate" statement (and may be activated to run concurrently using the keyword "concurrently"). Activation adds the named script to the VM environment as a child of the activating script, and begins execution of the newly-activated script.

5.1.5. Loops and Conditional Statements

In an embodiment, the base scripting language provides only a single loop statement. In an embodiment, this single loop statement is the "while" loop statement. The "while" loop may be functionally and syntactically identical to the "while" loop in C. Upon each iteration of the loop, the "while" condition is evaluated, the loop body is executed when the "while" condition is true, and the loop is terminated when the "while" condition is false. In an example, the "while" condition may be expressed as "while(true)" to create an infinite loop, which can be terminated by a "break" within the loop body or a "deactivate" statement executed in an ancestral script. Most scripts which are intended to run continuously will comprise an outer infinite "while" loop. Without an outer infinite "while" loop, the script will run to completion and then automatically deactivate (possibly returning results of execution to the activating script in parameters that were passed by reference by the activating script). This simplification of standard loop constructs provided by other languages simplifies the learning curve. It should be understood that, in alternative embodiments, another loop construct (e.g., "do . . . while" statement, "repeat" statement, "for" statement, etc.) may be used instead of the "while" loop construct.

On the other hand, in an embodiment, the base scripting language provides more complex conditional statements than conventional programming languages to support control system specialization. The "if" statement of the base scripting language may be similar to the "if" statement in C, except that, in an embodiment, the base scripting language avoids the dangling "else" problem and other problems in C by prohibiting direct nesting of any conditional or loop statement within the body of another conditional statement. This means that one cannot write a construct of "if(x) statement; else if(y) statement; . . . ", because the second "if" statement is prohibited without a surrounding block statement. On the other hand, the construct of "if(x) statement; else {if(y) statement;}" would be acceptable in the base scripting language. The same is true for nesting conditional statements or loops within the "if" clause. The "elseif" construct allows this restriction to be overcome when creating an extended list of conditional statements.

In an embodiment which implements a "trigger" conditional statement, the "trigger" statement, like the "if" statement, may also have an optional "else" clause. The difference between the "if" and "trigger" statements is that, in an "if" statement, the value of the condition at the time it is evaluated determines which branch of the "if" statement (i.e., the "if" clause or the "else" clause) is executed, whereas, in a "trigger" statement, there must be both a Boolean condition value that is correct and a transition to/from a true/false value in order for the "trigger" clause to be executed once. The same clause will not execute again until the condition changes from the satisfying condition and then returns to the satisfying condition. For the very first execution of a "trigger" statement within an outer loop, the previous state is taken to be "unknown", which means that, in the first iteration of the outer loop, the "trigger" statement behaves like an "if" statement, but that, in each subsequent iteration of the outer loop, the "trigger" statement requires a transition to the satisfying condition. The same transition requirement applies to the optional "else" clause of a "trigger" statement. In other words, the "trigger" clause is to be executed once whenever the condition is satisfied (on the first iteration or after a transition), and the "else" clause is to be executed once whenever the condition ceases to be satisfied (on the first iteration or after a transition).

The "trigger" statement is an ideal tool for handling what happens when a property in the real world changes states in some significant way, without having to worry about the complexity of tracking state to ensure that the script does not do the same thing over and over again. Thus, the "trigger" statement is an innovation that addresses the complexity of tracking state in a control system.

In an embodiment, the "trigger" statement could accept a second parameter (i.e., in addition to a trigger condition) that represents the delta or threshold which any comparison with the trigger condition must exceed in order for an "edge" (i.e., a state transition) to be detected. For example, for the statement "trigger(a>100, 1)", an edge does not occur until the value of "a" exceeds 101 in the increasing direction or falls below 99 in the decreasing direction. This syntax adds "hysteresis" to the "trigger" statement. Hysteresis can be used to avoid the common problem, for example, of when the temperature hovers around 100, thus rapidly triggering a series of invocations of both the "trigger" and "else" clauses, rather than a single trigger on each transition through the breakpoint value.

In an embodiment, the base scripting language also implements an "every" statement. The "every" statement addresses the control system requirement of executing a body of code on a regular basis, but to otherwise skip it, and can particularly benefit monitoring functions and the generation of regular activities with intervening quiescence (e.g., a sprinkler control system). The "every" conditional statement handles all such cases trivially. For the "every" statement, the condition is not a Boolean condition, but rather is an integer, real, double, or date (see, e.g., the built-in function of "StringToTime" described elsewhere herein), which specifies the elapsed time that is to pass between each execution of the body of the "every" statement. Similarly to the "trigger" statement, the first time an "every" statement is encountered within a loop, the previous value is "unknown", and therefore, the body of the "every" statement is executed. In each subsequent iteration of the loop, the body of the "every", statement is skipped until the specified time has elapsed, at which time the body of the "every" statement again executes once.

5.1.6. Threading Model

In an embodiment, the base scripting language implements a simple but powerful threading model, as specified by the "activate concurrently" statement. To explain this feature and how it interacts with other capabilities of the base scripting language, a simple test case example will be described with respect to Listing 3 below:

```
Listing 3-Example of Threading Model script illustrateThreading "This script illustrates the use of triggers and the threading model"
{
  i = 0; @Thermometer1.temperature = 90;    // start out on the cool side
  cooling = 0; heatwave = 0;                // launch our trigger stimulation script
  activate concurrently sawTooth("@Thermometer1.temperature");
  while ( i < 8 )                           // loop for 4 cycles of heating/cooling
  {
    trigger ( @Thermometer1.temperature > 100 )
    {                                       // trigger should execute once each time it crosses 100
      heatwave = heatwave + 1;
      i = i + 1;
    } else                                  // this else should only execute once each
                                            // time it crosses 100
    {
      cooling = cooling + 1;
      i = i + 1;
    }
  }
  deactivate sawTooth( );                   // kill our child sawTooth( ) script before we complete
}
                                            // !!! the main script/last script defined
script sawTooth(reference property) "Generates a sawtooth wave to asynchronously stimulate the trigger conditions"
{
  i = 1;
  while ( true )                            // loop forever until we're killed
  {                                         // here we asynchronously modify device property
    pause(10,"ticks");
    i = ( property > 110 ) ? −1 : ((property < 90) ? 1 : i);
    property = property + i;                // ..."@Thermometer1.temperature" which should
                                            // stimulate trigger clauses in the main script
                                            // as it crosses 100
  }
}
```

The main script in the example of Listing 3 is "illustrateThreading", which takes no parameters and concurrently activates a locally-declared subscript named "sawTooth" (i.e., "illustrateThreading" is the parent script, and "sawTooth" is the child script), passing a single parameter by reference, referred to within "sawTooth" as the symbol "property". When activating "sawTooth", "illustratedThreading" passes the device property "@Thermometer1.temperature" (e.g., representing a temperature value for a device named "Thermometer1") as the parameter referred to within "sawTooth" as the symbol "property". The "sawTooth" subscript executes an infinite loop, within which the value of "property" is alternately incremented up to an upper limit of 110, and then decremented to a lower limit of 90. Since "@Thermometer1.temperature" was passed by reference, changes to the value of "property" in the "sawTooth" subscript are immediately reflected in "@Thermometer1.temperature". The result is that the "saw- Tooth" subscript creates a triangular or sawtooth wave of values for the "@Thermometer1.temperature" property in an asynchronous and completely parallel thread from the main script "illustrateThreading". The values passed to the "pause" statement within the "sawTooth" subscript set the frequency of the sawtooth wave that is generated.

After activating the "sawTooth" subscript, the main "illustrateThreading" script enters a loop, in which the variable defining the condition is incremented once each time that either the internal "trigger" clause or "else" clause is executed. Since each clause of the "trigger" statement executes only once as the value of "@Thermometer1.temperature" passes across the mean value of 100, a properly executing "illustratingThreading" script should yield final values of 4 for each of the symbols "heatwave" and "cooling". Note that the synchronous child thread "sawTooth" is interacting directly and concurrently with the parent script "illustrateThreading" by altering the value of the device property "@Thermometer1.temperature", thereby alternately forcing either the "trigger" clause or "else" clause of the "trigger" statement to execute each time the value passes through 100 in either direction.

This simple, contrived example illustrates the power and simplicity of an embodiment of the threading model, as provided by the "activate concurrently" statement. The "activate concurrently" statement can be used to create complex systems that would be considerably more challenging to implement in other programming languages and would require a far higher level of programming expertise. The actual implementation of concurrent threads will be described elsewhere herein with respect to an embodiment of VM 230.

5.1.7. Built-in Functions

In an embodiment, the base scripting language may provide a library of built-in functions. The following is an illustrative, non-exhaustive list of some of the built-in functions that may be provided in the library for the base scripting language, wherein "[I]" indicates an integer parameter, "[B]" indicates a Boolean parameter, "[F]" indicates a real parameter, "[S]" indicates a string parameter, and "[V]" indicates a void return value (i.e., a procedure rather than a function):

[F] StringToTime([[S] dateTimeString]): converts a date (and/or optionally, a time) string to a date double. In an embodiment, the date must be specified in the following format of "yyyy/mm/dd [hh:mm[:ss[:tt]] [AM/PM]]". The function may only support the Gregorian calendar. The tick value "tt", if present, represents 100ths of a second (range 00 . . . 99). The date may be specified as "0000/00/00" in order to convert a time of day value/offset to the equivalent double value. The value 0.0 may be returned if the date string is invalid. The integer part of the date double that is returned is the Serial Day Number (SDN). SDN is a serial numbering of days, where SDN 1 is Nov. 25, 4714 BC in the Gregorian calendar and SDN 2447893 is Jan. 1, 1990. This system of date numbering is sometimes referred to as "Julian" days, but to avoid confusion we use the term SDN herein. The fractional part of the real value contains the time of day, such that one hour=1/24.0, one minute=1/1440.0, and so forth. The advantage of this internal representation is the ease with which dates represented in this format can be compared and manipulated using normal arithmetic operators of the base scripting language. If the "dateTimeString" parameter is omitted, the function returns the current date and time value. This function also accepts strings of the form "yyyy-mm-ddT . . . ", which may be output by the scripting GUI described elsewhere herein (with all characters from T onward being ignored);

[I] Round([F] realValue): rounds a real number to the nearest integer value;

[I] Int([I/R/S] aValue): converts an integer, real, or string value to an integer value. String conversion may be similar to the "strtoll( )" function in C;

[F] Real([I/R/S] aValue): convers an integer, real, or string value to a real value. String conversion may be similar to the "strtod( )" function in C;

[S] Sprintf([S] formatString, . . . ): similar to the "sprintf( )" function in C, except that integer and real variable argument sizes are always int64 and double, respectively;

[F] Random( ): generates a random real number in the range of 0 to 1;

[I] RandomIRange([I] min, [I] max): generates a random integer number in the range of "min" to "max−1";

[I] SetOptions([I] options/[S] optionsStr): used to turn on selected parser options. This function can be useful in debugging selected portions of a script without cluttering up the console by tracing everything else. The string form allows options to be set symbolically. This function returns the options settings, after the set operation is performed, as the result;

[I] ClrOptions([I] options/[S] optionsStr): clears the specified parsing options. This function is the opposite of SetOptions( ), and returns the options settings, after the clear operation, as the result. The string form allows options to be cleared symbolically;

[I] GetOptions( ): obtains and returns the current settings of the parsing options;

[S] TimeToString([[F] dateDouble]): converts a date double to a Gregorian calendar date string, followed by a time value (24-hour clock);

[I] TimeElement([F] dateDouble,] [S] elementName): obtains the specified time element as an integer from a date double value. Valid string values for "elementName" are: "year" (year value), "month" (month value between 0 for January and 11 for December), "dayOfYear" (day of the year between 1 and 365), "day" (day of the month between 1 and 31), "dayOfWeek" (day of the week between 0 for Sunday and 6 for Saturday), "weekDayOfMonth" (week day of the month from 1 to 5, e.g., 3rd Sunday of the month), "hour" (hour of the day between 0 and 23), "hour12" (clock-face hour between 1 and 12), "amPm" (AM/PM between 0 for AM and 1 for PM), "minute" (minute of the hour between 0 and 59), "second" (second of the minute between 0 and 59), and/or "tick" (tick of the second between 0 and 99);

[F/I] TimeUnit([S] unitName): returns the double value equivalent to the specified fixed-length time unit. Value "unitName" strings are "week", "day", "hour", "minute", "second", and "tick". For example, the expression "3*TimeUnit('week')" would be used to get the double value equivalent of three weeks. This function may return either a real or integer value depending on which is appropriate;

[S] Exit([S] aReason): causes the current script to exit cleanly, and optionally display a reason for the exit (to the console) if specified by the "aReason" parameter;

[I] LineNum( ): returns the current line number in the current script's source file;

[S/I/F] IndexSet([I] index, [S/I/F] set1, . . . [S/I/F] setN): selects a specific set member from a given list of members by index, and returns the selected member as a result. If the specified index is out of range, a value indicating "no value" is returned. The return data type of the function is determined by the data type of the set members (which must all be the same and one of the integer, real, or string data types);

[I] SetIndex([S/I/F] src, [S/I/F] set1, . . . [S/I/F] setN): compares "src" to each of the elements in the supplied set of possible match values, and returns the index (starting from 1) of the found match if a match is found or zero if no match is found. If "src" is an integer, the remaining set values to be checked must also be integers. Similarly, if "src" is a string, the remaining set values to be checked must also be strings, and, if "src" is a real, the remaining set values to be checked must also be reals. This function represents a convenient way to check a value for membership in a set of values, and can replace a large number of individual comparisons with just a single function call;

[F] TimeOfDay([[F] dateDouble]): returns the fractional part of "dateDouble" which corresponds to the time of day;

[F] Sunrise( ): returns the fractional dateTime value corresponding to sunrise at the current location on the current date. If the sun does not rise at the current location on the current date, the function returns a value indicating "unknown". Otherwise, the function returns the requested fractional date double real value;

[F] Sunset( ): returns the fractional dateTime value corresponding to sunset at the current location on the current date. If the sun does not set at the current location on the current date, the function returns a value indicating "unknown". Otherwise, the function returns the requested fractional date double real value;

[I] RangeIndex([I/F] src, [I/F] set1, . . . [I/F] setN): similar to the SetIndex( ) function, but looks for a matching "less than or equal to" value in the set, instead of equality. Thus, this function can be used to index into an ordered set of numeric ranges, thereby replacing a significant number of conditional statements. Unlike the SetIndex( ) function, string values are prohibited in the RangeIndex( ) function;

[S] ConsoleMessage([S] formatStr[, . . . ]): performs a similar function as the "sprintf( )" function in C, returning the generated string as a result and simultaneously sending the generated string to the console. This function can be used to produce debugging or progress messages;

[V] Log([S] action, [S] formatString[, . . . ]): corresponds to the scripting GUI "Log" command, and sends the resulting string to the logging page in the GUI of interface 114, thereby serving as a means of recording overall system activity. In an embodiment, the scripting GUI itself only passes a simple string. However, the generalized "Log" function treats the second parameter as a C "sprintf( )"-compatible format specifier. Any additional parameters that are passed are used to substitute values, as with "sprintf( )" in C. Thus, the final log output can contain variable values, instead of just fixed strings; and/or A variety of other built-in functions may be provided, including, without limitation, one or more of the following, which have been chosen to illustrate environment capabilities:

[B] ScriptActive([S] scriptName): returns "true" if the script specified by "scriptName" is active and running within VM 230, and otherwise returns "false". Note that for subscripts declared within a script, only the activating script has visibility. Therefore, only the activating script can determine the state of the subscript;

[B] Between([I/F] val, [I/F] low, [I/F] high): checks if the value represented by "val" is between the limit values represented by "low" and "high";

[I] ConfigOptions([I] index, [S] optionsToSet, [S] optionsToClear): dynamically changes the system configuration and/or debugging options;

[B] Known([S] aSymbol[, [S] devType]): determines if a symbol is "known;"

[V] Forget([S] aSymbol[, [S] devType]): "forgets" the definition or value of a symbol;

[V] NewBlock_PID([S] aSymbol, [S] currentVal, [F] windupGuard, [F] propGain, [F] intGain, [F] derivGain): creates a parameterized proportional-integral-derivative (PID) controller. This is an example of the ability to create arbitrary blocks that have persistent state;

[I/F/SN] UpdateBlock([R] blockRef{, [I/F/S] paramN}): updates the state of a "block;"

[S] Record([S] aDSchannel, [S] aName, [I/F/S] aValue[, [/F] deltaValue]): records a value to a specified channel of a "datastream" virtual device; and/or

[S] SetDevice([S] devNameAndOrRef): sets the device reference implied by the allowed language form "@.propertyName". In the adapter language, described elsewhere herein, this implicit device may be set automatically by context.

5.1.8. Parser Context and Symbols

In an embodiment, a script in the base scripting language can be executed by either (i) being compiled by compiler 220 into a VM program which is executed in VM 230; or (ii) being interpreted directly by a parser without being compiled into a VM program.

As discussed elsewhere herein, in the base scripting language, a symbol is created with a local scope as soon as it is assigned and accepts the data type and value of whatever was most recently assigned to it. In other words, the base scripting language is a dynamically-typed language. Symbols are one example of the ability of the underlying parser abstraction to associate arbitrary context with any given instance of a parser.

In an embodiment, a parser stores symbols as strings, containing the name of the symbol, in association with a value, which may be of one of the built-in data types (e.g., Boolean, integer, real, string, or unknown). Each symbol may also have an associated flag value. For example, a flag may be used to indicate that a particular symbol is actually a script parameter that has been passed by reference, in which case any code accessing the symbol for read or write purposes can follow the reference to perform the read or write. Whenever the parser encounters a symbol name, it may conduct a lookup in the symbol registry of the local parser to find an entry for the symbol name, and then retrieve or set the data type and value in the symbol registry. In an embodiment, the symbol registry is indexed for rapid lookup using the lexical analyzer abstraction of the '430 patent. This makes symbol lookup virtually instantaneous, regardless of the number of symbols in the symbol registry.

The parser abstraction also supports the creation of parent-child relationships between parsers. For example, this is utilized when tracking the child script(s) of a given parent script. Each and every script, whether a parent or a child, has an associated parser, regardless of whether it is executing directly within that parser or within VM 230. In an embodiment, VM 230 does not use the parser to interpret the op-codes of the executing script, but does use it to maintain context and symbols and the hierarchy of script ownership. This means that, with respect to capabilities implemented within the parser context, there is no difference in operation between direct parser-based execution and VM 230 execution. The primary reason for taking the extra step of converting the script to a VM program for execution in VM 230 is that the VM program can be speed optimized over the parser-based form. The VM program is also easier for understanding and describing embodiments of the threading implementation.

The parent-child relationships between parsers and the fact that symbols are maintained within the parser context means that the base scripting language can maintain hierarchical symbol scopes. Specifically, a child parser could refer directly to the symbols within a parent parser if no identically-named symbol is declared within the local script scope of the child script. However, this feature may be disabled to avoid potential confusion, since, in the abstraction described in the '130 patent, all parsers are created dynamically by "cloning" the ancestral parser. This means that all of the parsers for the base scripting language are descendants of this ancestral parser, which is itself dynamically created at startup from the lexical analysis specification in Listing 1 and the BNF specification in Listing 2. Thus, the ancestral parser scope is used as a repository for global variables which can be accessed from all scripts and can be utilized as needed by script designers. A specialized initialization script can be defined which sets the initial value of all global variables in this ancestral context.

In an embodiment, when running a compiled script as a VM program in VM 230, the parser context has a bidirectional link to and from the VM program that has been loaded into VM 230 for execution.

5.1.9. Control-Specific Constructs

In an embodiment, the base scripting language has a number of unique capabilities that are specific to control domains. While some of these capabilities are described in more detail elsewhere herein, each which will now be briefly described.

In an embodiment, the data architecture uses a data format that includes a status field associated with each and every device property: This status field may take a value indicating "acknowledged", a value indicating "pending", or a value indicating "unknown". The device driver 166 that communicates with a particular device controller 170 is the authority for the properties and the property statuses of that particular device. When any component in the data architecture (e.g., GUI, interpreter, VM 230, etc.), other than the authority for a device property, requests a change to a property value, the status of the property is set to "pending." Subsequently, the authority (i.e., device driver 166 corresponding to the device associated with the given property) responds with the achieved value (which may or may not differ from the requested value), and the status of the property is set to "acknowledged", indicating that the real-world value has been set to the requested value. This approach of using "pending" and "acknowledged" statuses enables well-controlled distribution of device property changes throughout the system.

In an embodiment, to improve performance, script execution environment 150 maintains an internal cache of the state of all known device properties. Entries in the cache may be created, updated, and read using available functions (e.g., RG_SetPropertyState( ) and RG_GetPropertyState( )). The cache includes, for each device property, the reference to the device property, the value and data type, and the status. When device property values are read by a script, their values will generally come from this internal cache so that VM 230 does not have to wait for responses from a device driver 166. Device drivers 166 are responsible for calling a function (e.g., DM_DevMgrNfy( )), whenever a device property value changes, to update, the device property value in the internal cache. The result is that device property values in the internal cache will not generally have a "pending" status, since they are updated by their respective authorities (i.e., respective device driver 166) resulting in an "acknowledged" status.

The impact of having to wait for an actual update from device driver 166 in order for the internal representation of a device property value to change is a feature of control systems that frequently causes confusion for programmers not accustomed to using real-time programming. In standard programming metaphors, when a value is set, it can be assumed to have been set. However, in real-world control systems, when a value is set, it may not acquire that value immediately, but only after the command makes it to the device and the device acts upon the command. For example, an inexperienced programmer may write a script, such as the one below, and expect that the Log( ) message will never be sent since the "if" condition should never be satisfied:

```
@Thermostat.setpoint = 70;
pause(1 second);
@Thermostat.setpoint = 60;
if (@Thermostat.setpoint == 70)
{
    Log("message","I thought this should not
    happen but it does!");
}
```

To the contrary, in a control system environment, it is likely that the Log( ) message will be sent, since the "@Thermostat.setpoint=60;" statement is unlikely to be acknowledged by the appropriate device driver by the time the "if" condition is tested (i.e., the internal cache value for "@Thermostat.setpoint" will likely still be 70, therefore, satisfying the "if" condition). This is a source of confusion for programmers that are not familiar with real-time programming.

Advantageously, the existence of the "pending" status provides a solution to this source of confusion. In an embodiment of the base scripting language, there are two distinct assignment operators that can be applied to device properties: "=" and ":=". The ":=" assignment operator may be referred to herein as the "assign and wait while pending" operator. If "@Thermostat.setpoint=60;" in the above script were replaced by "@Thermostate.setpoint:=60;", the script would operate as expected. Specifically, the Log( ) message would not be sent.

The ":=" operator is appropriate whenever a script assigns a value to a device property and then references that value shortly thereafter. To implement this "assign and wait while pending" operator, the logic of VM 230 is implemented such that, when a script assigns a device property using the operator, the logic sets the status of the device property in the internal cache to "pending", but does not change the value of the device property in the internal cache. Eventually, the authority (e.g., the device driver 166 for the device having the property) will change the value of the device property in the internal cache and update the status in the internal cache to "acknowledged". For the above example, the ":=" operator may be implemented in the VM assembler format as:

| | |
|---|---|
| PUSH | "@Thermostat.setpoint" |
| PUSH | #60 |
| LOAD | |
| L1: | |
| JMC | L1,"pending" |

As illustrated, the label and jump are added after the LOAD op-code for an ":=" operator, and the JMC op-code knows the property involved ("@Thermostat.setpoint"), since it is still on the stack after the LOAD. In this case, the JMC op-code will cause the logic to block (i.e., continually jump back to label "L1") for as long as the status of the property is still "pending". In other words, use of the statement "@Thermostat.setpoint:=60;" causes the logic to wait until the assignment has been acknowledged before proceeding to the next statement. The end result is an elegant solution to solving a prevalent problem in conventional control languages.

Another control-related feature of the base scripting language, according to an embodiment, is the ability to directly address device properties within the syntax of the language (e.g., as in "@Thermostat.setpoint" in the example above). In addition, due to the schema of the underlying data architecture and subscribed to by script execution environment 150 at startup, the base scripting language already knows the data type of the referenced property without the need for any declarations. In other words, everything about the devices and their properties is discovered at runtime, such that there is no need for any edit, compile, or build cycles to make changes. The makes the base scripting language adaptive in a manner that other languages are not.

In an embodiment, devices can be referenced by name, ID, or both name and ID. Thus, the full syntax for the reference above might be "@Thermostat[deviceID].setpoint". This is the format used by scripts derived from the GUI scripting language. The logic of script execution environment 150 (e.g., within a parser or VM 230) attempts to resolve the referenced device (1) firstly, by its ID if present, and (2) secondly, if that fails, by its name. The result is that a script can be copied from one gateway 120 to another gateway 120, and, even though the device ID in the copied script may be invalid, if a similarly-named device exists on the new gateway 120, the copied script will run normally on the new gateway 120. Specifically, script execution environment 150 will transparently update missing IDs in the copied script to the ID of the first device on the new gateway 120 that has the same name as the referenced device. Similarly, if a device is renamed, when script execution environment 150 (e.g., VM 230) discovers that the renamed device referenced in an executing script does not exist (i.e., because it has been renamed), VM 230 looks up the new name by the ID of the referenced device, and if found, automatically changes the name of the device in the script to the new name. The script continues to run normally without interruption. This combination of features eases setup of complex installations by automatically editing scripts to adapt them to specific device configurations of the current gateway 120 on which they are executing.

In an embodiment, the base scripting language supports device groups. Device groups are represented as virtual devices that can contain collections of any number of physical devices and/or other virtual devices. Device groups enable the creation of generic scripts, which is a highly advantageous feature in the control context. In addition, device groups enable the assignment of a value to a property of all device group members (i.e., all physical or virtual devices within the device group) using a single statement (i.e., a single assignment operation).

In an embodiment, the base scripting language provides a "trigger" statement, as described elsewhere herein. The "trigger" statement is a control-specific syntactic construct that responds to edges (i.e., state transitions) for device property values or other values.

In an embodiment, the base scripting language unifies the concept of script activation and deactivation in either a synchronous form (as with a standard function call) or an asynchronous, threaded form through the simple use of the keyword "concurrently". The keyword "concurrently" creates a simple, yet powerful, threading metaphor that is ideal for complex control system tasks that involve many independent threads operating in parallel and in a tightly coordinated manner. Language support for passing parameters by reference or value, in either synchronous or asynchronous forms, provides extensive support for the kinds of parallelism that are commonly required in control system applications, while maintaining simplicity of use.

Advantageously, the combination of the interpreted nature of the base scripting language with the underlying VM architecture provides a small footprint, both in memory and in the controller 130, as well as fast performance for embedded and control applications, while providing a rapidly adaptive script execution environment 150.

5.2. Parsing the JSON Data-Encoding Standard

In an embodiment, the data architecture is implemented using the JSON standard to encode commands and data in all communication packets. As a result, all components of the data architecture may parse and interpret JSON data containing a variety of information. To this end, a generic JSON parsing abstraction can be utilized to create parsers for each distinct usage. This abstraction may be based on the abstraction in the '130 patent, and utilize the API functions of UT_InitJSON( ), UT_TermJSON( ), and UT_ParseJSON (constCharPtr aString, UT_JSONCallback aCallback, long context). UT_InitJSON( ) clones a generic JSON parser created from the JSON language specification in Listing 4 below:

Listing 4: Basic JSON Language Specification

```
// Lexical Analyzer specification
<begin> JSON
= kNoCaseStates
128    { .        }.    [ .    ] .    , .    true    false    null    <eol> 128 ... 135
 : .             //.                                                    <eol> 136 ... 137
<next>
0 1 1 a z              <eol> 1 = Identifier // token 1 - only needed to parse BNF itself, not JSON
```

Listing 4: Basic JSON Language Specification

```
0 1 1 _ _                   <eol> more identifier
1 1 1 0 9                   <eol> more identifier
0 0 100 + +                 <eol> sign preceeds number
0 0 100 - -                 <eol>
100 100 3 0 9               <eol>
0 0 3 0 9                   <eol> 3 = decimal integer
3 3 3 0 9                   <eol> more decimal integer
3 3 101 . .                 <eol> start of fp number
101 101 4 0 9               <eol> 4 = floating point number
4 4 4 0 9                   <eol> more fp number
0 0 102 " "                 <eol> begin string constant...
102 102 12 " "              <eol> 12 = string constant
102 102 103 \\              <eol> for now we only allow simple single character escapes
102 103 102                 <eol> what follows must be character or escape char
// Parser specification:
<begin> JSON
= kBeGreedyParser+kPreserveBNFsymbols+kNoProgress
file              ::= opt_object <@1:7> <endf>              // file can be empty!
opt_object        ::= <null> <or> object
object            ::= <@1:6> { opt_objMembers } <@1:1>
opt_objMembers    ::= <null> <or> member omore_members
member            ::= <12:String> : <@1:2> value <@1:10>
value             ::= simple_value <@1:3> <or> array <or> object
simple_value      ::= <12:String> <or> number <or> true <or> false <or> null
number            ::= <3:DecInt> <or> <4:Float>
array             ::= <@1:4> [ opt_arrContent ] <@1:5>
opt_arrContent    ::= <null> <or> value om_values
omore_members     ::= <null> <or> , <@1:8> member omore_members
om_values         ::= <null> <or> , <@1:9> value om_values
<end>
```

The JSON parsing wrapper registers a single plug-in function with the library parser abstraction (as in the symbols "<@1:n>" in the language specification). The various values of "n" that are treated as special cases within plug-in 1 are symbolically referred to as follows:

| | | |
|---|---|---|
| #define kJSON_endObject | 1 | // Callback at object completion |
| #define kJSON_newMemberName | 2 | // Callback at member name |
| #define kJSON_newMemberVal | 3 | // Callback at member simple value |
| #define kJSON_beginArray | 4 | // Callback at array begin |
| #define kJSON_endArray | 5 | // Callback at array end |
| #define kJSON_beginObject | 6 | // Callback at start of object |
| #define kJSON_endFile | 7 | // Callback at end of file |
| #define kJSON_addMember | 8 | // Callback at start of each additional member |
| #define kJSON_addValue | 9 | // Callback at start of each additional value (in an array) |
| #define kJSON_endMember | 10 | // Callback at end of a member |

Given this, to implement a specific JSON parser, an appropriate handler of type UT_JSONCallback need only be supplied to UT_ParseJSON( ). Most of the work of such handlers is examining the "path" within the JSON in order to extract and process significant data. Since there are many different parsers (differing primarily in detail, rather than structure), they cannot all be described herein. Instead, the technique will be illustrated using a simple parser: a "pretty printer" for JSON that simultaneously checks the syntax for any JSON and converts the JSON to human-readable form. This parser may be used wherever JSON is generated, as a cross check. In cases in which the primary goal is syntax checking, the human-readable output may be discarded. The following shows the C source code for implementing the "pretty printer":

```c
static Boolean UT_PrettyPrintCallback(//JSON parser
callback to pretty print JSON
    ET_ParseHdl    aParseDB,        // I:Parser database
    int32          aFunctSelector,  // I:Function selector
    long           context          // IO:Caller context
)    // R:TRUE for success, FALSE otherwise
{
Boolean                    ret = YES;  // Trivial callback
                                       pretty prints the JSON
ET_StackValue              val;
int32                      typ;
charPtr                    cp;
UT_PrettyPContextPtr       pcP;
char                       tmp[STRINGBUFFSIZE];
ENTER(UT_PrettyPrintCallback);
pcP = (UT_PrettyPContextPtr)context;
switch ( aFunctSelector )          // Switch based on why
                                   we were called
{
    casekJSON_endObject:    // end 'object'
        if ( pcP->nesting > 0 ) pcP-> nesting--;
        cp = &pcP->indents[sizeof(pcP->indents)-1-pcP-> nesting];
        US_sprintf(tmp,EOL_STR "%s}"cp);
        US_GrwAndCatN(pcP->string,tmp,&pcP-> n);
        break;
    casekJSON_newMemberName:        // new member string
        ret = PS_EvalIdent(aParseDB,TOP);
        if ( !ret ) break;
        val = PS_GetValue(aParseDB,TOP);
        cp = &pcP->indents[sizeof(pcP->indents)-1-pcP-> nesting];
        US_sprintf(tmp,EOL_STR "%s\" %s\" : "cp,val.ptr);
        US_GrwAndCatN(pcP->string,tmp,&pcP-> n);
        break;
    casekJSON_newMemberVal:         // after member value
        ret = PS_EvalIdent(aParseDB,TOP);
        if ( !ret ) break;
        val = PS_GetValue(aParseDB,TOP);
        typ = PS_StackType(aParseDB,TOP);
        switch ( typ & kRawTypeMask )
        {
            case0:                  // This means it
                                    has no value
                US_GrwAndCatN(pcP-> string,"null",&pcP-> n);
```

```
            break;
        casekIntValue:
            if ( (PS_GetElemFlags(aParseDB,TOP) &
                kIntIsBoolean) !=0 )
                US_strcpy(tmp,(val.IValue) ? "true" : "false");
            else
                US_sprintf(tmp,I64S,val.IValue);
            US_GrwAndCatN(pcP->string,tmp,&pcP-> n);
            break;
        casekRealValue:
            US_sprintf(tmp,"%.3f",val.dValue);
            US_GrwAndCatN(pcP-> string,tmp,&pcP-> n);
            break;
        casekStringValue:
            US_sprintf(tmp,""%s₩ ""val.ptr);
            US_GrwAndCatN(pcP-> string,tmp,&pcP-> n);
            break;
        casekSymbolValue:
        casekIsAReference:
        default:
            US_GrwAndCatN(pcP->string,"???", &pcP-> n);
            break;
        }
        break;
    casekJSON_beginArray:                    // begin array
        cp = &pcP->indents[sizeof(pcP->indents)-1-pcP-> nesting];
        US_sprintf(tmp,EOL_STR "%s]"cp);
        US_GrwAndCatN(pcP->string,tmp,&pcP-> n);
        pcP-> nesting++;
        break;
    casekJSON_endArray:                      // end array array
        if ( pcP->nesting > 0 ) pcP-> nesting--;
        cp = &pcP->indents[sizeof(pcP->indents)-1-pcP-> nesting];
        US_sprintf(tmp,EOL_STR "%s[",cp);
        US_GrwAndCatN(pcP->string,tmp,&pcP-> n);
        break;
    casekJSON_beginObject:                   // begin 'object'
        cp = &pcP->indents[sizeof(pcP->indents)-1-pcP-> nesting];
        if ( (*pcP->string)                  // if this is 1st time,
                                             omit the new line
            US_sprintf(tmp,EOL_STR "%s{",cp);
        else
            US_sprintf(tmp,"%s{",cp);
        US_GrwAndCatN(pcP->string,tmp,&pcP->n);
        pcP-> nesting++;
        break;
    casekJSON_endFile:                       // end file
        US_GrwAndCatN(pcP->string,EOL_STR,&pcP->n);
        break;
    casekJSON_addMember:                     // at start of each
                                             additional member
        US_GrwAndCatN(pcP->string,",",&pcP->n);
        break;
    casekJSON_addValue:                      // at start of
                                             each additional value
        US_GrwAndCatN(pcP->string,",",&pcP->n);
        break;
    casekJSON_endMember:                     // at end of member
        break;
    }
    RETURN(ret);
}
```

All functions called in the "pretty printer" implementation are supplied by libraries associated with and described in the '130 patent. In essence, the code keeps track of nesting in the "context" (see "pcP→") and uses this to indent and format the output, which is built up within "pcP→string". At the same time, the parser checks the syntax of the JSON itself and reports any errors in the syntax.

When more specialized parsers of the data architecture are described herein, their implementations can be assumed to be fundamentally similar to the "pretty printer", even if more specialized and complex.

While JSON encoding is utilized in the described parser, it should be understood that other encodings can be used by replacing the described parser in the underlying data architecture. Thus, there is nothing in the data architecture that fundamentally requires JSON encoding.

5.3. Conversion from GUI Script

Figure 6A:
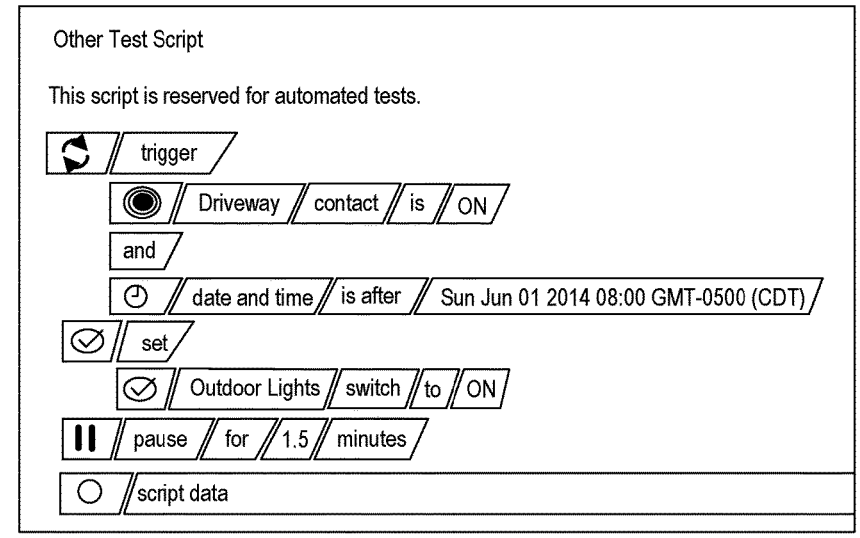
FIGS. 6A-6I illustrate user interfaces for creating a script, according to an embodiment.

FIG. 6A illustrates the appearance of the scripting GUI for a simple example script, according to an embodiment. The illustrated script comprises a "trigger" statement that, after a specified date, when a driveway contact sensor is activated, turns on all lights in the device group "Outdoor Lights" for a period of 1.5 minutes.

The scripting GUI comprises a visual representation of the underlying data that has been generated by user interactions with the scripting GUI. The underlying data comprises a GUI script object, which describes the GUI appearance and will be converted (e.g., by script converter 212) into a script in the base scripting language prior to execution. In an embodiment that uses JSON encoding, the JSON-encoded output for the GUI script in FIG. 6A may be as follows in Listing 5 (formatted for ease of reading, and with some aspects of the JSON, which are associated with the scripting GUI itself and are ignored by the conversion process, omitted for clarity):

Listing 5: JSON-encoded output for example scripting GUI illustrated in FIG. 6A

```
{ "method" : "POST" "body" :
  [ { "op" : "put", "ref" : "ODYxMTMxYZZ", "properties" :
    { "category" : "NzYwMjQyLj", "description" :
      { "value" : "This script is reserved for automated tests.",
      "status" : "ack" },
      "gateway" : "gw34556", "id" : "ODYxMTMxYZZ",
      "name" : { "value" : "Other Test Script", "status" : "ack" },
      "SysSCRIPT" :
      { "value" :
        { "type" : "script", "trigger" :
          { "type" : "trigger", "condition" :
            { "lhs" :
              { "type" : "deviceCondition", "lhs" :
                { "type" : "ref", "about" :
                  { "type" : "Device", "name" : "Driveway",
                    "icon" : "bullseye", "color" : "olive"
                  }, "property" : "contact" , "$ref" :
                  "MTU1MzMxLjU4M"
                },
                "op" : "isEqual",
                "rhs" : ( "type" : "BooleanValue" "value" :
                true, "label" : "ON" }
              }, "type" : "and",
              "rhs" :
              {
                "type" : "dateTimeCondition" "lhs" :"dateTime",
                "op" : "isAfter", "rhs" :
                { "type" : "DateTimeValue",
                  "label" : "Sun Jun 01 2014 08:00:00
                  GMT-0500 (CDT)",
                  "value" : "2014-06-01T08:00-05:00"
                } } }
            }, "block" :
            [ { "type" : "set", "lhs" :
              { "type" : "ref", "about" :
                {
                  "type" : "Group", "name" : "Outdoor Lights",
                  "icon" : "power-off", "color" : "olive"
                }, "property" : "switch", "alias" : true,
                "$ref" : "OTU2NDQ3LjExODY"
              }, "op" : "to",
              "rhs" : {"type" : "BooleanValue", "value" :
              true, "label" : "ON" }
            },
            { "type" : "pause", "op" : "for",
              "rhs" : { "type" : "TimeIntervalValue" ,
              "value" : 1.500, "unit" :
              "minutes"
            }
          } ]
```

Listing 5: JSON-encoded output for example
scripting GUI illustrated in FIG. 6A

```
      }, "status" : "ack"
    } } }
  ], "uri" : "sysmap://systech.com/systech/alpha/gw34556/script"
}
```

In the JSON-encoded output in Listing 5, there is a one-to-one correspondence between the GUI appearance and the actual data content expressed in the various JSON key-value pairs. It should be clear that this JSON-encoded format may not be suitable for direct use as a programming language or for direct execution within a parser. Accordingly, in an embodiment, the JSON-encoded output is converted to a form that can be parsed by standard parsing techniques and which conforms to the grammar constraints commonly applied to all programming languages designed for machine execution. In particular, programming language grammars tend to be LL(1) or similar (e.g., LALR(1)) to make them tractable for machine execution. Thus, the scripting GUI output is not itself a programming language, and, due to the constraints implied by a GUI-based generation mechanism, the scripting GUI output may not be able to express more complicated programming constructs.

In an embodiment, a conversion process is used to convert output representing a GUI-created script (referred to herein simply as a "GUI script") into the base scripting language. This conversion process may be implemented as script converter 212. Notably, the scripting GUI can express a small, but useful, subset of the base scripting language that is designed to allow non-technical persons to express simple scripting behaviors, such as the one in the example above.

The process for parsing data is described elsewhere herein. This same approach may be used to create a parser implementing script converter 212. In such a parser, tracking the current path within the data and generating output in the base scripting language constitutes the bulk of the work. For example, when the parser path ends in ":{:SysScript:{:value:{:trigger:{:type", as in Listing 5, the parser determines that it is beginning to process a scripting GUI "trigger" statement within an implied infinite loop. Thus, the parser will push "while(true) {", and will push an additional "}" when the path ":{:SysScript:{:value" completes in order to generate the end of the implied "while" block. All other parsing activities within the handler passed to UT_ParseJSON( ) are similar in structure, but differ in specifics according to the particular language element at issue.

The output from the parser parsing the JSON-encoded output in Listing 5 is illustrated in Listing 6 below, according to an embodiment:

Listing 6: Base scripting language script corresponding to Listing 5

```
script Other_Test_Script[ "ODYxMTMxYZZ" ] "[Other Test Script]
This script is reserved for automated
tests."
{
  while ( true )
  {
    trigger ( @Driveway[MTU1MzMxLjU4M].contact == true and
        StringToTime( ) > StringToTime
           ("2014-06-01T08:00-05:00") )
    {
```

Listing 6: Base scripting language script corresponding to Listing 5

```
      @Outdoor_Lights[OTU2NDQ3LjExODY].switch = true;
      pause(1.5,"minute");
    }
  }
}
```

Notably, as shown in Listing 6, all unneeded data-architecture elements have been discarded, and the parts that are significant have been converted into the base scripting language. In addition, the name of the GUI script (i.e., "Other Test Script"), the ID of the GUI script, and the description of the GUI script (to which the "raw" name of the GUI script has been prepended) are preserved in the base-language script.

Figure 6B:
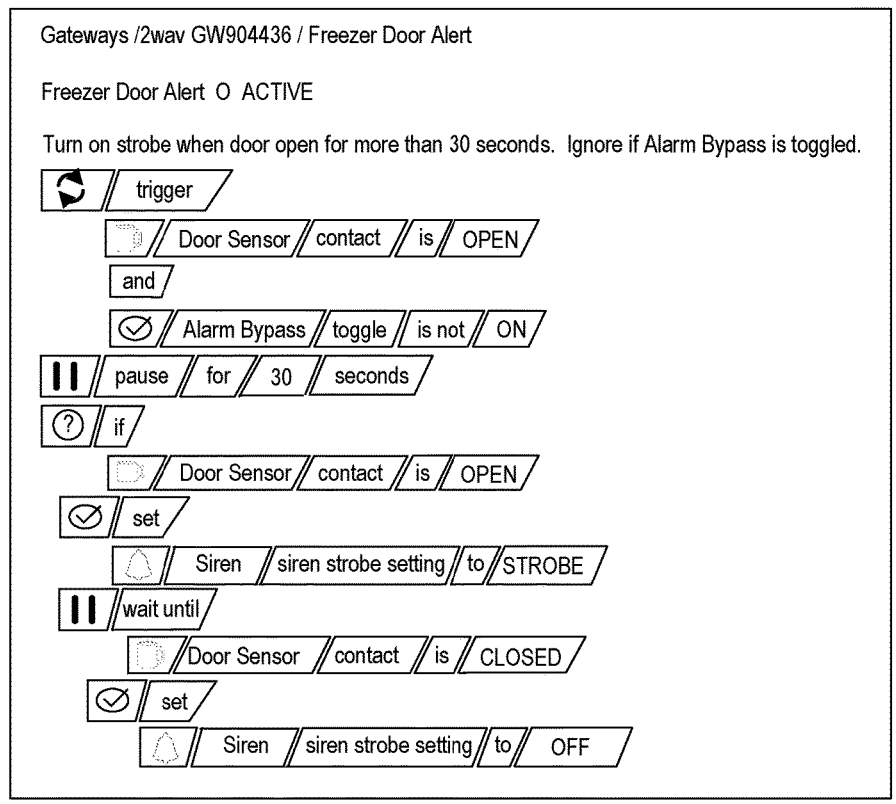
Figure 6C:
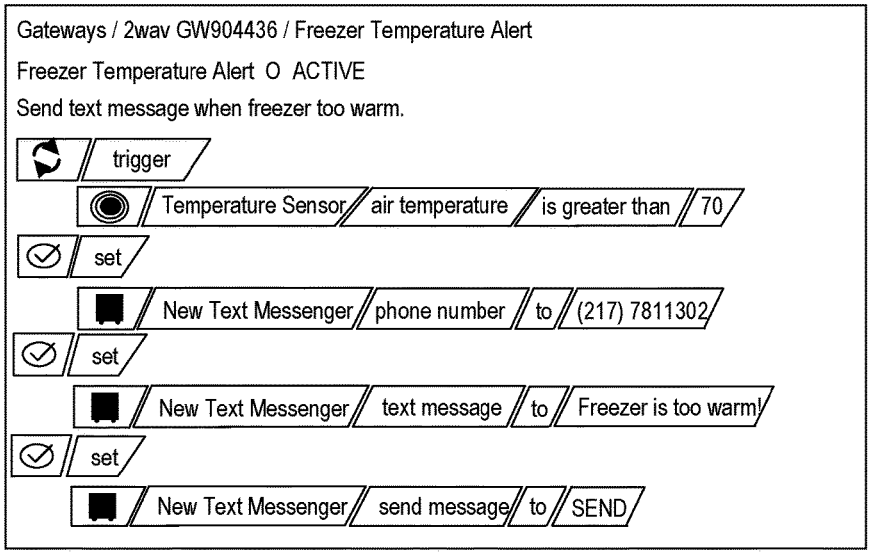
Figure 6D:
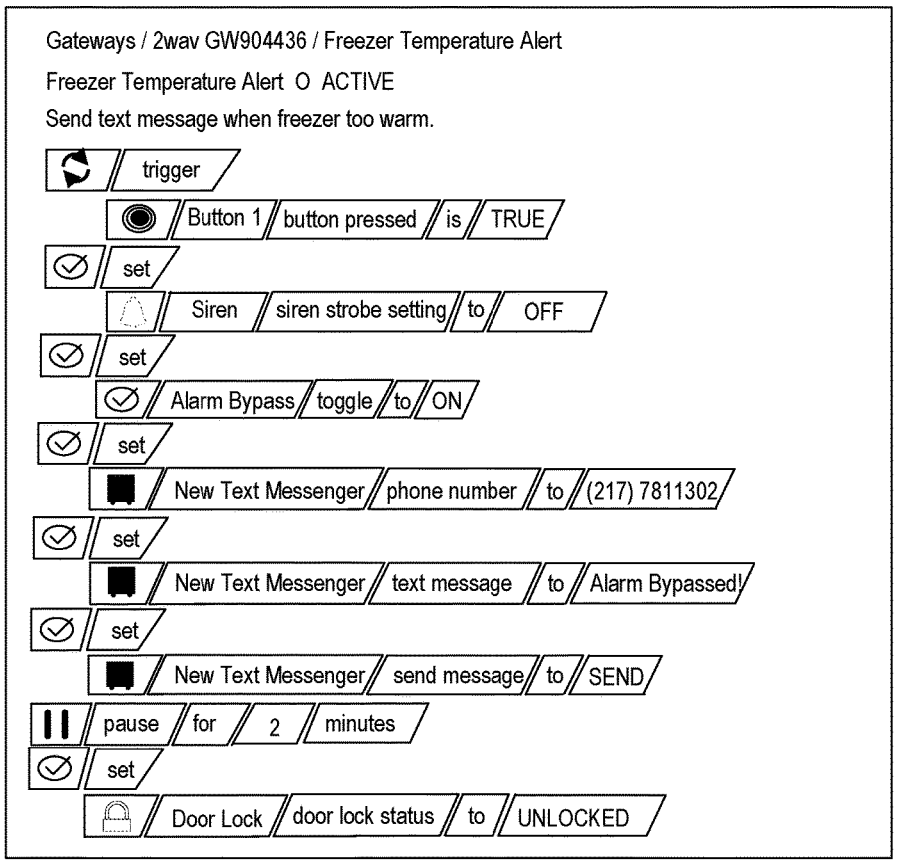
Figure 6E:
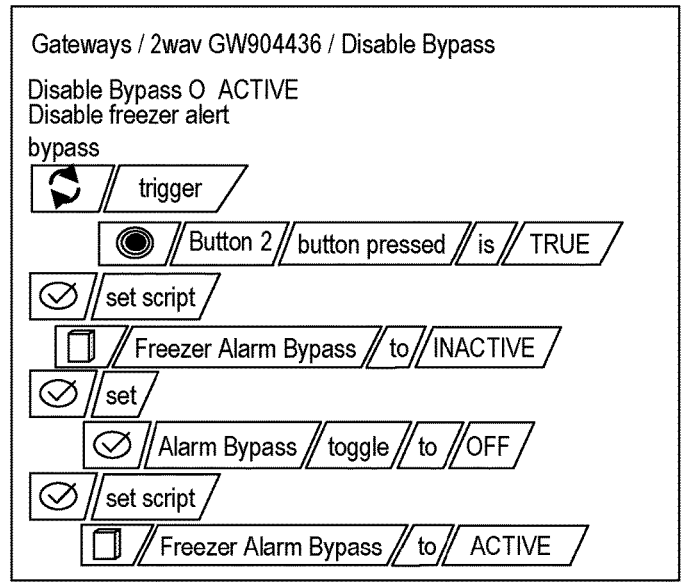
Figure 6F:
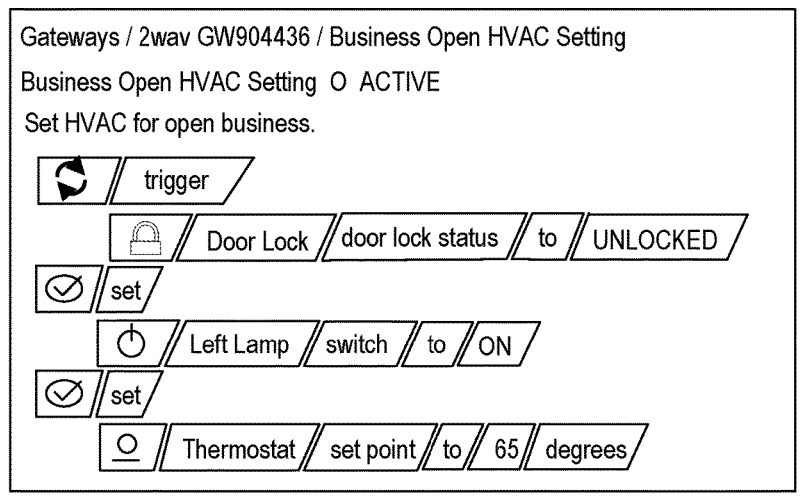
Figure 6G:
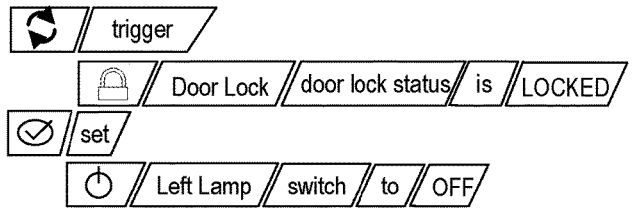
Figure 6H:
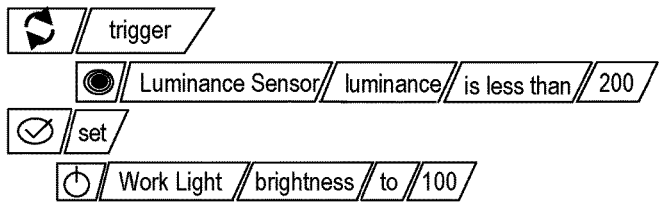
Figure 6I:
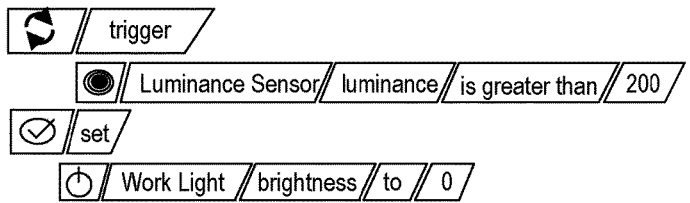

For the purposes of further illustration, the output for several additional example scripts are demonstrated, with respect to FIGS. 6B-6I, in the computer program listing appendix: the output for the scripting GUI shown in FIG. 6B is demonstrated in the file named "OutputForScriptingGUIShownInFIG. 6B.txt", the output for the scripting GUI shown in FIG. 6C is demonstrated in the file named "OutputForScriptingGUIShownInFIG. 6C.txt", the output for the scripting GUI shown in FIG. 6D is demonstrated in the file named "OutputForScriptingGUIShownInFIG. 6D.txt", the output for the scripting GUI shown in FIG. 6E is demonstrated in the file named "OutputForScriptingGUIShownInFIG. 6E.txt", the output for the scripting GUI shown in FIG. 6F is demonstrated in the file named "OutputForScriptingGUIShownInFIG. 6F.txt", the output for the scripting GUI shown in FIG. 6G is demonstrated in the file named "OutputForScriptingGUIShownInFIG. 6G.txt", the output for the scripting GUI shown in FIG. 6H is demonstrated in the file named "OutputForScriptingGUIShownInFIG. 6H.txt", and the output for the scripting GUI shown in FIG. 6I is demonstrated in the file named "OutputForScriptingGUIShownInFIG. 6I.txt".

In an embodiment, full error checking is performed (e.g., by script converter 212 or compiler 220), and any errors that occur in the conversion process are reported. The error-checking of the generated base-language script may be performed in a similar manner as the error-checking performed by the "pretty printer" parser for JSON. Specifically, the error checking may comprise a parser build using the syntax of the base scripting language, but without actual execution of the script. In an embodiment, this parser (e.g., implemented by compiler 220) may also generate the VM output for optional loading into VM 230.

Notably, for development and testing, a full base-language parser that is capable of executing base-language scripts, without compilation into a VM program, is useful. However, for optimization purposes, a VM compiler 220 may be used instead to compile scripts into VM programs that can be executed by VM 230.

5.4. Script Manager

In an embodiment, script manager 210 is primarily responsible for storing and retrieving scripts in the base scripting language (either created in the base scripting language or converted from an output of the scripting GUI) within the file system of each gateway 120. The file system of each gateway 120 stores a persistent local copy of a script registry 214 (e.g., in database 132).

In an embodiment, script manager 210 performs one or more of the following functions:

Saving converted GUI scripts received from script converter 212 to script registry 214;

Loading scripts from script registry 214 into compiler 220 for conversion to a VM program and subsequent execution;

Deleting scripts from script registry 214 in response to reception of a "delete" command (e.g., from platform 110);

Activating and deactivating scripts in response to commands (e.g., from platform 110 and/or other scripts);

Maintaining the parent-child relationships between parsers and/or VM programs; and/or Listing and searching script registry 214 (e.g., for utility purposes).

5.5. Script Registry

In an embodiment, scripts are saved in a script registry 214 as simple text files (e.g., with an extension of ".syt"). The particular directory of the file system or database (e.g., database 132) used to store the scripts making up script registry 214 may be a configurable option.

5.6. Compiler

In an embodiment, compiler 220 compiles scripts in the base scripting language into VM programs which can be loaded and executed within VM 230. Scripts may be automatically compiled into the equivalent VM program as they are loaded into VM 230. The compilation process may be performed according to an identical language specification as the base-language parser described herein. The only difference with the base-language parser is that, instead of executing a script as it is parsed, compiler 220 converts the entire script into VM form prior to any execution. Scripts in VM form may look similar to programs in assembly language and comprise a number of basic op-codes that are understood by VM 230. Listing 7 below illustrates the VM program for the script in Listing 6 (which was, in turn, derived from the GUI script in Listing 5), output by compiler 220, according to an embodiment:

| Listing 7: VM form of base-language script in Listing 6 |
| --- |
| ;1:script Other_Test_Script [ "ODYxMTMxYZZ" ] "[Other Test Script] This script is reserved for automated tests." |
| PUSH  "ODYxMTMxYZZ" |
| PUSH  "[Other Test Script] This script is reserved for automated tests." |
|    ;2: { |
|      ;3: while ( true ) |
| L1: |
| PUSH  #true |
| JMC  "while", L2 |

| Listing 7: VM form of base-language script in Listing 6 |
| --- |
|    ;4: { |
|      ;5:  trigger ( @Driveway[MTU1MiMxLJU4M]. contact == true and StringToTime ( ) > StringToTime("2014-06-01T08:00-05:00") ) |
| L3: |
| PUSH  @Driveway[MTU1MiMxLJU4M].contact |
| PUSH  #true |
| EQU |
| PUSH  "StringToTime" |
| CALL  0 |
| PUSH  "StringToTime" |
| PUSH  "2014-06-01T08:00-05:00" |
| CALL  1 |
| GT |
| LAND |
| JMC  "trigger", L4 |
|    ;6: { |
|      ;7:  @Outdoor_Lights[OTU2NDQ3LJExODY]. switch = true; |
| PUSH  "@Outdoor_Lights[OTU2NDQ3LJExODY].switch" |
| PUSH  #true |
| LOAD |
|    ;8:  pause(1.5,"minute"); |
| PUSH  #1.5 |
| PUSH  "minute" |
| PAWS  2 |
|    ;9:  } |
|    ;10:  } |
| L4: |
| POP |
| JMP  L1 |
| L2: |
|    ;11:} |
| RET |

Notably, in the illustrated example, the VM program, represented in Listing 7, includes the entire source code of the original base-language script as comment lines. Comment lines are preceded by a semicolon which is the line-comment delimiter in the illustrated embodiment of the VM assembler. Within each comment line, the source code is preceded by its line number in the source code, as loaded by script manager 210 from script registry 214. These comments with line numbers and source code can be used by debugging tools provided within script execution environment 150. For example, a "breakpoint" may be placed on any source line within an VM program in order to examine the state at that point in program execution.

In an embodiment, during startup of script execution environment 150, a first "primordial" parser, from which all other parsers are cloned, is created, and a second compiler parser (e.g., implementing compiler 220) is created, based on the base-language specification in Listing 1 and Listing 2, as follows:

```
LX_LoadLEX (NULL,aLanguage,YES, &oneCats,
    &catRanges,&options,NULL);         // load in the lex definitions for our parser
lex = LX_MakeDB (0, (oneCats) ? *oneCats : NULL, (catRanges) ? *catRanges : NULL,options);
if ( oneCats ) KILL_HDL (oneCats) ;
if ( catRanges ) KILL_HDL (catRanges);   // don't need these guys any more!
if ( lex ) LX_SubDelimiter (lex, '_');   // underscore is not a delimiter in our language
bnf = PS_LoadBNF(NULL, aLanguage,YES, &poptions);    // now load the corresponding BNF definition
US_ReplaceSeguence (bnf, "<@0:",          // replace a zero plugins by 2 so we can use
        "<@2:");                          // 'em to generate output instead of doing it!
parser = PS_MakeDB (*bnf, lex, poptions, 0,0);    // make the parser database
KILL_HDL(bnf);
PS_SetPlugIn(parser, &MA_MarlinPlugInOneX, 1);   //attach our plug-in and resolver functions
PS_SetPlugIn(parser, &MA_MarlinPlugInTwoX, 2);   // . . . this replaces the standard plugin 0
PS_SetResolver(parser, (ET_ParseResolver) &MA_MarlinResolverOneX);
PS_RegisterParser(parser,"MarlinX");    //register using same lang. name with a trailing 'X'
```

All function calls in the above code are to the library associated with the underpinning abstractions for lexical analysis and parsing, as described in the '430 patent and the '130 patent, respectively.

Notably, after loading the BNF, the above code replaces all occurrences of the sequence "<@0:" with the sequence "<@2:". In an embodiment, plug-in zero is provided by the parser abstraction and actually executes the corresponding operation. When used for compilation and syntax checking, it is generally not desirable to actually execute the program.

Thus, to prevent the occurrence of the abstraction's plug-in zero calls, the language is modified to reference plug-in two instead. Instead of executing the operation, plug-in two generates the appropriate VM output. A reference to this plug-in is passed to the parser abstraction in the statement "PS_SetPlugin(parser, &MA_MarlinPlugInTwoX, 2)" in the code. The implementation of MA_MarlingPlugInTwoX( ), in the formalism of the parser abstraction, may be expressed as:

```
switch ( aFunctSelector )      // do switch on why we were called
{
    case  0:  US_SprintfCatHdl (mcP->output,"\tNOP" EOL_STR);    // No op
              break;
    case  1:  US_SprintfCatHdl (mcP->output,"\tTRN" EOL_STR);    // Ternary operator (?)
              break;
    case  2:  US_SprintfCatHdl (mcP->output,"\tLOR" EOL_STR);    // logical OR (or)
              break;
    case  3:  US_SprintfCatHdl (mcP->output,"\tLAND" EOL_STR);   // logical AND (and)
              break;
    case  4:  US_SprintfCatHdl (mcP->output,"\tOR" EOL_STR);     // bitwise or (|)
              break;
    case  5:  US_SprintfCatHdl (mcP->output,"\tXOR" EOL_STR);    // bitwise xor (^)
              break;
    ...
    etc. for all <@0:n> forms up to bitwise inversion (~) #22
}
```

As illustrated, all the plug-in has to do is output the appropriate VM op-code corresponding to the original "<@0:n>" operator detailed in the '130 patent.

In an embodiment, plug-in one (i.e., MA_MarlinPlugInOneX) is responsible for doing something similar to plug-in two. However, plug-in one outputs the appropriate VM op-codes implied by the corresponding "<@1:n>" points in the original base-language specification in Listing 2. The generation and referencing of jump labels, implied by conditional and loop constructs, are handled by tracking nesting depth in the base-language script within the parser (similarly to the description of the JSON "pretty printer") and using the current depth to generate label numbers appropriate to the jumps involved. The label-resolution problem is addressed in two phases. The first phase generates labels and labels references symbolically based on nesting depth, without actually resolving to a specific label (e.g., L1 . . . L4 in Listing 7). The second phase is invoked on an error-free call to "kResolverSayByeBye" (see the '130 patent), and handles conversion of these symbolic depth-based labels to the actual sequential and unique label numbers, for example, illustrated in the final VM output of Listing 7.

In an embodiment, in the "resolver" function (i.e., MA_MarlinResolverOneX) that completes VM compiler 220, the "kResolverEvaluate" and "kResolverAssign" code is essentially empty, since the parser is simply compiling the script, rather than executing the script. All remaining action is constrained to the "kResolverNoAction" case, which may be handled as follows:

```
if ( aType == 0)                // this is a call as we 1st encounter a token
{
    PS_CallBuiltInLex(aParseDB);        // call the built-in lex analyzer
    PS_GetTokenState(aParseDB,&curTokPtr,&curTokSize,&curTokNum,
            &curLinePtr,&curLineBuft&parseLexer);
    if ( (i = (int32)PS_GetLineCount(aParseDB)) != mcP-> lastLC )
    {
    US_SprintfCatHdl(mcP->output,'\W \W \W \W t;" I32S ":%s",i,curLineBuff);
    mcP->lastLC = i;
    }
}
```

```
tokenNumber = curTokNum;
if ( tokenNumber == kEndBlkCmnt )          // '*/' - end block comment so.. revert lex
{
  PS_ClrFlags(aParseDB,kEatEverythingMode);
  PS_SetTokenState(aParseDB,curTokPtr,curTokSize,-3); // tell the parser to ignore the token
} else if ( PS_GetFlags(aParseDB) & kEatEverythingMode )   // we're in eat everything mode so...
{
  if ( tokenNumber)                          // don't mess with end of line tokens
        PS_SetTokenState(aParseDB,curTokPtr,curTokSize,-3);
} else if ( tokenNumber == kBeginBlkCmnt )   //'/*' - begin block comment so..inhibit lex
{                                            // what is the lexical analyzer pointing at?
    PS_SetFlags(aParseDB,kEatEverythingMode);   // eat everything mode/ block comment
    PS_SetTokenState(aParseDB,curTokPtr,curTokSize,-3); // tell the parser to ignore the token
} else if ( tokenNumber == kLineCmnt ) //'//'- line comment, kill to end of line
{
    PS_SetTokenState(aParseDB,curTokPtr,curTokSize,0);   // tell the parser it reached the end of the
line
  }
} else if ( aType == −1)                    // This is when it accepts the token
{
    PS_GetTokenState(aParseDB,&curTokPtr,&curTokSize,&curTokNum
                    &curLinePtr,&curLineBuft&parseLexer);
    switch ( tokenNumber )
    {
    case 1:                                  // symbols
        if ( (mcP->flags & kScriptPreambleComplete) != 0 )
        {   // NOTE: the '=' test below makes LHS of assignment a string, not a symbol/proprty
        cp = curLinePtr;
        while (*cp && US_IsSpace(0,*cp) ) cp++;          //taken advantage of in MVM execution
        if ( *cp == '(' || (*cp == '=' && cp[1] != '=') )
            US_SprintfCatHdl(mcP->output,'₩ tPUSH₩ ₩ "%.*s₩ '₩ n",
(int)curTokSize,curTokPtr);
        else
            US_SprintfCatHdl(mcP->output,'₩ tPUSH₩ ₩ "%.*s₩ '₩ n",(int)curTokSize,curTokPtr);
        }
        break;                               // device properties
    case 6:
        cp = curLinePtr;
        while (*cp && US_IsSpace(0,*cp)) cp++;       // Note: logic to detect := operator
        if ( ( (*cp == '=' && cp[1] != '=') || (*cp == ':' && cp[1] == '=') )
            US_SprintfCatHdl(mcP->output,'₩ tPUSH₩ t₩ t%.*s₩ n",(int)curTokSize,curTokPtr);
        else
            US_SprintfCatHdl(mcP->output,'₩ tPUSH₩ t%.*s₩ n",(int)curTokSize,curTokPtr);
        break;
    case 2: US_SprintfCatHdl(mcP->output,'₩ tPUSH₩ t#'%.*s₩ n'"(int)curTokSize,curTokPtr); break;
    case 3:                                  // various kinds of numbers
    case 4:
    case 5:
    case 7:
        case 10:US_SprintfCatHdl(mcP->output,'₩ tPUSH₩ t#%.*s₩ n",(int)curTokSize,curTokPtr); break;
        case 12: US_SprintfCatHdl(mcP->output,'₩ tPUSH₩ t%.*s₩ n",(int)curTokSize,curTokPtr); break;
        case kTrueToken: US_GrwAndCat(mcP->output,'₩ tPUSH₩ t#true₩ n"); break;
        case kFalseToken: US_GrwAndCat(mcP->output,'₩ tPUSH₩ t#false₩ n"); break;
        case kUnknownToken: US_GrwAndCat(mcP->output,'₩ tPUSH₩ t#unknown₩ n"); break;
    }
}
... etc.
```

In the above code, called functions are supplied by a library and can be understood with reference to the '130 patent and '430 patent.

The body of the "if(aType==0)" condition implements echoing of base-language source lines to the VM form output, and also implements the logic associated with handling base-language line and block comments.

The body of the "if(aType==1)" condition generates VM "PUSH" opcodes and operands based on the various types of tokens encountered (e.g., strings, integers, reals, Boolean, etc.).

One side effect of the described parser and compiler 220 is the identification of the beginning and end of the script ID, script parameters, and script description, if any, of the base-language source script. This information is utilized by a calling function to handle parameter passing during script activation:

5.7. Script Activation and Deactivation

In an embodiment, the process of script activation is implemented by the function "SU_ActivateScript( )", which is detailed in high-level pseudocode in Listing 8 below:

The call to the "SU_XferParams( )" routine in Listing 8 above passes parameters, by value and by reference, from the calling parser to the local symbol table of the child parser, making the passed parameters available to the child VM program running within VM 230. This may be implemented by extracting the parameter specification text and looping through each parameter to process it based on whether or not it is preceded by the keyword "value" or "reference". The actual value of the passed parameters can be obtained from the calling parser's execution stack, since it will have previously been pushed onto the stack by the "PUSH" instructions that are generated in response to the "activate" statement. If the parameter has been passed by value, a new symbol is created in the local parser's symbol table with the name specified in the parameter specification of the activated script, and assigned the value and data type from the evaluation stack of the calling parser.

On the other hand, if the parameter has been passed by reference, the only legitimate data type is the string data type, which must contain the name of the symbol or property in the calling script's context which the parameter references. In this case, the symbol in the inner scope is set to Listing 8: Logic for script activation

```
Boolean SU_ActivateScript (                        // Activate a named script
    ET_ParseHdl        *aParseDB,                  // IO:In parser requestg run, Out child parser
    constCharPtr       aScript,                    // I:The script name to activate
    int32              opCount,                    // I:Number of script parameters passed
    int32              options,                    // I:Various logical opt. (for MA_RunMarlin)
    MA_MarlinVmProgram launchingProgram            // I:Opt. MVM calling prog. or NULL
                   )                               // R:TRUE for success, FALSE otherwise
{
  if ( launchingProgram )  // If there was MVM launching prog., maybe script we want was declared
  {                        // locally so we can use that & not check the script registry
    scan the launching MVM program statements looking for a declaration of script 'aScript'
    if ( found )
      set initial pgmCtr for child script to the offset where the declaration was found
      i.e., don't execute the main, instead we'll execute the internal sub-script
      clone a Marlin parser for the child script
      set up the child parent relationships between the parsers
      generate a random unique script ID for the child
      if ( opCount )
        pass parameters to the child parser by calling SU_XferParams(pH,cParseDB,...,opCount);
      clone the launching program
      load into MVM
      set the program counter to 'pgmCtr' determined above
      execute using MA_RunMarlin(passing appropriate options)
      if ( program ran to completion (i.e., was NOT activated concurrently)
        set child script not active
        unhook child script from parent
        dispose of the child parser
      if ( found ) goto ImmediateExit;
  }                            // otherwise, the script must be externally defined so continue search...
search memory copy of script registry for the named script
if not found or script is already active
    report error
else
{
    load script from file
    clone a Marlin parser for the child & set up parent/child relationship
    set child script active
    if ( opCount )
        compile the script to MVM form
        pass parameters to child parser as for local logic above
        execute using MA_RunMarlin(passing appropriate options)
        if ( program ran to completion (i.e., was NOT activated concurrently)
          set child script not active
          unhook child script from parent
          dispose of the child parser
}
ImmediateExit:
    return true/false result
}
``` data type "string" and matches the string passed in. However, in addition, the flag "kReferencedSymbol" is set for the symbol so that accessing wrapper code, invoked during VM program execution, can transparently detect that it is a reference and resolve it. The accessing code will recursively detect whenever a symbol is accessed that has the "kReferencedSymbol" flag set, and will resolve that symbol to the symbol in the parent parser. Because this resolution process is recursive, a script may pass a value by reference to a child script that it has itself received by reference from a parent script. The resolution process will proceed recursively from the child script to any ancestral script.

In an embodiment, no parent script, which passes a parameter by reference to one or more child scripts that it has activated using the "concurrent" keyword, is allowed to complete until all such child scripts have completed. Otherwise, a parameter that has been passed by reference may be rendered invalid, by completion of the parent script, during operation of the child script, thereby derailing operation of the child script.

5.8. Virtual Machine

In an embodiment, ultimately all scripts, whether written in the base scripting language or converted from a GUI script produced by the scripting GUI, are executed by VM 230.

5.8.1. VM Program Format

In an embodiment, a compiled script, referred to herein as a "VM program," corresponds to an ordered list of strings containing the text content of each line of the script. For example, in the VM program of Listing 7, each and every line of text, including lines containing only comments or labels, is a separate string value in an ordered list. Each string value can have an associated 64-bit value (real or integer) associated with it as a "tag", as well as a number of logical flags. In an embodiment, VM 230 implements this using the "ET_StringList" structure, based on the flat memory model described in U.S. Pat. No. 7,103,749 ("the '749 patent"), titled "System and Method for Managing Memory" and issued Sep. 5, 2006, which is hereby incorporated herein by reference.

Access to the string list abstraction using such a model is provided by the parser abstraction library in the '130 patent. The following description will be based on an implementation using the string lists of the '749 patent. While alternative implementations may be used, there are a number of reasons to utilize the string lists of the '749 patent as a fundamental representation of a loaded executable VM program, including one or more of the following:

The string list form provides a list of arbitrary-length strings, each with an associated 64-bit tag value that can be utilized for any purpose required by external code;

The string list form supports a logical "flags" keyword associated with each string;

A string list, regardless of the number of strings in the ordered list, requires just a single heap memory allocation. This single allocation is ideal for efficient loading and unloading into VM 230. The fact that all memory is contiguous (unlike a conventional linked list) means that the processor cache generally operates more effectively. String lists themselves can be linked, creating a set of associated string lists. That set of linked string lists may comprise all active VM programs that are loaded in VM 230;

The "flatness" of string lists renders them ideal for passing across queues that pass complex information between preemptive threads or different processes. Advantageously, no serialization and deserialization is required;

Since all strings are within a single memory allocation, a program counter for an executing VM program can be implemented as simply a string offset into the single memory allocation using API calls;

String lists can be easily manipulated and/or displayed by associated debugging code designed to assist script developers. For example, single stepping and breakpoints become simple to implement within such a framework;

String lists are also used extensively throughout the rest of the code for other purposes. For example, symbol tables, a registry search, and a number of other capabilities may be implemented as string lists. This commonality simplifies overall program size and complexity; and/or Similarly to the parser and lexical analysis abstraction, the string list abstraction is mature and well-tested, thereby saving considerable development and debugging effort.

5.8.2. Loading a VM Program

Scripts to be run in VM 230 may first be compiled into VM form (e.g., in the described embodiment, a string list referred to as a "VM program") by compiler 220. The script is then activated, for example, as described in Listing 8. The final step in executing the VM program is to call "MA_RunMarlin( )" with appropriate options passed as parameters. Depending on configuration settings, MA_RunMarlin( ) either executes the program directly within a parser (e.g., for testing/debugging), or normally by loading it into VM 230 (while maintaining a link to the associated parser, for example, to use the symbol table).

The loading process—implemented herein as "MA_MarlinVmProgram"—first takes a pass through the various strings, examining the op-code on each line, if present, and converting the op-code to a binary value, stored in the associated "flags" keyword, so that, during execution, string comparison is no longer required in order to determine the op-code.

Each MA_MarlinVmProgram instance is linked with the chain of all other MA_MarlinVmProgram instances that are currently active and running within VM 230. Execution of a VM program is initiated by being added to this linked list of MA_MarlinVmProgram instances.

By default, the initial program counter is set to the first string in a MA_MarlinVmProgram instance, i.e., the start of the main script, which is always the first in the file. In cases in which scripts are launched that are static local subscripts declared later in the text of a VM program, the program counter is initialized to the start of the subscript, as described in Listing 8. From this point on, the script is executed one op-code at a time in parallel with all other scripts by continuous calls to the "MA_StepMarlinVM( )" function from the main loop of the VM process.

5.8.3. Defined VM Op-Codes

In an embodiment, VM 230 may support one or more of the following op-codes:

TABLE 1

Example Supported Op-Codes

| Op-Code | Operator | Operation |
|---|---|---|
| NOP | N/A | does nothing |
| TRN | ? | ( s[2] ) ? s[2] = s[1] : s[2] = s[0]. Pop stack twice, i.e., C ternary operator. |

TABLE 1-continued

Example Supported Op-Codes

| Op-Code | Operator | Operation |
|---|---|---|
| LOR | or | s[1] \|\| s[0]. Boolean result replaces s[1], pop stack. |
| LAND | and | s[1] && s[0]. Boolean result replaces s[1], pop stack. |
| OR | \| | s[1] \| s[0]. Result replaces s[1], pop stack. |
| XOR | ^ | s[1] ^ s[0]. Result replaces s[1], pop stack. |
| AND | & | s[1] & s[0]. Result replaces s[1], pop stack. |
| EQU | == | s[1] == s[0]. Boolean result replaces s[1], pop stack. |
| NEQ | != | s[1] != s[0]. Boolean result replaces s[1], pop stack. |
| LT | < | s[1] < s[0]. Boolean result replaces s[1], pop stack. |
| GT | > | s[1] > s[0]. Boolean result replaces s[1], pop stack. |
| LE | <= | s[1] <= s[0]. Boolean result replaces s[1], pop stack. |
| GE | >= | s[1] >= s[0]. Boolean result replaces s[1], pop stack. |
| SHL | << | s[1] << s[0]. Result replaces s[1], pop stack. |
| SHR | >> | s[1] >> s[0]. Result replaces s[1], pop stack. |
| ADD | + | s[1] + s[0]. Result replaces s[1], pop stack. For strings, this is string concatenation. |
| SUB | - | s[1] - s[0]. Result replaces s[1], pop stack. |
| MUL | * | s[1] * s[0]. Result replaces s[1], pop stack. |
| DIV | / | s[1] / s[0]. Result replaces s[1], pop stack. |
| MOD | % | s[1] % s[0]. Result replaces s[1], pop stack. |
| NEG | unary - | -s[0]. Result replaces s[0]. |
| NOT | unary not | !s[0]. Boolean result replaces s[0]. |
| INV | unary ~ | ~s[0]. Result replaces s[0]. |
| PUSH | N/A | Push a value in instruction operand onto the stack "s". |
| JMC | N/A | Conditional jump to specified label. |
| JMP | N/A | Unconditional jump to specified label. |
| CALL | N/A | Call a function or procedure. Result to s[opCount], pop "opCount" params off stack. |
| LOAD | = | Storage referenced by s[1] = s[0], pop stack. |
| RET | N/A | Return from script. |
| ACTS | activate | Activate specified script synchronously. |
| ACTA | activate concurrently | Activate specified script concurrently. |
| DACT | deactivate | Deactivate specified script. |
| POP | N/A | Pop top element off stack "s". |
| PAWS | pause | Implement a pause, as disclosed herein. |
| LCK | lock | Lock a name mutex (e.g., used to coordinate across scripts) |
| ULCK | unlock | Unlock a name mutex |
| FLIP | N/A | Used within trigger statements (for integer = NEG, for Boolean = NOT) |

5.8.4. VM Machine Programming Model

In an embodiment, VM 230 has a programming model with a single evaluation stack. All operations may relate to the top few elements of the evaluation stack, which behaves like a reverse polish calculator with respect to arithmetic operations. Each element of the stack can have a value of any of the basic data types or be unknown. Certain op-codes expect particular data types, whereas other op-codes will operate properly regardless of the data type in the stack. All of the basic arithmetic and logical operations are provided by the parser abstraction in the '130 patent (by plug-in zero). Thus, their implementations within MA_StepProgram( ) are accomplished by calling the library API's PS_Evaluation( ) function.

In an embodiment, the only non-stack operations that are allowed are operations to or from symbols or properties—the name of which must be pushed onto the stack as a string.

5.8.5. Running VM Programs

In an embodiment, the top-level MA_StepMarlinVM( ) function walks the list of loaded MA_MarlinVmProgram instances, calling MA_StepProgram( ), which gives the VM program represented by each MA_MarlinVmProgram an execution "slot." The MA_StepProgram( ) function is what performs the actual execution. Thus, the call chain is very shallow for the VM environment. The MA_StepProgram( ) function will now be described by breaking its logic into a set of distinct descriptions, each of which effectively implements one of the VM op-codes encountered in each execution step.

On each entry into MA_StepProgram( ), the initial logic performs a loop, extracting the op-code, if any, from the string flags, and skipping any lines which do not have an op-code (e.g., lines in which the op-code, represented by the string flag, is equal to zero, representing, for example, a comment line or a line with just a label).

If the op-code is one provided by the underlying parser abstraction (see Table 1), it is implemented by a call to PS_Evaluation( ), since the necessary operands will already have been pushed onto the evaluation stack.

In an embodiment, the PUSH op-code takes a single operand of various forms. In an embodiment, the PUSH op-code is the op-code by which all data values and references get onto the evaluation stack, prior to invocation of another op-code on the top few stack elements.

In an embodiment, the PUSH op-code treats any operand preceded by a "#" character as a constant numeric value, and pushes the appropriate value and data type onto the stack as the new top element (i.e., s[0]). The symbols "#true", "#false", and "#unknown" result in the appropriate values. Otherwise, numeric token formats are identical to those specified in the base scripting language (see, e.g., Listing 1). The numerical token formats are recognized using the registered lexical analyzer for the associated parser, and converted to the appropriate binary stack value and data type. A failure to recognize the PUSH operand may result in an "unknown" value being pushed onto the stack, and optionally an error report.

In an embodiment, PUSH operands beginning with string quotes are pushed onto the evaluation stack as strings, after first decoding any embedded escape characters. The same convention for escape characters, as supported by the C language, may be used.

In an embodiment, PUSH operands beginning with "@" may be treated as device property references, whose values may be obtained by calling the DM_GetDeviceProperty( ) function. The DM_GetDeviceProperty( ) function reads the value of the device property via device manager abstraction layer 162, and returns the read value.

In an embodiment, PUSH operands that directly reference a symbol are not preceded by any special character and result in evaluation of the symbol and pushing of the equivalent value for the symbol onto the evaluation stack. This honors the symbol flag "kReferencedSymbol" in order to handle parameters passed by reference. If the referenced symbol cannot be found, the top of the stack is set to "unknown", and an error may be reported. VM 230 may comprise logic (e.g., using string flag bits) to ensure that an error is only logged the first time it occurs for any given instruction in the VM program, in order to avoid error avalanches.

In an embodiment, the JMC op-code is responsible for implementing most of the logic of the various loops and conditional statements of the base scripting language. The JMC op-code takes two operands: (i) a string specifying the particular kind of logic it is to implement (e.g., "if", "trigger", "while", "every", "when"); (ii) a label to which to jump if the logic is not satisfied.

In an embodiment, the JMC op-code utilizes a number of flag bits, associated with the string element (representing the line) in order to maintain state. Examples of such flags include:

"kWaitingForCompletion": used, for example, in the implementation of the "every" statement. The first time the "every" statement is encountered, this flag will be clear. The JMC logic is that, if the value of s[0] is "unknown", an unconditional jump is performed. Otherwise, the integer or real value of s[0] is extracted and added to the current time (as a date double), the string tag is set to the result, the "kWaitingForCompletion" flag is set for the string, and advancement of the program counter is inhibited by setting "stepOn" to "false". Thus, the next time the VM program is given a slot, the program counter will again be at the JMC instruction, but this time "kWaitingForCompletion" will be set for the string. The logic will compare the current time with the final time saved in the tag, and, if the current time is less, the logic will jump to the specified label (by setting the program counter). When the period elapses, the logic clears the "kWaitingForCompletion" flag, and the "every" cycle will repeat on the next pass.

"PreviousTrigState" and "kNotTheFirstTrigPass": are used, for example, in the implementation of the "trigger" statement. The JMC logic is that, if the value of s[0] is "unknown", an unconditional jump is performed. Otherwise, if the "kNotTheFirstTrigPass" flag is not set, the logic sets the "kNotTheFirstTrigPass" flag and advances the program counter to the next statement. If the value of s[0] is zero (i.e., false) or its setting is not different from the setting of the "kPreviousTrigState" flag, the logic sets the "kPreviousTrigState" flag as required, and treats it as an unconditional jump. Otherwise, the logic executes the condition body by advancing the program counter to the next statement. If the "trigger" statement includes an "else" clause, the "else" clause's label is immediately followed by, a "not" op-code and then another JMC op-code (generated by compiler 220). The result of this negation is that the second JMC for the "else" clause will trigger execution when the value transitions in the opposite direction to that which triggers the condition body of the trigger statement itself.

In an embodiment, the action required for the "if", "if-else", "elseif", and "while" logic is simply the result of the value of s[0]. Use of the logical flag "stepOn" to inhibit advancement of the program counter facilitates threaded behaviors without impacting the parallel execution of all other VM programs. This pattern is repeated for other op-codes that must deal with parallelism.

In an embodiment, the "when" logic loops in place until the condition becomes true, thereby blocking further script progress. Thus, the "when" logic differs from the "if" or "trigger" logic, in that it blocks all execution within the current script until the condition is met.

In an embodiment of the scripting GUI, a "trigger" statement always occurs as the first statement in a script and has an implied infinite outer loop. As a result, the semantics of the "when" and "trigger" statements appear similar. However, within the base scripting language, both the "when" and "trigger" statements can occur anywhere and multiple times within a script. Also, unlike GUI scripts created via an embodiment of the scripting GUI, the trigger statement can have an optional "else" condition. Thus, the semantic differences between "trigger" and "when" are clear.

In an embodiment, the JMP op-code executes an unconditional jump to the target label which is specified as its operand. The first time the JMP op-code is encountered, the logic scans the script looking for the specified label. When the specified label is found, the logic stashes the corresponding offset (i.e., program counter value) into the string tag. Thus, the logic does not need to rescan the script on any subsequent passes, providing significant timing optimization.

In an embodiment, the CALL op-code calls a built-in function or procedure. The CALL op-code only requires one operand, i.e., "opCount" which is the number of parameters actually passed. Some functions may accept a variable number of parameters. When the function or procedure name is encountered, its name is pushed onto the stack as a string, and each of the parameters is then pushed onto the stack in order or ends up in the right place as a result of parameter expression evaluation. Thus, the CALL op-code finds the name of the function or procedure to be called as s[opCount]+1, and invokes the function or procedure, passing "opCount". That function or procedure will find all the parameters it accepts on the stack, perform its logic, and return the result (or "unknown" if a procedure) on the stack at s[opCount]+1 in place of the function name. All parameters are then popped off the stack.

In an embodiment, the operation of the LOAD op-code, which is equivalent to an assignment, is similar to a call to the parser abstraction resolver kResolverAssign( ). The LOAD op-code takes no operands and expects that s[0] is the value to assign and s[1] is a string containing the name of the symbol or property to which the value is assigned. As with the PUSH op-code, the LOAD op-code respects the "kReferencedSymbol" flag, providing support for "reference" parameters. Also, similarly to the PUSH op-code, the LOAD op-code sets properties using the DM_SetDeviceProperty( ) function, which results in writing the value via device manager abstraction layer 162.

In an embodiment, the RET op-code completes execution of the current VM program by unloading the VM program from VM 230 and deactivating the VM program. The associated parser of the VM program may remain in memory so that higher-level code and debugger utilities can still examine the state of the symbol table before disposing of the parser and symbol tables. Termination with active dependents is constrained if pass-by-reference parameters are involved.

In an embodiment, the ACTS op-code sets up and runs the specified child VM program synchronously, such that the parent VM program must wait for completion before moving to the next instruction. When the child VM program has been launched, the ACTS instruction sets the "kWaitingForCompletion" flag for the current string in the parent VM program and inhibits advancement of the program counter. For the child VM program, the "kWaitingTillCompletion" and "kNestedInvoke" flags are set, so that, when the child VM program completes, the child VM program will locate the parent VM program and clear the "kWaitingForCompletion" for the program counter instruction. The parent VM program will be stuck at the same program counter on each subsequent VM slot that is granted to it until the "kWaitingForCompletion" flag has been cleared. This logic allows child scripts to be treated in a manner that is analogous to function calls within the same thread.

In an embodiment, the ACTA op-code is the basis of threading behavior within VM 230, since it provides the means to launch an autonomous parallel process. The ACTA op-code sets up and runs the child VM program, as described for script activation. When the child VM program has been launched, the ACTA instruction advances the program counter, without setting the "kWaitingForCompletion" flag for the current string. For the child VM program, only the "kNestedInvoke" flag is set, so that, when the child VM program completes, the logic knows it does not need to locate the parent VM program to clear the "kWaitingForCompletion" flag.

In an embodiment, the DACT op-code deactivates the script name specified in the instruction.

In an embodiment, the POP op-code is generated by compiler 220 when the stack needs to be popped in order to avoid stack overflow. Most VM operations perform their own stack maintenance. Thus, an explicit POP op-code is generally not needed. However, some complex behaviors involving jumps may require explicit POP instructions to keep things straight.

In an embodiment, the PAWS op-code implements the "pause" statement, and accepts a numeric operand specifying the number of stack parameters passed (similarly to the CALL op-code). In an embodiment, there are always two parameters. Operation of the PAWS op-code involves extracting the multiplier and time unit string from the stack, adding their product to the current time, and saving the result of the addition into the string tag, while setting the associated "kWaitingForCompletion" flag and inhibiting advancement of the program counter. Much like the "every" statement, the PAWS op-code will inhibit advancement of the program counter until the specified time period has elapsed, at which time the "kWaitingForCompletion" flag is cleared and the program counter begins advancing again. The thread-friendliness of this implementation is why, in an embodiment, the "pause" statement is not implemented as a built-in function call.

6. Device Manager

In an embodiment, each gateway 120 comprises a device manager 160, which provides for a wide variety of plug-in software drivers 166, each of which may be dynamically registered with device manager 160 and conform to a specified driver interface. Each driver 166 may or may not correspond to an available hardware device controller 170, and is designed to communicate using a transport layer or protocol. The availability of a plurality of drivers 166 enables the creation of a heterogeneous system that is capable of communicating across multiple transport layers and protocols to a wide variety of different device types. A set of available plugin drivers 166, capable of communicating via a specific transport layer, can be combined, as needed, with the corresponding hardware controllers 170 to address all kinds of control system requirements, without requiring a commitment to a single underlying data architecture.

In an embodiment, driver layer 164 ensures that individual drivers 166 do not need to know the details of how data is stored and manipulated within the data architecture. Specifically, driver layer 164 translates device property values, names, scaling, formatting, and type between those used by the data architecture and those used internally by each driver 166, using a dynamically-programmable data-driven mapping interface that may be configured through the system schema. This allows drivers 166 to be plugged into device manager 160 in a data-format-agnostic manner, enabling such drivers 166 to be written and tested relatively quickly compared to conventional approaches. Drivers 166 are free to use internal representations based on the transport protocol and/or device, and ignore the activities necessary to convert these to or from the data format of the data architecture.

In an embodiment, the schema is fetched from platform 110 when gateway 120 starts up. Thus, a modification of the schema at platform 110 may be propagated to any number of gateways 120 that are subscribed to platform 110. The schema, which defines driver layer 164, may comprise instructions written in "snippets" of an interpreted adapter language that is a wholly contained subset of the base scripting language.

In an embodiment, device manager 160 provides bidirectional communication between the device controllers 170 and components of gateway 120. Device manager 160 may receive device-related commands either directly from script execution environment 150 (e.g., through direct function calls executed by VM 230), or indirectly as the result of updates to data (e.g., a device property) occurring in the data to which gateway 120 is subscribed (e.g., via a communication path comprising controller 130 and communications layer 140, but excluding script execution environment 150). Changes to data in the data architecture (e.g., to a device property) may originate from the GUI of interface 114, or from script execution environment 150 running as a remote process on platform 110, as a local process on controller 130 of the local gateway 120, and/or as a remote process on controller 130 of a remote gateway 120.

The profusion and continual evolution of transport layers and protocols for controlling devices has inhibited progress in home automation. Specifically, it is an overwhelming task to create a system that can communicate with all of these layers and protocols, while remaining inexpensive and simple to use. Accordingly, in an embodiment, device manager 160 provides an inexpensive and fully modular hardware platform into which device modules can be plugged for communication to each specific transport layer, and a matching software architecture that simplifies the maintenance of multiple drivers for the different transport protocols.

In an embodiment, device manager 160 enables multiple different drivers 166 to be plugged into driver layer 164 through an API. Drivers 166 are isolated from the conventions and data requirements of the rest of the infrastructure components through driver layer 164, which comprises a data-driven adapter language that is dynamically invoked as values pass in either direction (e.g., to change property names, formatting, scaling, type, and other aspects) so that neither side of driver layer 164 is aware of what is happening on the other side of driver layer 164. This means that each driver 166 can exist independently and never need to change as other aspects of the system change, facilitating rapid creation of drivers for a wide range of transport protocols with no impact on existing installations or architectures. Likewise, the broader infrastructure components (e.g., the data architecture, script execution environment 150, etc.) do not need to change to accommodate changes to the drivers. The only change that may need to be made, in response to a change on one or both sides of driver layer 164, is an update to schema definitions (e.g., represented in a data file on platform 110). This enables independent evolution on both sides of driver layer 164.

In an embodiment, device manager 160 is implemented to possess or support one or more of the following attributes:

Provide an invariant interface to all drivers 166 that prevents each driver 166 from having to consider protocols and representations used by the data architecture;

Provide an invariant interface to gateway 120 that prevents any other components of gateway 120 from having to consider the unique requirements of any given driver 166 or transport layer;

Provide an adapter programming language that is a fully contained subset of the disclosed base scripting language and which has access to one or more or most of the built-in functions of the base scripting language in order to generate the mappings. Advantageously, this commonality minimizes the learning curve for integrators and developers. In addition, the mapping functions may be defined within the schema on platform 110, and may be data-driven and adaptive. Programs written in the adapter language and implementing driver layer 164 may be referred to herein as "snippets;"

Adapter language utilizes the same device reference token structures as the base scripting language;

Provide a scriptable driver layer 164 that transparently and efficiently alters property values, types, ranges, names, etc., across layer 164, according to a mapping specified within the schema on platform 110, to accommodate each driver 166. This flexible data-driven driver layer 164 performs all format and naming changes bi-directionally across device manager 160 so that neither side needs to know how the other side operates or the data formats that it requires;

All mappings and snippets are retrieved from the schema on platform 110 during startup of gateway 120, and changes to the schema on platform 110 are immediately updated on gateways 120, with no build cycle associated with mapping the snippets, thereby rendering device manager 160 highly adaptive;

Mappings of properties across device manager 160 are performed by snippets, i.e., programs written in the adapter programming language;

Provide the ability to interface to format streams of the data architecture in order to allow the scripting GUI, other cloud processes, and/or stand-alone script execution environments 150 to read and write device properties, regardless of driver;

Provide a direct API connection to scripts executing in VM 230 in order to achieve maximum performance;

Ability to operate in fully-integrated (single-process) or remote scripting/control (multiple-process) modes through the use of a standardized data model and driver-based routing;

Ability to register multiple simultaneous compliant plug-in drivers 166 for various transport protocols and, subsequently, automatically associate device controllers 170 with drivers 166 for the purposes of controlling the device controllers 170.

Each device property comprises an unordered named key-value pair and a status, which allows controller propagation of changes throughout the data architecture;

Support for unknown property values and unreachable devices;

Easy-to-use driver interface that hides data architecture requirements from drivers 166 while simplifying the driver's programming model;

Standardized device discovery process that allows drivers 166 to dynamically register and publish connected devices;

Drivers 166 can run in separate threads/processes, thereby allowing legacy drivers to be wrapped and integrated into device manager 160;

Ability to add custom drivers 166 associated with specific transport layers;

Ability to create virtual devices and/or perform advanced routing or control behaviors;

Device resolution by device name and/or device identifier;

Ability to set a property for multiple devices through a single assignment to a corresponding property of a group representing the multiple devices;

Full support for all behaviors and protocols needed by the data architecture;

Ability to register drivers 166 that control other gateways 120, thereby enabling the creation of a hierarchical layered system of distributed subsystems for larger projects;

One or more APIs to simplify the creation of new drivers 166;

The entire driver interface consists of three callback functions; and/or

Provides a universal driver (UD) abstraction layer, the associated physical-to-logical infrastructure to convert the properties of a physical device into a representation (which may be referred to herein as a "pDev") within registries in the universal driver, and the means to register associated logical device representations (which may be referred to herein as "lDevs") and the necessary driver-internal mapping snippets to map to and from pDevs and lDevs whenever any device property is changed in either direction. As may be used herein, "ToPhysical" refers to a property change that originates from the data architecture, whereas "ToLogical" refers to a property change that originates from hardware, e.g., a physical device. The mapping logic may be written in a variant or subset of the base scripting language, in a manner that is similar to the adapter language described herein, but which may be more powerful than the adapter language, as required by the need to represent and manipulate an exact representation of the arrangement and/or all possible forms of, and packing of, hardware device properties and commands (e.g., varying word sizes, bit masking, arrays, sub-structures, etc.). In some implementations, most drivers may be connected via the UD abstraction layer, rather than directly into the device manager API, since this simplifies the task of writing drivers. In an embodiment, the UD abstraction layer is a separate and independent layer that is designed to simplify the process of writing compliant drivers.

In an embodiment, device manager 160 is an adaptive and powerful interface that can simultaneously connect to multiple compliant plug-in drivers 166 and smooth out all transport-specific and driver-specific quirks, so that higher levels of the architecture need not even consider these things to achieve control of the corresponding devices. Furthermore, to enhance its utility, device manager 160 may also utilize the same underlying data abstraction used by any of the user interface components (e.g., within interface 114), data networking components, and/or scripting components, in a unified architecture. By pushing this commonality throughout the entire extended and distributed system, all the way down to device manager 160, a simple and universal user experience may be achieved.

6.1. Adapter Language 6.1.1. Lexical Structure

Listing 9 below represents the lexical structure of the adapter language according to the formalism defined in the '430 patent, according to an embodiment:

Listing 9-Lexical Structure of Adapter Language

```
<begin> Adapter
= kNoCaseStates
// For commonality, this part is an identical subset of
the base scripting languageOneCat table and is
// obtained by calling MA_MarlinLex( ) - see DA_LoadLex( )
```

-continued

Listing 9-Lexical Structure of Adapter Language

See Listing 1 for details
<next>
// For commonality, this part is an identical subset of the
base scripting language CatRange table and is
// obtained by calling MA_MarlinLex( ) -
see DA_LoadLexCi See Listing 1 for details
<end>

In an embodiment, in addition to the various keywords and operators between the "<begin>" and "<next>" delimiters in Listing 9, the adapter language supports the following variable lexical tokens:

Token 1: a variable or symbolic value (e.g., counter, idx_1, a, varName, etc.);
Token 2: a single or multi-character constant with escapes (e.g., "x", "\n", "\x34", "abed");
Token 3: a decimal 64-bit integer (e.g., 1234);
Tokens 4 & 5: a floating point double with optional exponent (e.g., 1.234, 1.3e5);
Token 6: a device property (e.g., @dev.temperature, @[xxydd].contact, @.prop, etc.);
Token 7: a hexadecimal 64-bit integer (e.g., 0xFFFF, 0x34ab);
Tokens 8 & 9: unused since all integers are of the same size;
Token 10: an octal 64-bit integer constant (e.g., 03777);
Token 11: unused since all integers are of the same size; and/or
Token 12 & 13: a string constant with escapes (e.g., "hello world\n").

In an embodiment, the adapter language supports identical operator syntax to the base scripting language, but eliminates all of the keywords in the base scripting language with the exception of "if", "else", and the predefined constants "true", "false", and "unknown". Thus, the adapter language lacks all of the threading, looping, and control constructs of the base scripting language, other than the "if" construct. This simplification is warranted since the job of driver layer 164 is merely to convert values from one form or name to another form or name. As such, the adapter language does not need the more complex constructs of the base scripting language. This simplification also makes driver layer 164 easier to implement, and obviates the need for an equivalent to VM 230 for the adapter snippets.

The operator set provided by both the base scripting language and the adapter language may be similar to those supported within the standard C language, but excluding the automatic increment and decrement constructs, and replacing the C logical operators "&&", "||", and "!" with the keywords "and", "or", and "not", respectively. This eases understandability for novice programmers.

As with the base scripting language, in an embodiment, the base scripting language does not allow types to be defined, other than built-in types, which may correspond closely to the lexical tokens. The built-in types may comprise:

Boolean: a Boolean value (e.g., held as a 64-bit integer) which may take the value of "true" or "false".
Integer: a 64-bit integer value (although different-sized integer values may be used);
Real: a double precision floating point value (e.g., equivalent to a double in C);
String: an arbitrary-length string value (e.g., "hello world");
symbol: a symbol value which automatically takes on the data type and value of anything that is assigned to it (e.g., myVariableName), such that symbols may be of any basic type (e.g., Boolean, Integer, Real, String, or unknown); and/or
property: a device property value (e.g., @dev.temperature), where the data type of a property is determined by the schema and the device driver that handles it, such that properties may be of any basic type (e.g., Boolean, Integer, Real, String, or unknown).

As with the base scripting language, in an embodiment, the adapter language is a dynamically-typed language. In other words, a symbol takes on the data type and value of whatever was most recently assigned to the symbol. This obviates the needs for syntax or logic associated with type definitions.

As mentioned above, in an embodiment, the symbol and property data types may be assigned any of the basic data types, as well as a value representing "unknown". As will be described elsewhere herein, the "unknown" value can have special significance, particularly when evaluating expressions.

As with the base scripting language, in an embodiment, the adapter language supports block statements (e.g., surrounded by brackets "{" and "}"). However, unlike the base scripting language, in an embodiment, the adapter language does not support comments of any kind. Adapter programs are usually simple enough (e.g., only a single statement) that support for embedded comments is generally unnecessary. For this reason, adapter program's may be referred to herein as "snippets," rather than "programs." However, alternatively, the adapter language could support comments, for example, in a similar manner to the base scripting language.

6.1.2. Syntax

Listing 10 below represents the syntax of the adapter language given the lexical structure defined in Listing 9 and according to the formalism defined in the '130 patent, according to an embodiment:

Listing 10-Syntax of Adapter Language

```
<begin>Adapter
 = kBeGreedyParser+kPreserveBNFsymbols+kNoProgress
program         ::= more_statements <endf>
more_statements ::= <null> <or> statement <@1:3> more_statements
statement       ::= simple_stmt <or> conditional_stmt <or> loop_stmt
simple_stmt     ::= <1:Identifier> assign_or_call <or> { more_statements } <or>
                    <6:devAtt> rstof_dobject dev_assign <or>
                    continue <@1:10> ; <or>      // only valid within a loop, otherwise silently ignored
                    break <@1:4> ; <or>          // only valid within a loop, otherwise silently ignored
                    <13:Global> = expression ; <@1:0> <or> ;
dev_assign      ::= = expression ; <@1:0> <or> := expression ; <@1:0> <@1:30>
assign_or_call  ::= = expression ; <@1:0> <or> <opnd> <@1:23> ( parameter_list ) <@1:15> ;
```

| Listing 10-Syntax of Adapter Language | | |
|---|---|---|
| loop_stmt | ::= while ( loop_condn ) simple_stmt <@1:11> | // note loop_cond can be just 'true' |
| loop_condn | ::= <@1:6> expression <@1:5> | |
| conditional_stmt | ::= if ( expression ) middle_if opt_else <@1:41:if> | |
| middle_if | ::= <@1:1> simple_stmt <@1:42:if> opt_elif | |
| opt_elif | ::= <null> <or> elseif ( expression ) middle_if | |
| opt_else | ::= <null> <or> else else_body | |
| else_body | ::= <@1:8> simple_stmt | |
| expression | ::= | |
| // For commonality, this section from expression to the end is identical to the base scripting language | | |
| // and obtained by calling MA_MarlinBNF( ) - see Listing 2 for details | | |
| <end> | | |

The section of the BNF in Listing 10, starting from the LHS production for "expression" and ending with the LHS production for "object", essentially specifies all the operators that can be utilized within expressions and the corresponding operator precedence rules that are enforced by the declaration sequence within the BNF.

This area of the grammar is identical to the base scripting language, and therefore, will not be described in detail. Furthermore, in an embodiment, all of these language capabilities are implemented by code built into a library based on the parser technology of the '130 patent, as indicated by the grammar elements in the form "<@0:n>". For this reason, these aspects of the adapter language, including the evaluation of nested expressions of arbitrary depth, will also not be described in detail herein.

In an embodiment, the adapter language supports built-in function calls and procedure calls, to which zero or more comma-separated parameters may be passed. Each parameter may be an arbitrary expression (including nested function calls), resulting in a parameter value that may take the form of any of the basic data types. The grammar productions associated with this capability include "rstof_object", "parameter_list", and "rstof_param_list". Functions can determine the number and data type of parameters passed to them, and many functions can accept more than one data type for any given parameter and operate according to the data type passed as the given parameter. A sampling of available built-in functions are described elsewhere herein for illustrative purposes.

6.1.3. Snippet Structure

The productions in Listing 10, beginning at "program" and ending with "else_body", relate to the basic structure of snippets written in the adapter language. In an embodiment, each snippet comprises a series of statements separated by semicolons. Unlike the base scripting language, in an embodiment, no outermost surrounding block delimiters (i.e., "{" and "}") and no function declaration is required. An adapter snippet can derive all the context it needs from information passed internally by driver layer 164, as it is invoked.

6.1.4. Simple Statements

In an embodiment, the adapter language provides two simple statement forms: (1) the assignment statement; and (2) the "if" statement with an optional "else" clause. Each of these simple statements may be separated from the next by a semicolon, which is the statement delimiter. The content of an "if" or "else" block can either be a single statement or a block statement comprising further inner statements (i.e., within a block defined by "{" and "}"). The empty statement (i.e., nothing but ";") is legal wherever any simple statement is legal.

6.1.5. Built-in Functions

In an embodiment, the adapter language may provide a library of built-in functions. This library may be identical to the library of built-in functions available in the base scripting language. However, not all of the built-in functions will apply to adapter operations. Thus, the library available for the adapter language may comprise an abbreviated set of built-in functions that are relevant to adapter operations.

The following is an illustrative, non-exhaustive list of some of the built-in functions that may be provided in the library for the adapter language, wherein "[I]" indicates an integer parameter, "[B]" indicates a Boolean parameter, "[F]" indicates a real parameter, "[S]" indicates a string parameter, and "[V]" indicates a void return value (i.e., a procedure rather than a function):

- [I] Round([F] realValue): rounds a real number to the nearest integer value;
- [I] Int([I/R/S] aValue): converts an integer, real, or string value to an integer value. String conversion may be similar to the "strtoll( )" function in C;
- [F] Real([I/R/S] aValue): convers an integer, real, or string value to a real value. String conversion may be similar to the "strtod( )" function in C;
- [S] Sprintf([S] formatString, . . . ): similar to the "sprintf( )" function in C, except that integer and real variable argument sizes are always int64 and double, respectively;
- [I] SetOptions([I] options/[S] optionsStr): used to turn on selected parser options. This function can be useful in debugging selected portions of a script without cluttering up the console by tracing everything else. The string form allows options to be set symbolically. This function returns the options settings after the set operation is performed as the result;
- [I] ClrOptions([I] options/[S] optionsStr): clears the specified parsing options. This function is the opposite of SetOptions( ), and returns the options settings after the clear operation as the result. The string form allows options to be cleared symbolically;
- [I] GetOptions( ): obtains and returns the current settings of the parsing options;
- [S/I/F] IndexSet([I] index, [S/I/F] set1, . . . [S/I/F] setN): selects a specific set member from a given list of members by index, and returns the selected member as a result. If the specified index is out of range, a value indicating "no value" is returned. The return data type of the function is determined by the data type of the set members (which must all be the same and one of the integer, real, or string data types);
- [I] SetIndex([S/I/F] src, [S/I/F] set1, . . . [S/I/F] setN): compares "src" to each of the elements in the supplied set of possible match values, and returns the index (starting from 1) of the found match if a match is found or zero if no match is found. If "src" is an integer, the remaining set values to be checked must also be integers. Similarly, if "src" is a string, the remaining set values to be checked must also be strings, and, if "src" is a real, the remaining set values to be checked must also be reals. This function represents a convenient way to check a value for membership in a set of values, and can replace a large number of individual comparisons with just a single function call;

[I] RangeIndex([I/F] src, [I/F] set1, . . . [I/F] setN): similar to the SetIndex( ) function, but looks for a matching "less than or equal to" value in the set, instead of equality. Thus, this function can be used to index into an ordered set of numeric ranges, thereby replacing a significant number of conditional statements. Unlike the SetIndex( ) function, string values are prohibited in the RangeIndex( ) function; and/or

[S] ConsoleMessage([S] formatStr[, . . . ]): performs a similar function as the "sprintf( )" function in C, returning the generated string as a result and simultaneously sending the generated string to the console. This function can be used to produce debugging or progress messages.

6.1.6. Parser Context and Symbols

Similarly to the base scripting language, in the adapter language, a symbol is created with a local scope as soon as it is assigned and accepts the data type and value of whatever was most recently assigned to it. In other words, the adapter language is a dynamically-typed language.

In an embodiment, the parser for the adapter language stores symbols as strings, containing the name of the symbol, in association with a value, which may be of one of the built-in data types (e.g., Boolean, integer, real, string, or unknown). Whenever the adapter parser encounters a symbol name, it may conduct a lookup in the symbol registry of the local parser to find an entry for the symbol name, and then retrieve or set the data type and value in the symbol registry. In an embodiment, the symbol registry is indexed for rapid lookup using the lexical analyzer abstraction of the '430 patent. This makes symbol lookup virtually instantaneous, regardless of the number of symbols in the symbol registry.

Unlike the base scripting language, in an embodiment, adapter-language snippets run directly within the parser abstraction. In other words, there is no adapter-language equivalent to VM 230, This simplification is due to the fact that the adapter language has no threading model and direct execution within the parser is simpler to implement. In addition, since the snippets are generally trivial and only execute when a device property value is either read or written, there is less need for optimized execution. This is particularly true, since the base-language interpreter maintains an internal cache for current device property values, which means that read operations are usually serviced from the internal cache and seldom "trickle" all the way through to drivers 166. The philosophy is that driver 166 is responsible for notifying device manager 160 (e.g., using the DM_DevMgrNfy( ) function) when a device property value has changed. However, as discussed with respect to the base scripting language, either execution form is functionally equivalent, so the adapter language makes all the same uses of the parser abstraction (e.g., for symbol table storage) as does the base scripting language. However, there is no concept of parent-child relationships between parsers for the adapter language. Each adapter snippet is functionally isolated from all other adapter snippets. Alternatively, if optimization is desired, an adapter VM, similar to but simpler than the base-language VM 230, may be provided.

6.1.7. Specifying Snippets in the Schema

In an embodiment, the schema defines the processing snippet for reading or writing each device property (e.g., temperature, brightness, locked, etc.) by each registered driver 166. Specifically, the schema may map each device property for a driver to a device property in the data architecture.

Listing 11 below illustrates an example schema that maps three device properties in the data architecture (i.e., "roomTemp", "doorLockStatus", and "brightness"), according to an embodiment:

Listing 11: Example Schema Snippet Specification

```
{
  "op": "put", "ref": "roomTemp",
  "properties": {   "title" : "room temperature", "id" ; "roomTemp", "allOf" : [ "$ref": "RealValue" ],
  "drivers":
  {
    "ThingWorx":
    {    "property": {"name": "ThermostatShape_roomTemp", "type": "RealValue" },
         "read": "@@.roomTemp = @.ThermostatShape_roomTemp;",
         "write": "@@.ThermostatShape_roomTemp = @.roomTemp;",
    }
  }, ... }
},
{
  "op": "put", "ref": "doorLockStatus",
  "properties": { "title" : "door lock status", "id" ; "doorLockStatus", "allOf" : [ {"$ref": "StringValue" },
    { "properties": { "value": { "enum" : [ "LOCKED", "UNLOCKED" ] } } } ],
  "drivers":
  {
    "ThingWorx":
    {    "property": {"name": "DoorLockShape_lockMode", "type": "RealValue" },
         "read": "@@.doorLockStatus = (Int(@.DoorLockShape_lockMode) == 0) ? ₩"UNLOCKED₩" :
₩"LOCKED₩";",
         "write": "@@.DoorLockShape_lockMode = Real((@.doorLockStatus ==₩ "UNLOCKED₩") ? 0 : 255);"
    }
  }, ... }
},
{
  "op": "put", "properties":{"title","brightness", "id":"brightness", "allOf":[{"$ref":"IntegerValue"},
```

Listing 11: Example Schema Snippet Specification

```
    {"properties":{"value":{"minimum":0, "maximum";100}}}],
  "drivers":
  {
    "ThingWorx":
{    "property": {"name": "SomeWeirdPropertyName", "type": "IntegerValue"}
       "read": "@@.brightness = @.SomeWeirdPropertyName;",
       "write": "@@.SomeWeirdPropertyName = @.brightness;",
    },
    "ZWave":
    {
     "property": {"name": "SomeOtherWeirdPropertyName", "type": "IntegerValue"}
       "read": "@@.brightness = @.SomeOtherWeirdPropertyName * 100 / 255;",
       "write": "@@.SomeWeirdPropertyName = @.brightness * 255 / 100;",
    },
    "JustTesting":
    {
      property": {"name" : "lightLevel", "type": "StringValue"},
      "read" : "@@.brightness =
IndexSet(SetIndex(@.lightLevel\ "dark\ "\ dim\ "\ 'norma.\ '\ "bright\ "dazzling\ "),0,25,50,75,100);"
      "write\ " : "@@.lightLevel =
IndexSet(RangeIndex(@.brightness,0,25,74,99,100),\ "dark\ "\ "dim\ "\ "norma.\ "\ "bright\ "\ "dazzling\ ");
    }
  }, ... }
}
```

In an embodiment, device manager 160 subscribes to all schema definitions within the data architecture. Therefore, at startup, device manager 160 receives a complete set of schema definitions, for all device properties, from platform 110. Device manager 160 may convert the received set of schema definitions into a flattened device-property registry comprising all the necessary information for retrieving a mapping for any defined device property. Similarly to script registry 214, the device-property registry may be based on the string list abstraction (i.e., ET_StringList) of the '749 patent. Specifically, each entry may be extracted from the schema using a specialized parser, and recorded in a string list (e.g., using the DA_AddPropertyMapping( ) function). However, alternative implementations may be used.

The format for each entry recorded in the string list may be as follows:

driverName; sysmapPropName; driverPropName; readSnippet; writeSnippet where driverName represents the abstract name of the device property, sysmapPropName represents the name of the device property in the data architecture, driverPropName represents the name of the device property in the driver, readSnippet is the adapter snippet for reading the device property from the device, and writeSnippet is the adapter snippet for writing the device property to the device. However, it should be understand that other formats (e.g., non-JSON-based formats) and other parsers may be used.

In an embodiment, each string list entry is associated with one or more flags, which record the data types (e.g., Boolean, 64-bit integer, real double, string, unknown) of the represented property for both the data architecture and the driver. An entry can be found in the device-property registry using a DA_FindPropertyMapping( ) function and required information that is extracted using a DA_GetPropertyMappingField( ) function. The flags associated with each string list entry may comprise one or more of the following, according to an embodiment:

"kMapDriverName": driver name (*valueP=string max length 32);

"kMapSysmapProperty": data architecture property name (*valueP=string max length 32);

"kMapDriverProperty": driver property name (*valueP=string max length 64);

"kMapReadProgram": read program (*valueP=string max length STRINGBUFFSIZE);

"kMapWriteProgram": write program (*valueP=string max length STRINGBUFFSIZE);

"kMapPropertyType": data architecture property type (*valueP=int16, values in series kBoolValue, . . . ); and/or "kMapDriverType": driver property type (*valueP=int16, values in series kBoolValue, . . . ).

These flags in the device-property registry may be extracted by parsing the schema, such that, for each property:

The outermost "id" value becomes "kMapSysmapProperty";

The property name within a driver (e.g., "ThingWorx", "ZWave", and "JustTesting" in Listing 11) becomes "kMapDriverName";

The schema's "read" value for the property becomes "kMapReadProgram";

The schema's "write" value for the property becomes "kMapWriteProgram";

The schema's "$ref" value is encoded as "kMapPropertyType";

The schema's "name" value within the driver-specific value becomes "kMapDriverProperty"; and The schema's "type" value within the driver-specific value is encoded as "kMapDriverType".

Given the discussion of parsing in the context of the base scripting language, it should be clear how to implement a DM_GenericCallback( ) function passed to the UT_ParseJSON( ) function to create the device-property registry by calling the DA_AddPropertyMapping( ) function.

The fundamental operation of driver layer 164 is to use the driver name and property type to retrieve the appropriate read or write snippet (if any). The read snippet is retrieved when a property is being fetched from a driver 166, and the write snippet is retrieved when a property is being written to a driver 166. Driver layer 164 then executes the retrieved snippet to perform the conversion using an adapter parser. If no mapping for a driver name is found, driver layer 164 may execute the following logic:

If the operation is a write, the property is passed through to driver 166, which may ignore any property that it does not recognize. One exception is that, if the property status is "pending", the driver should change the status of the property to "acknowledged" to acknowledge receipt of the property; and If the operation is a read, the property is not passed to the data architecture, and is ignored unless it is one of a set of specialized unmapped properties that include basic and universal device properties, such as "name", "id", "group", "type", etc. This logic ensures that the data architecture does not fill up with internal driver-generated properties which it does not understand, while allowing drivers 166 the simplification of outputting all properties it knows without having to determine in which properties the data architecture is interested.

Returning to Listing 11, the nature of the adapter language snippets will be described in more detail. The first example for "roomTemp" and the "ThingWorx" driver shows that, internally, the "ThingWorx" driver has a property "ThermostatShape_roomTemp", which is a real value. The data architecture property "roomTemp" is also a real value. No scaling is required to map between the two values. Only a name change is required as the property "roomTemp" moves across driver layer 164.

```
"ThingWorx"
{      "property" : {"name": "ThermostatShape_roomTemp;",
       "type": "RealValue" },
       "read": "@@.roomTemp = @.ThermostatShape_roomTemp;",
       "write": "@@.ThermostatShape_roomTemp = @.roomTemp;",
}
```

In an embodiment, a unique capability of the adapter language is that any property name that is preceded by the token "@@" refers to the property of the target side. That is, for a read operation, the name preceded by "@@" refers to the data architecture property, and, for a write operation, the name preceded by "@@" refers to the driver property. Conversely, any property name that is preceded by just a single "@" refers to the property of the source side. That is, for a read operation, the name preceded by the single "@" refers to the driver property, and, for a write operation, the name preceded by the single "@" refers to the data architecture property. The fact that different tokens allow references to different data models makes the adapter language ideal for mapping data from one format or model to another while maintaining a clean and simple syntax. It should be noted that scripts written in the base scripting language would generally not need this feature, since there is no need to map across different data models within the data architecture. Thus, this feature in the adapter language may not be similarly available in the base scripting language (or may be syntactically supported, but ignored).

Alternatively, any property name appearing on the left-hand side of an assignment refers to the property of the target side. That is, for a read operation, the left-hand-side property name refers to the data architecture property, and, for a write operation, the left-hand-side property name refers to the driver property. Conversely, any property name appearing on the right-hand side of an assignment refers to the property of the source side. That is, for a read operation, the right-hand-side property name refers to the driver property, and, for a write operation, the right-hand-side property name refers to the data architecture property. The fact that different sides of the assignment statement refer to different data models makes the adapter language ideal for mapping data from one format or model to another while maintaining a clean and simple syntax.

Referring to the read snippet of the "ThingWorx" driver for the "roomTemp" property in Listing 11, the base-language property reference format (i.e., "@dev_name[dev_id].propName") may be abbreviated in adapter snippets by omitting both the device name ("dev_name") and the device id ("dev_id") to yield the simplified format of "@.propName" (e.g., "@.roomTemp" in Listing 11). This is because, in the adapter context, neither the device name nor the device id are relevant, since the snippet applies equally in all cases in which the driver is "ThingWorx" and the data architecture property is "roomTemp". By omitting the device name and device id (which are available from the calling context when the snippet is executed), a snippet is obtained that applies universally for every combination of the property and driver. Consequently, all that is required to make a property mapping is a simple assignment to or from the data architecture property or driver property, which is what is illustrated by the first example.

A second example for "doorLockStatus" shows a more complex case:

```
"ThingWorx":
{ "property": { "name": "DoorLockShape_lockMode", "type": "RealValue" },
    "read": "@@.doorLockStatus = (Int(@.DoorLockShape_lockMode) == 0) ? ₩ "UNLOCKED₩ ":
₩ "LOCKED₩ ";",
    "write": "@@.DoorLockShape_lockMode = Real((@.doorLockStatus == ₩ "UNLOCKED₩ ") ? 0 : 255);"
}
```

In this example, the "ThingWorx" driver internally holds "DoorLockShape_lockMode" as a real number having the two values "255" for locked and "0" for unlocked. On the data architecture side, the property "doorLockStatus" is held as a string having two values of "LOCKED" or "UNLOCKED". Thus, both the name and the data type need to be changed as the property "DoorLockShape_LockMode" moves across driver layer 164.

The read snippet of the "ThingWorx" driver, for the "DoorLockShape_lockMode" property in Listing 11, accomplishes the necessary mapping using a ternary operator (i.e., (expression) ? trueVal:falseVal). The read snippet also illustrates the use of a built-in function. Specifically, the read snippet uses the Int( ) function in order to convert the real value of the "DoorLockShape_lockMode" property into an integer, so that an equality operator (i.e., "==") may be used to express the condition. The write snippet uses a similar technique as the read snippet.

A third example for the "JustTesting" driver illustrates an even more complex mapping:

```
"JustTesting" :
{ "property": {"name" : "lightLevel", "type": "StringValue"},
    "read" : "@@.brightness =
    IndexSet(SetIndex(@.lightLevel,\" "dark\" ",
    \" "dim\" ",\" "normal\" ",
    \" "bright\" ",\" "dazzling\" "),0,25,50,75,100);",
    "write\" " : "@@.lightLevel =
    IndexSet(RangeIndex(@.brightness,0,24,74,99,100),
    \" "dark\" ",\" "dim\" ",
    \" "normal\" ",\" "bright\" ",\" "dazzling\" ");"
}
```

In this case, the "brightness" property is held in the data architecture as an integer number in the range of 0 to 100. In the "JustTesting" driver, the "lightLevel" property is held as a string selected from "dark", "dim", "normal", "bright", and "dazzling". Mapping the integer values to one of these string values presents a challenge. However, this challenge may be overcome using built-in functions of the adapter language.

For example, in the read snippet, the built-in SetIndex( ) function is used to obtain an index for the string value of the driver property, which may be "dark", "dim", "normal", "bright", or "dazzling". In the illustrated example, SetIndex( ) would return an index of 1 if the "lightLevel" property value is "dark", 2 if "dim", 3 if "normal", 4 if "bright", and 5 if "dazzling". Next, the built-in IndexSet( ) function applies the index returned by SetIndex( ) to a set of values, in which index 1 corresponds to "0", 2 to "25", 3 to "50", 4 to "75", and 5 to "100", to return a integer value of either 0, 25, 50, 75, or 100. By nesting the SetIndex( ) call within the IndexSet( ) call, a single-line snippet can be used to map the string values of "dark", "dim", "normal", "bright", and "dazzling", for the "lightLevel" property of the "JustTesting" driver, to the integer values of 0, 25, 50, 75, and 100, respectively, for the "brightness" property of the data architecture.

The write snippet is more complex, since the "brightness" property in the data architecture may be set to integer values that do not equal 0, 25, 50, 75, or 100. Thus, the built-in RangeIndex( ) function is used to map the integer value of the "brightness" property in the data architecture, which may be between 0 and 100, to an index of 1, 2, 3, 4, or 5. The RangeIndex( ) function proceeds in order to match anything that is less than or equal to the specified value. Thus, an integer value of 0 yields the index 1, an integer value between 1 and 24 yields the index 2, an integer value between 25 and 74 yields the index 3, an integer value between 75 and 99 yields the index 4, and an integer value of 100 yields the index 5. Then the built-in IndexSet( ) function is used to map the index 1, 2, 3, 4, or 5, returned by RangeIndex( ), to one of the string values "dark", "dim", "normal", "bright", or "dazzling", respectively. Again, by nesting the RangeIndex( ) call within the IndexSet( ) call, a single-line snippet can be used to map any integer value between 0 and 100 to one of the string values of "dark", "dim", "normal", "bright", and "dazzling".

For the purposes of demonstrating the use of multiple-line snippets, an example schema for the "sirenStrobeSetting" property from the "ThingWorx" driver is illustrated below:

```
"op": "put", "ref": "sirenStrobeSetting",
"properties": { "title": "siren strobe setting", "id": "sirenStrobeSetting", "allOf": [ { "$ref": "StringValue" },
    { "properties": { "value": { "enum": [ "OFF", "SIREN", "STROBE", "SIREN_STROBE" ] } } } ],
"drivers": { "ThingWorx": { "property": { "name": "Siren_Strobe_Alarm_value", "type": "RealValue" },
"read": "a = Int(@.Siren_Strobe_Alarm_value);\n@@.sirenStrobeSetting = \"OFF\";\n if(a <= 1 and a <= 33) @@.sirenStrobeSetting =
\"STROBE\";\n if(a >= 34 and a <= 66) @@.sirenStrobeSetting = \"SIREN\";\n if((a >= 67 and a <= 99) or (a == 255) )
@@.sirenStrobeSetting = \"SIREN_STROBE\";\n",
"write": "if(@.sirenStrobeSetting == \"OFF\") @@.Siren_Strobe_Alarm_value = 0.0;\n if(@.sirenStrobeSetting = \"SIREN\")
@@.Siren_Strobe_Alarm_value = 66.0;\n if(@.sirenStrobeSetting == \"STROBE\") @@.Siren_Strobe_Alarm_value = 33.0;\n
if(@.sirenStrobeSetting == \"SIREN_STROBE\") @@.Siren_Strobe_Alarm_value = 99.0;\n"
```

In this example, the read and write snippets both utilize multiple lines of statements, with an intermediate variable "a" and conditional statements. As demonstrated by this example, the adapter language is capable of expressing virtually any transformation in snippets. In addition, built-in functions can be extended, as needed, to make common snippet operations as simple and concise as possible.

One advantage of embodiments of the described approach is that mappings in driver layer 164 are driven entirely by the schema data. No recompilation of any code is necessary to update or add to these mappings. This ability to rapidly change facilitates the management of multiple drivers and transport protocols for a large and ever-changing set of connected devices, while driving down maintenance and integration costs and time requirements.

6.1.8. Invoking the Driver layer

In an embodiment, two functions are involved with the invocation of driver layer 164:

Listing 12: Driver Layer Mapping API Invocation Functions

```
Boolean DA_ConvertToSysmap    (                      // Convert driver value to Data Architecture value
                constCharPtr    driverName,          // I:Driver name
                constCharPtr    aDevRef,             // I:Device reference
                charPtr         property,            // I:Device prop. on input, Data Arch. prop. on output
```

```
                int32        *aType,        // IO:value type (+flags) - may change on output -
                                            // may be NULL
                anonPtr      aValue         // IO:value passed/returned - may be NULL
                       )                    // R:TRUE for success, FALSE otherwise
{
    if ( aValue )                                   // if were being asked to convert a value, need a parser...
    {                                               // search for the specified driver and device property
        if ( (i = DA_FindPropertyMapping(driverName,property,NO)) )
        {
            if ( DA_GetPropertyMappingField(i,kMapReadProgram,pgm) && pgm[0] )
            {                                       // if we have a program to make the mapping, run it
                aParseDB = clone an adapter parser using DA_CloneAdapter( )
                set up parser context 'acP' as needed
                res = DA_RunAdapter(aParseDB,pgm);  // and then do it...
                if ( !res ) *aType = acP->aType;    // pull out the resultant type which may differ from what went in
                DA_DisposeAdapter(aParseDB);        // and clean up
                st = dt = 0;
                DA_GetPropertyMappingField(i,kMapPropertyType,&st);
                DA_GetPropertyMappingField(i,kMapDriverType,&dt);
                extract appropriate value based on 'aType', 'st', and 'dt' into 'aValue'
            } else                                  // even if no program, perhaps its a trivial type conversion...
            {
                st = dt = 0;
                res = 0;
                DA_GetPropertyMappingField(i,kMapPropertyType,&st);
                DA_GetPropertyMappingField(i,kMapDriverType,&dt);
                extract appropriate value based on 'aType', 'st', and 'dt' into 'aValue'
            }                                       // Maybe all we need is a property name change...
            DA_GetPropertyMappingField(i,kMapSysmapProperty,property);
            ret = (res == 0);
        } else
            ret = NO;                               // don't recognize this property!
    } else
    {                                               // we are only being asked to map the property name
        i = DA_FindPropertyMapping(driverName,property,NO);
        if ( i )                                    // ...that is easy, don't need a parser
            ret = DA_GetPropertyMappingField(i,kMapSysmapProperty,property);
    }
ImmediateExit:
    RETURN(ret);
}
Boolean DA_ConvertFromSysmap    (            // Convert Data Architecture value to driver value
                constCharPtr     driverName, // I:Driver name
                constCharPtr     aDevRef,    // I:Device reference (may be empty)
                charPtr          property,   // IO:Data Arch. prop. input, Device prop. output
                int32            *aType,     // IO:value type (+flags) - may change on output, may
                                             // be NULL
                anonPtr          aValue      // IO:value passed/returned, may be NULL
                       )                     // R:TRUE for success, FALSE otherwise
{
    contents similar to DA_ConvertToSysmap( ), but the direction of the mapping is reversed
}
```

The two functions illustrated in Listing 12 are invoked within the paired functions DM_GetDeviceProperty( ), which reads a property value from the plug-in driver(s) 166, and DM_SetDeviceProperty( ), which writes a property value to the plug-in driver(s) 166. These paired functions are used by VM 230 and/or controller 130 to read and write properties in what is effectively a direct call from the script to a device driver 166. Calls to these functions cause data, in the format specified by the data architecture, to be routed to device manager 160 and are ultimately resolved into local calls to DM_SetDeviceProperty( ) or DM_GetDeviceProperty( ) within device manager abstraction 162.

Full operation of the adapter-language parser can be derived by analogy with the operation of the base-language parser described herein. However, it should be understood that the adapter-language parser will be considerably simpler than the base-language parser, since the adapter language has simpler syntax and semantics than the base-language adapter.

6.2. Parsing the JSON Data-Encoding Standard

Similarly to script manager 210, device manager 160 interfaces with controller 130, produces packets in the data format of the data architecture to be sent to controller 130, and receives packets in the data format of the data architecture sent from controller 130. As mentioned elsewhere herein, in an embodiment, this data format of the data architecture uses JSON. The same underlying JSON parser technology, detailed with respect to the base scripting language, can be used by device manager 160 for these purposes, and therefore, will not be separately described in detail with respect to device manager 160. It should be understood that an alternative data format to JSON may be supported by replacing the JSON parser with a parser for the alternative data format.

6.3. Device Driver Registry and API

In an embodiment, the public interface between registered driver(s) 166 and device manager 160 comprises four API calls:

Listing 13: Driver API for Device Manager

```
Boolean DM_DevMgrInit           (                       // Initializes the Device Manager driver interface
        constCharPtr            driverName,             // I:Driver name
        DM_DevMgrCallBackFn     llCallbackFn,           // I:Low level DM callback address
        DM_DevMgrDevIteratorFn  llDeviceIteratorFn,     // I:Low level DM function to iterate over
devices
        DM_DevMgrPropIteratorFn llPropertyIteratorFn,   // I:Low level DM device property iterator
        long                    globalContext,          // I:Available to pass context to low level
                                                        // callbacks
                                );                      // R:TRUE for success, FALSE otherwise
Boolean DM_DevMgrNfy            (                       // Send a status update for current property value/status
        constCharPtr            driverName,             // I:Driver name
        ET_ParseHdl             aParser,                // I:Parser handle - usually pass NULL
        constCharPtr            aDevRef,                // I:Device reference ID
        constCharPtr            aDevName,               // I:Device name (or NULL)
        constCharPtr            aDevProperty,           // I:Device property
        int32                   aCommand,               // I:Action performed (e.g.,
                                                        // kDevMgrSetProperty,...)
        int32                   *aType,                 // IO:value type (+flags), may be different on exit
        anonPtr                 aValue,                 // IO:value passed/returned
        long                    globalContext,          // IO:Available global context (set in
JS_DevMgrInit)
        constCharPtr            status                  // I:"ack", "unknown", or "pending" (Normally "ack")
                                );                      // R:TRUE for success, FALSE otherwise
Boolean DM_DevMgrTerm           (                       // Terminates the Device Manager driver interface
        constCharPtr            driverName              // I:Driver name
                                );                      // R:TRUE for success, FALSE otherwise
Boolean DM_DevMgrPoll           (                       // Poll DevMgr adapter to send/receive messages
        Boolean                 forceFlush              // I:TRUE to force flush immediately, normally
FALSE
                                );                      // R:TRUE for success, FALSE otherwise
```

The DM_DevMgrInit( ) function is called by each driver 166 during system startup to register the necessary callbacks that allow device manager 160 to interface to and invoke the particular driver 166. As illustrated, there are three callback functions that a driver 166 must supply to complete the connection. The first, ||CallbackFn, is referred to as the low-level driver callback function and forms the primary interface between device manager 160 and driver 166. The other two callback functions are a device iterator function, ||DeviceIteratorFn, and a property iterator function, ||PropertyIteratorFn. A global context value, globalContext, can be specified and is passed by device manager 160 to any callback function invoked, thereby allowing the callback function to access global variables and the like. The device iterator function and property iterator function are used by device manager 160 to iterate over all devices and their properties, respectively, of which the specified driver 166 is aware, thereby enabling a complete picture of the current state of all connected devices (i.e., virtual or hardware devices).

The DM_DevMgrTerm( ) function is called by each driver 166 at system termination to deregister the driver 166 and perform cleanup or release of the storage associated with driver 166.

The DM_DevMgrInit( ) function may potentially be called multiple times for the same driver 166. If so, the call to the DM_DevMgrInit( ) function may increment an internal driver usage counter, which must be decremented to zero by a matching number of calls to the DM_DevMgrTerm( ) function before the driver 166 is deregistered and its associated storage terminated. In other words, each call to the DM_DevMgrInit( ) function must correspond, one-to-one, to a call to the DM_DevMgrTerm( ) function, before the driver 166 can be deregistered and its associated storage can be terminated.

The DM_DevMgrNfy( ) function is called by driver 166 whenever driver 166 alters or experiences a change in the value or status of a device property. The DM_DevMgrNfy( ) function is the mechanism by which the rest of the system (e.g., script execution environment 150) is informed about changes happening at the device level.

The DM_DevMgrPoll( ) function is called frequently by each driver 166. The DM_DevMgrPoll( ) function is the mechanism by which new commands and device property values from the rest of the system (e.g., script execution environment 150) are communicated to driver 166 through calls to the registered callback functions. Use of the DM_DevMgrPoll( ) function constrains the time at which such asynchronous calls (e.g., resulting from device property changes made by controller 130, platform 110, and/or a script executing within script execution environment 150) are performed. This makes the programming model for driver 166 much simpler, in that it does not have to contend with asynchronous commands or calls coming from device manager 160 at any other times, as would be required, for example, in a fully preemptive arrangement.

6.4. Device Manager and Driver Threading Model

There are a number of possible arrangements of device manager 160, script execution environment 150, and drivers 166, including arrangements in which each of these components is in a separate process and/or in which all of these components may be on distinct computing nodes. Each such arrangement has distinct advantages and disadvantages.

The most common threading model comprises a unified process for the script execution environment 150 and device manager 160, communicatively connected to two or more distinct drivers, each using a different transport protocol (e.g., Bluetooth™, Z-Wave™, ZigBee™, etc.). All of these components exist within a number of preemptive threads within a single process running in controller 130 of a gateway 120, with script execution environment 150 and device manager 160 unified in a single thread, and the drivers in one or more different threads. If only a single driver were present, the thread for the single driver could also be unified in a single thread with script execution environment 150 and device manager 160, thereby eliminating two queues and improving throughput.

Figure 7:
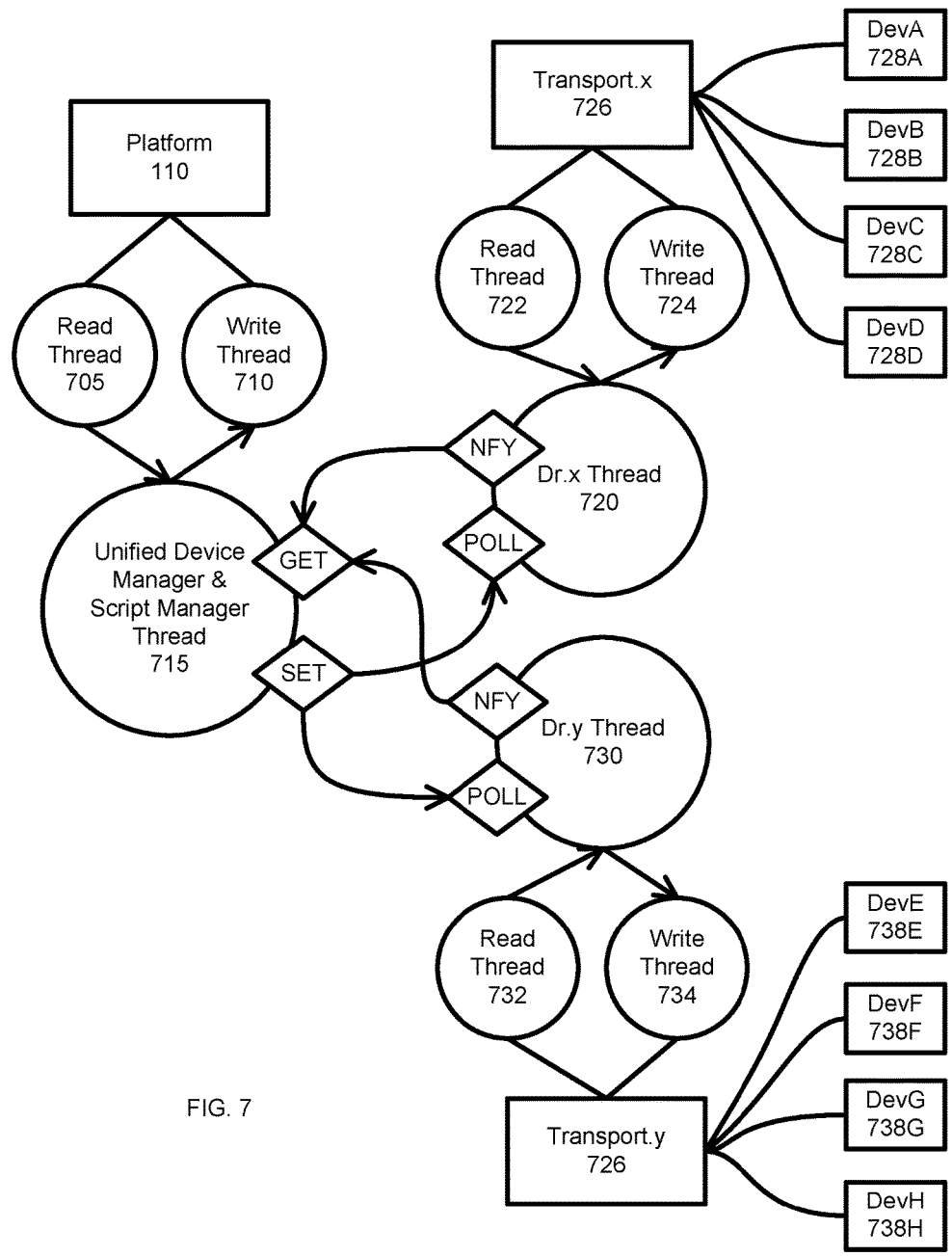
FIG. 7 illustrates an example unified threading model, according to an embodiment.

FIG. 7 illustrates an example unified threading model with two example drivers Dr.x and Dr.y, according to an embodiment. In this example, Dr.x thread 720 is communicatively connected to four devices, 728A-728D, via transport layer 726. Similarly, Dr.y thread 730 is communicatively connected to four devices 738E-738H, via transport layer 736. It should be understood that, in each case, the communicative connection may be hardwired (e.g., serial link, power-line transmission, Ethernet cable, etc.) or wireless (e.g., radio, Wi-Fi™, Bluetooth™, cellular, etc.). In reality, each transport protocol tends to dictate the required threading arrangement, but it will be assumed for purposes of this example that each driver thread, Dr.x 720 and Dr.y 730, spins off two worker threads: (1) a read thread 722 and 732, respectively, which reads from transport layers 726 and 736, respectively; and (2) a write thread 724 and 734, respectively, which writes to transport layers 726 and 736, respectively. These read and write threads effectively connect each driver thread, Dr.x 720 and Dr.y 730, to the set of devices 728 and 738, respectively. Read threads 722 and 732 queue messages to the driver threads, Dr.x 720 and Dr.y 730, respectively, and write threads 724 and 734 queue messages from the driver threads, Dr.x 720 and Dr.y 730, respectively.

In an embodiment, driver thread 720 executes an infinite main loop that handles inputs coming from either real-world devices (i.e., from read thread 722) or via a "set" queue which is filled by unified device manager and script manager thread 715 (e.g., when it calls the DM_SetDeviceProperty( ) function). The set queue is drained during the regular polling call by driver thread 720 to the DM_DevMgrPoll( ) function. The main loop in driver thread 720 also handles output of values to either real-world devices (i.e., to write thread 724) over transport layer 726 or to a "get" queue of the unified device manager and script manager thread 715. Driver thread 720 fills the get queue by calling the DM_NfyDevMgr( ) function, and the unified device manager and script manager thread 715 regularly drains the get queue (e.g., by calling the DM_GetDeviceProperty( ) function).

The fact that each driver 720 and 730 executes within its own isolated thread, which is generally distinct from the unified device manager and script manager thread 715 simplifies writing by the driver, and allows preexisting drivers that are not designed for the data architecture to be easily wrapped with the data architecture. These preexisting drivers may exist in an entirely separate process, with all necessary communications implemented using the flat "ET_StringList" model to transmit complex data and avoid the overhead of serialization and deserialization. Because the DM_GetDeviceProperty( ) and DM_SetDeviceProperty( ) functions utilize knowledge of the drivers for the devices involved, they can serve as the primary routing mechanism between the unified device manager and script manager thread 715 and the various drivers to which it is connected (e.g., as discovered through a drivers registry).

In other configurations, different registered drivers may cause different routing behaviors. For example, in an embodiment of a stand-alone interpreter for the base scripting language, the only registered driver is one that sends and receives the encoded data (e.g., JSON-encoded) to and from controller 130. This means that the operation of the stand-alone interpreter, which may potentially be running on platform 110, instead of gateway 120, is identical to that of the unified device manager and script manager thread 715 in terms of calling the DM_GetDeviceProperty( ) and DM_SetDeviceProperty( ) functions. The difference in behavior and routing may be accomplished through the underlying driver registry. Advantageously, this allows the identical code base to be applied in a wide range of configurations without the need for specialized behaviors. In other words, the initial architecture decision to support multiple drivers and transport layers is leveraged and extended to support multiple configurations of the various architectural components.

6.5. Driver Callbacks

As discussed with respect to the driver API DM_DevMgrInit( ) function, in an embodiment, there are three fundamental callbacks that a driver 166 supplies when it registers with device manager 160. The C function prototypes for these are as follows:

```
typedef EngErr (*DM_DevMgrCallBackFn)  (                      // Function prototype for a low level DM callback function
    constCharPtr                        driverName,           // I:Driver name
    ET_ParseHdl                         aParser,              // I:Parser handle - prob. ignored by LL registered
                                                              // functions
    constCharPtr                        aDevRef,              // I:Device reference ID
    constCharPtr                        aDevName,             // I:Device name
    constCharPtr                        aDevProperty,         // I:Device property
    int32                                 aCommand,           // I:Command to perform (e.g.,
                                                              // kDevMg rSetProperty,...)
    int32Ptr                            aType,                // IO:value type passed/returned (plus flags like
    kIntIsBoolean)
    anonPtr                             aValue,               // IO:value passed/returned
    long                                globalContext,        // IO:Available for custom global context (set in
                                                              // JS_DevMgrInit)
    int32                                 options,            // IO:Options (see DM_SetDeviceProperty)
    constCharPtr                        status                // I:Status for a 'set'/'put' command, NULL otherwise
                                    );                        // R:Zero for success, error code otherwise
typedef Boolean (*DM_DevMgrDevIteratorFn)(                    // Iterate over known devices
    constCharPtr                        driverName,           // I:Driver name
    ET_ParseHdl                         aParser,              // I:Parser handle - probably ignored by LL registered
                                                              // functions
    charPtr                             aDevRef,              // O:Contains device reference/id on exit
    charPtr                             aDevName,             // O:Contains device name on exit
    long                                *dContext,            // IO:Iterator context, 0 to initiate listing, updated on
                                                              // exit
    long                                globalContext         // IO:Available for custom global context (set in
                                                              // JS_DevMgrInit)
                                );      // R:TRUE if another device returned, FALSE if no more devices
```

```
typedef Boolean (*DM_DevMgrPropIteratorFn)(                    // Iterate over known properties
   constCharPtr                    driverName,                 // I:Driver name
   ET_ParseHdl                     aParser,                    // I:Parser handle - probably ignored by LL registered
                                                               // functions
   constCharPtr                    aDevRef,                    // I:Device reference/id
   constCharPtr                    aDevName,                   // I:Device name
   long                            *pContext,                  // IO:Iterator context, 0 to initiate listing, updated on
                                                               // exit
   charPtr                         property,                   // O:Property name
   long                            globalContext               // IO:Available for custom global context (set in
                                                               // JS_DevMgrInit)
                              );                  // R:TRUE if another property returned, FALSE if no more devices
```

The most extensively used callback function will generally by the DM_DevMgrCallBAckFn( ) function. To illustrate the logic, within this callback function, an example skeleton driver callback function, which is designed to be a starting point for an actual driver callback function, will now be described with reference to Listing 14 below:

Listing 14: Skeleton Callback Function Logic

```
#pragma unused                          (options)
EngErr                                  ret = 0;
char                                    tmp[SMALLSTRINGBUFF],stat[16],cmd[kMaxCmdNameLen];
int32                                      t;
Boolean                                 bV;
int64                                      iV;
double                                  rV;
charPtr                                 sV;
short                                          dmType;
ENTER(DM_ExampleLowLevelCallback);
cmd[0] = '\0'
switch ( aCommand )
{
   case kDevMgrPutDevice:                       // 'aCommand' 'put' all device properties
      US_strcpy(cmd,"put")                      // !!! Deliberate fall through into the Set code
   case kDevMgrSetProperty:                     // set property value (status by implication is 'pending')
      if ( !cmd[0] ) US_stcpy(cmd,"change")
      switch (*aType & kRawTypeMask )
      {
         in each case 'kNoValue','kBoolValue'...'kStringValue' (as for kDevMgrGetProperty):
         if ( aCommand == kDevMgrSetProperty )
         {
            extract value of appropriate type from *aValue
            write it to the hardware
            get the resultant value back        // it might differ from that commanded
            DM_DevMgrNfy(driverName,NULL,aDevRef,aDevName,aDevProperty,
               aCommand,aType,&resultant value,globalContext,"ack");
         } else                                 // this is a 'put' from Data Architecture
         {
            result = get value from hardware
            if result differs from that specified    // tell Data Architecture the true value
               DM_DevMgrNfy(driverName,NULL,aDevRef,aDevName,aDevProperty,
                  aCommand,aType,&result,globalContext,"ack");
         }
      }
      break;
   case kDevMgrGetProperty:                     // get property value (NB:no calls to DM_DevMgrNfy)
      US_strcpy(cmd,"get")
      dmType = determined from true property type in LL driver database (or use dev registry calls)
      if ( property status is unknown ) stat = "unknown"
      else if ( property status is pending ) stat = "pending"
      else stat = "ack"
      *aType = dmType
      switch ( dmType & kRawTypeMask )          // the value returned is the current/last known value
      {                                          // even if status is "unknown"
         case kNoValue:         break;
         case kBoolValue:       *(Boolean*)aValue = get Boolean value from hardware; break;
         case kIntValue:*(int64*)aValue = get integer value from hardware; break;
         case kRealValue:       *(double*)aValue = get real value from hardware; break;
         case kStringValue:     sV = get string value from hardware
                                US_strncpy(aValue,sV,kDevMgrBuffSize-1)
                                break;    // copy into buffer size 'kDevMgrBuffSize'
      }
      break;
   case kDevMgrDeleteProperty:                  // 'aCommand' delete a property command
      US_strcpy(cmd,"delete")
      delete the property if appropriate        // inform DevMgr what we have done...
```

```
        DM_DevMgrNfy(driverName,NULL,aDevRef,aDevName,aDevProperty,
                aCommand,0,NULL,globalContext,"ack")
        break;
    case kDevMgrRemoveDevice:           // 'aCommand' remove the whole device
        US_strcpy(cmd,"remove")
        delete the device if appropriate    // inform DevMgr what we have done...
        DM_DevMgrNfy(driverName,NULL,aDevRef,aDevName,NULL,
                aCommand,0,NULL,globalContext,"ack")
        break;
}
RETURN(ret);
```

The logic in Listing 14 has been simplified for the purposes of explanation. While a number of additional behaviors are required to implement a real driver, these behaviors are subtle and not fundamental to this description.

The logic for the "kDevMgrRemoveDevice" command removes a device, and the logic for the "kDevMgrDeleteProperty" command deletes a device property. What these commands actually mean in terms of the underlying transport protocol is a matter to be determined for each specific driver 166. The "kDevMgrRemoveDevice" command will be issued when controller 130 or platform 110 seeks to remove a known device from a gateway 120 (e.g., along with a database that might be maintained internally for the device driver). For example, a device may be removed from one gateway 120 and added to another gateway. At the gateway 120, from which the device is to be removed, a "kDevMgrRemoveDevice" command will be issued at the gateway 120 from which the device is to be removed, whereas a "kDevMgrPutDevice" command will be issued at the gateway to which the device is to be added. The "kDevMgrDeleteProperty" command is rarely used and would likely only occur in the process of correcting an accidental addition of a property.

For the "kDevMgrGetProperty" command, a driver 166 must get the requested property value from the specified device and write it to the output buffer "aValue" in the internal driver format. This property value will be automatically converted to the data format of the data architecture by driver layer 164. Because the "kDevMgrGetProperty" command asks for the property by its driver name, driver 166 does not need to be concerned with the data format of the data architecture or even what the property name might be in the data architecture. The "kDevMgrGetProperty" command may originate from a call to the DM_GetDeviceProperty( ) function within device manager 160.

For the "kDevMgrSetProperty" command, a driver 166, when it recognizes the specified device property, writes the specified device property to the device and notifies and acknowledges the property status to device manager 160.

The value of the status of the property being passed in with "kDevMgrSetProperty" command will be "pending", since, in an embodiment, driver 166 is the only authority which is allowed to change the property status to "acknowledged". The "kDevMgrSetProperty" command may originate from a call to the DM_SetDeviceProperty( ) function within, device manager 160.

The "kDevMgrPutDevice" command is used when controller 130 and/or platform 110 requests confirmation of a current state of a device from device manager 160. The "kDevMgrPutDevice" command does not imply a request to change any device property, but merely represents an opportunity for driver 166 to correct the controller's and/or platform's picture of the current state of the device. Accordingly, the logic for the "kDevMgrPutDevice" command is similar to the "kDevMgrSetProperty" command, except that the incoming property value is not actually written to the device.

The five commands illustrated in Listing 14 allow controller 130 and/or platform 110, through device manager 160 and the appropriate driver 166, to perform control and activity monitoring, including device-related activities initiated by scripts running in script execution environment 150.

In an embodiment, the two iterator callback functions, DM_DevMgrDevIteratorFn( ) and DM_DevMgrPropIteratorFn( ), may be used by device manager 160 to send an initial snapshot of the entire state of all connected devices to controller 130 and/or platform 110 during startup of gateway 120. Each driver 166 can implement its own process for discovering what it has to do to iterate over its devices via its transport protocol, and subsequently iterating over any and all properties of those devices. Drivers 166 can ignore whether controller 130 or platform 110 actually cares about any particular property.

An example pseudocode for the use of the registered iterators within device manager 160 will now be described:

```
function DM_ProcessProperty:
    use DM_ConvertToSysmap to see if the property has a translation
    also pass through 'required' properties like 'name', 'id', 'group', 'type', etc.
function DM_GetNextProperty:
    for ( again = ret = YES ; ret && again ; )          // suppress any property we can't find in the schema
        ret = (driver property iterator fn)(dcP->driver,aParseDB,aDevRef,aDevName,pContext,property,context);
        if ( ret )
            again = !DM_ProcessProperty(dcP->driver,aDevRef,property,NULL,NULL,NO);
    function DM_GetNextDevice:
        ret = (driver device iterator fn)(dcP->driver,aParseDB,aDevRef,aDevName,dContext,context);
        US_strcpyCdN,aDevName);                         // convert raw name to Marlin equivalent (NOP if already Marlin form)
        UT_RawToMarlinName(_dN);
        UT_RegisterDevice(aDevName,_dN,aDevRef);        // this might be a new device name so register it now!
        US_strcpy(aDevName,_dN);                        // and return the Marlin device name form
    function DM_GetPropertiesJSON:
```

-continued

```
    for ( pContext = 0, j = 0 ; DM_GetNextProperty(aParser,aDevRef,aDevName,&pContext,property,NO) ; j++)
      UT_LookupDevice(aDevRef,rdN,kInputIsDeviceID+kOutputIsMarlinName);
      UT_FormDevRef(aDevRef,rdN,property,tmp);
      PS_Push(aParser);
      if ( DM_GetDeviceProperty(aParser,TOP,aDevRef,tmp,stat,0) )
        output property JSON to accumulated result
      PS_Pop(aParser);
function DM_GetAllDevices:
for ( j = 0 ; j < kMaxDrivers ; j++ )
  US_strcpy(drvr, driver name from registry);
  if ( drvr[0] && it has a device && property iterator registered )
    for ( dContext = 0, k = 0 ; DM_GetNextDevice(jParser,deviceR,deviceN,&dContext) ; k++ )
      UT_LookupDevice(deviceR,rdN,kInputIsDeviceID+kOutputIsRawName);
      xh = DM_GetPropertiesJSON(dryr,aParentParser,"put",deviceR,rdN,NULL);
      add 'xh' to accumulated output
    send accumulated output to Data Architecture
```

Notably, drivers 166 may themselves take advantage of other public APIs provided by device manager 160, in order to simplify the implementations and operations of drivers 166. In particular, one or more of the following functions and abstractions may be used by registered drivers 166:

The UT_LogEntry( ) function can be used to add log entries for the web GUI;

The device manager "dictionary" abstraction can be used for all symbol storage by drivers 166, instead of a conventional database;

The device registry abstraction may be utilized;

The paired functions, UT_SetPropertyState( ) and UT_GetPropertyState( ), provide full access to the device manager's record of the current state of all devices and their properties across all registered drivers 166;

Each driver 166 can use the underlying parser abstraction to implement its parsing functionality for interpreting the transport protocol over which it operates;

Device manager 160 may maintain an internal registry of device groups and provide API functions, such as DM_InGroup( ), which each driver 166 may access for handling of device groups;

The API for driver layer 164 may be available to drivers 166 for more advanced logic purposes; and/or Where possible, drivers 166 may follow the same coding standards and utilize the same published allocators as device manager 160 and script manager 210, thereby providing drivers 166 with access to all the built-in debugging functionality (e.g., error reporting, leak checking, etc.).

6.6. Handling Data Architecture Commands

As discussed elsewhere herein, in an embodiment, the data format for the data architecture is JSON. In such an embodiment, the task of handling incoming commands is essentially one of performing a parse of the JSON containing those commands. This process may be fundamentally identical to the parsing of the JSON data-encoding standard and the parsing of GUI scripts for conversion to base-language scripts, as described elsewhere herein with respect to the base scripting language. Thus, a detailed explanation will not be provided here. Instead, the following list provides notes relating to parsing logic for the "kJSON_newMemberVal" command:

If the JSON path ends with ":op", this is the command type;

If the JSON path does not end with ":status", this is the property value set "kValueProcessed";

If the JSON path ends with "type:{:value[", specialized logic, merging comma-separated values, is performed;

If the JSON path ends with "group:{:value:[:{Sref", the path is flattened into a device group reference, and comma-separated values are merged;

If the JSON path ends with "group:{:value:[:{:name", the path is flattened into a group name, and comma-separated values are merged;

If the JSON path ends with ":ref" or ".id", this is the device ID;

If the JSON path ends with ".name:{:value" and does not contain "group: {value:", the device is registered; and If the JSON path ends with ":status", this is the property status, which is assigned to "kStatusProcessed".

In an embodiment, after every "kJSON_newMemberVal" command is processed, the DM_ProcessCompleteVal( ) function is called. The DM_ProcessCompleteVal( ) function looks at the "kStatusProcessed" and "kValueProcessed" flags to determine if all the data needed to process the property is available. If so, with certain logical exceptions pertaining to "group" and "type" properties, the DM_ProcessCompleteVal( ) function calls the DM_SetDeviceProperty( ) function, which ultimately causes the appropriate driver 166 to be called.

6.7. Constructing Responses

As discussed elsewhere herein, in an embodiment, the data format for the data architecture is JSON. In such an embodiment, the task of generating outgoing commands is essentially one of converting the entries in one or more of the device manager's internal registries (e.g., status updates resulting from calls to the DM_DevMgrNfy( ) function) into JSON format.

In an embodiment, all internal registries, regardless of their purpose, use the "ET_StringList" structure based on the flat memory model described in the '749 patent. The details of this logic are described elsewhere herein with respect to the VM program format. In this embodiment, constructing any JSON response essentially boils down to grouping related entries in a string list together, and then converting the string list into JSON format. In an embodiment, this pattern is repeated throughout the script execution environment 150 and device manager 160. In the opposite direction, an incoming JSON message is generally converted to the "ET_StringList" format for internal use. Therefore, these string lists pass in both directions over the various queues illustrated in FIG. 7. The process of converting JSON to an internal string list is described elsewhere herein, since, within the JSON parsers described elsewhere herein, there are calls to functions such as DM_RegisterDevice( ), UT_SetSymbol( ), UT_setPropertyState( ), SU_setScript( ), MA_SetSymbol( ), and MA_RunMarlin( ). All of these functions ultimately create entries in string lists, which are then used by other logic. In an embodiment, the string list is also fundamental to the dictionary abstraction. Thus, in an embodiment, string lists form the basis of all symbolic values within the base scripting language and the base-language parsers.

One example of generating a response in the data format of the data architecture (e.g., JSON) will now be described with respect to the DM_FlushStatusUpdates( ) function, which generates output, in the data format of the data architecture, that describes all devices and properties that have been changed by driver calls to the DM_DevMgrNfy( ) function:

Listing 15: Example of Generating Response in Data Format of Data Architecture

```
Function DM_StatusCmpFn:
   ret = compare device IDs (result −1, 0, +1) as for C cmpfn.
   if ( ret == 0 )                    // if devices are the same, sort by property
     if property is 'name', 'type', or 'group' move it forward by setting ret as
appropriate
   if ( ret == 0 )                    // if no favored property present, use alphabetical sort
     ret = US_strcmp(properties...)
Function DM_SortDeviceSL:
   sL = aParseDB registry string list
   vector = (charPtr*)NEW_PTR(i * sizeof(charPtr) ) ;    // now we need to sort updates by
device & then by cmd so
   for ( j = 0 ; j < i ; j++ )        // each response batch is assoc. with correct cmd & dev.
     vector[j] = US_GetString(sL,j) ;  // ok, that sorts our vector of strings . . .
   SS_GeneralizedSort(vector,i,sizeof(charPtr), (ET_Cmpfun*) DM_StatusCmpFn,0,0,YES) ;
   create new string list & copy sorted element above into it in order (including tags and
flags)
   replace initial string list by new sorted one, also update associated lexical analyzer
recognizer to match
Function DM_FlushStatusUpdates:
   DM_SortDeviceSL(aParseDB) ;        // First sort everything in status updates parser symbol
                                      // table
   sL = aParseDB registry string list
   ch = US_StrToHdl ("{\"response\" : \n[\n") ;    // now iterate over the sorted strings...
   for ( dcont = 0 ; (cp = US_GetNextString(sL,&dcont) ) ; )
     extract device name, id, cmd name, property type etc. from string, flags, and tag
     US_SprintfCatHdl (ch,"%s{\"op\" : \"%s\",\n\"ref\" : \"%s\",\n\"properties\"
:\n",",",",cmdS,deviceR);
     US_SprintfCatHdl (ch,"{\"id\" : \"%s\",\"name\" :
{\"value\":\"%s\",\"status\":\"ack\"}\n",deviceR,deviceN) ;
     look up device in group registry & output group JSON if necessary
     for (pcont = dcont, j = 0, res = YES ; res ; j++ )    // continue walk for available
                                      // properties for same dev+cmd
       extract device name, id, cmd name, property type etc. from string, flags, and
tag
       if cmd changes
         end JSON for this block & begin new block with different "op" value
       output appropriate JSON for property & type
       cp = US_GetNextString (sL,&pcont)
       if ( property is "name" )      // we know this always starts next device so break
                                      // out
     continue to outer loop with 'dcont' set to 'pcont'
   finalize JSON output
   Pretty Print and send result to Data Architecture
```

In an embodiment in which JSON is the data format, the end result of the logic in Listing 15 above is a message packet similar to the following:

```
{"method":"POST","body": [
   {
     "op" : "change",
     "ref" : "MzIwOTU5Ljk2NzM",
     "properties" :
     {
       "id" : "MzIwOTU5Ljk2NzM",
```

-continued

```
       "name" :
       {
         "value" : "Hall Light",
         "status" : "ack"
       },
       "group" :
       {
         "value" :
         [
           {
             "$ref" : "XYZZYaskdhgqprg",
             "name" : "Warehouse"
           }
         ],
```

-continued

```
         "status" : "ack"
       },
       "brightness" :
       {
         "value" : 25,
         "status" : "ack"
       }
     }
   }
],"uri":"sysmap://systech.com/systech/alpha/gw34556/device"}
```

In this case, the above JSON message was generated by the logic of Listing 15, because the value of the "brightness" property was set to 25 by the driver, and no other property for the same device was altered (otherwise, those properties would form part of the same message). The "id", "name", and "group" properties were added by the logic of Listing 15 to the message for clarity, even though those properties did not change.

It should be understood that all other cases operate in a similar manner to the DM_FlushStatusUpdates( ) function described above. The same techniques as shown in Listing 15 can be used to convert any internal string list to a wide variety of other data formats (i.e., other than JSON) for a wide variety of other purposes.

6.8. Device Groups

In an embodiment, the data architecture enables the creation of arbitrarily-named device groups that comprise an arbitrary number of devices as members. These device groups may be used to organize devices into convenient sets for use by a user.

However, device manager 160 may extend the functionality and utility of these device groups. These device groups appear to data manager 160 as virtual devices, held on platform 110, which have no corresponding physical manifestation. One extension is that these device groups can be used by both the data architecture and by scripts to set the value of a property for any member devices that have that property.

In an embodiment, the setting of device groups lies within the implementation of the DM_SetDeviceProperty( ) function, which is illustrated in Listing 16 below:

As an example, assume that all devices in a house are part of a device group named "Indoor Devices". To turn all dimmable devices in the house to 50% brightness, all a script needs is a single statement:

@Indoor_Devices.brightness=50;

This single script statement will cause device manager 160 to loop, as illustrated in Listing 16, assigning the value of 50 to the "brightness" property for every device in the "Indoor Devices" group that has a "brightness" property. Those devices in the "Indoor Devices" group without a "brightness" property will remain unchanged. This ability to group devices and assign property values simplifies scripting, reduces the amount of communications traffic, and enables the creation of generic scripts that can be applied in many different situations by simply assigning a physical device at a given installation to one or more device groups.

Notably, since the device group is represented by a virtual device, if the device group did not previously have a "brightness" property, it will acquire a "brightness" property when a device having a "brightness" property is first added to the device group. This is because the DM_SetDeviceProperty( ) function will cause a "change" message to be sent to controller 130 and/or platform 110 with an "acknowledged" status for the device group as soon as the device having the "brightness" property is added. In turn, the list of properties available for the device group in the scripting GUI will then automatically include the "brightness" property. In addition, an executing script will be able to read or write the "brightness" property using "@Indoor_Devices.brightness", which ultimately resolves to a call to the DM_GetDeviceProperty( ) function (or is short-circuited by using the internal cache).

Listing 16: Structure of the DM_SetDeviceProperty ( ) Function

```
Function DM_SetDeviceProperty:
    setup logic...                          // now convert to driver property+type...
    DM_ConvertFromSysmap(driver,aDevRef,dmProperty,&typ,dmValue);
    cmd = either kDevMgrSetProperty or kDevMgrPutDevice depending on params
    switch ( type & kRawTypeMask )          // here we set the [virtual] device property
        for each type:
            call the driver callback(passing value etc. + cmd)
    if ( (cp = DM_IsGroup(aDevRef)) )       // if were actually setting a group property, thats different!
    {                                       // call ourselves recursively for each device to handle that!
        for ( i = 0, ret = YES ; US_GetpField((ET_StringList)~0,(long)cp,i,'',',dRef,sizeof(dRef)) > 0 ; i++ )
            if ( !DM_IsGroup(dRef) )        // you can't have groups inside a group
                UT_FormDevRef(dRef,NULL,US_strchr(aDevProperty,'.')+1,dmProperty);
            PS_Push(aParseDB);              // If this specific device has such a property, set it
            if ( DM_GetDeviceProperty(aParseDB,TOP,dRef,dmProperty,tmp,kNoErrorReport))
                ret = ret && DM_SetDeviceProperty(aParseDB,aValueP,dRef,dmProperty,aType,options,status);
        PS_Pop(aParseDB);
    }
```

The net effect of the logic illustrated in Listing 16 is that, when a given value of a given property (e.g., "brightness") is assigned to a device group, that given value is assigned to the property of the virtual device representing that device group. The logic then extracts the string list of devices that are members of that device group from the internal group registry of device manager 160, and loops over all of the member devices, calling the DM_GetDeviceProperty( ) function to determine if the device has the given property. For each member device that has the given property, the logic assigns the given value to the given property by calling the DM_SetDeviceProperty( ) function. On the other hand, for each member device that does not have the given property, no assignment is performed.

6.9. Device Manager Initialization

The process of initializing device manager 160 and registering drivers 166 will now be described. In an embodiment, initialization activities that occur prior to run-time operation of device manager 160 include:

(1) Once statically initialized, device manager 160 first establishes a connection to platform 110, and authenticates itself and the gateway 120 in which it likely resides;

(2) Following successful authentication (e.g., indicated by a response from platform 110), device manager 160 first sends a "configuration" message, and then subscribes to the schema on platform 110, which, as discussed elsewhere herein, holds all the property information and the driver mapping required by driver layer 164. Device manager 160 also subscribes to all devices for the local gateway 120. A subscription means that platform 110 will send a complete "put" of all relevant items, and subsequently, if any item or property changes, platform 110 will send a message to update all subscribing processes for the gateway 120, including device manager 160, script execution environment 150, and/or local controller 130;

(3) Once the schema has been received, device manager 160 calls the DM_GetAllDevices( ) function, and sends the resultant device snapshots to platform 110 and/or controller 130, thereby ensuring that their pictures of the device states matches the picture returned by registered drivers 166; and (4) In the case of unified device manager and script manager thread 715, a subscription to all scripts is also sent from platform 110 to script execution environment 150 to be used by script execution environment 150.

As new drivers are created (e.g., for new protocols, new devices, etc.), the new drivers may be added to the schema. Thus, during initialization of device manager 160 on a gateway 120 that is subscribed to the schema (e.g., stored as a configuration file on platform 110), device manager 160 parses the schema, including a list of all drivers to be activated and any additional initialization parameters (e.g., IP address, port numbers, etc.) that those drivers might need. The parsed drivers are then registered, for example, using the DM_DevMgrInit( ) function, such that, by the time the initialization of device manager 160 is complete, device manager 160 is connected to exactly the set of drivers that is defined for its operating environment.

6.10. Universal Driver Abstraction

Figure 9:
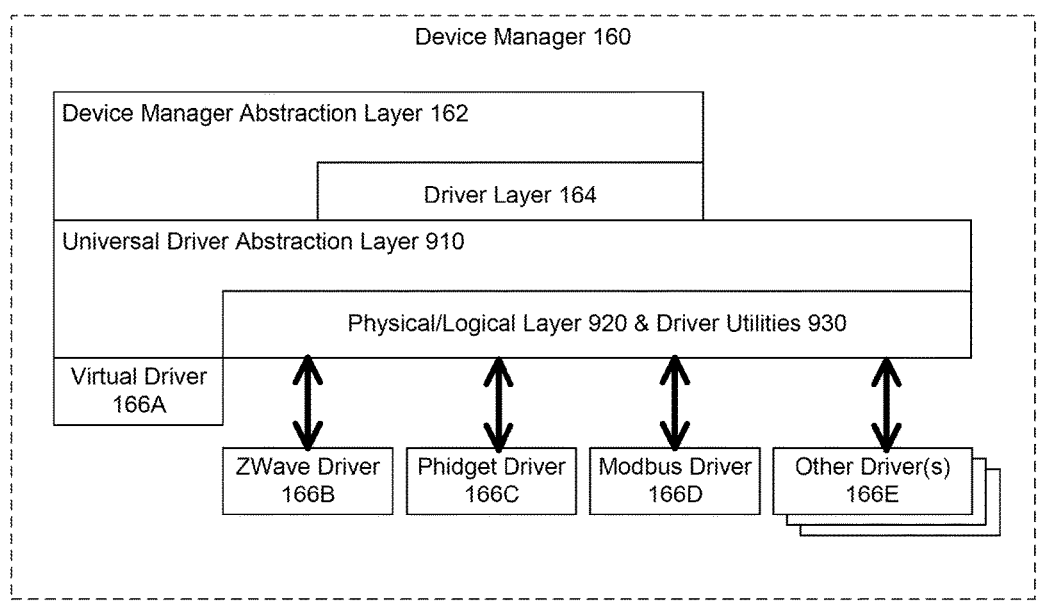
FIG. 9 illustrates a universal driver abstraction, according to an embodiment.

In an embodiment, device manager 160 comprises a universal driver (UD) abstraction layer. FIG. 9 illustrates such a universal driver abstraction layer, according to an embodiment. This universal driver abstraction layer 910 can massively simplify and unify the implementation of all drivers 166 that are built upon the universal driver abstraction by handling, in a standardized way, much of the logic required for any driver, regardless of the transport medium, such that the unique code required to create any driver is no more than necessary to read and/or write from hardware devices, as and when told to by the universal driver abstraction (e.g., based on configuration parameters set up when the driver is registered). Such an abstraction allows rapid and reliable implementation of interfaces to existing and new transport protocols in a truly driver-independent and transport-independent manner. Thus, universal driver abstraction layer 910 can represent a powerful feature of device manager 160.

In an embodiment, all drivers 166 are directly based on universal abstraction layer 910, rather than device manager abstraction layer 162. Universal driver abstraction layer 910 registers each driver 166 with device manager abstraction layer 162, thereby allowing universal driver abstraction code to insert itself between device manger abstraction layer 162 and its callback and the transport-specific code of each different registered low-level driver 166. In its position within device manager 160, universal driver abstraction layer 910 may provide its own behaviors and registration requirements in order to enable all of the potential driver activities (e.g., polling, event-driven activities, hardware read and/or write operations, recovery, debug console interface, pDev-lDev mapping, scheduling by mapping snippets based on property changes, etc.). In many cases, the result is that the driver-specific code required is no more than a couple hundred lines, i.e., just enough to communicate to the underlying transport mechanism when requested. FIG. 9 illustrates just a few possible drivers 166, including ZWave™ driver 166B, Phidget™ driver 166C, and Modbus™ driver 166D, which support ZWave™, Phidget™, and Modbus™, respectively. Some of these drivers 166, such as ZWave driver 166B, may be more complex than others, since, for example, ZWave™ driver 166B may need to incorporate maintenance and discovery functionality within the protocol itself.

In an embodiment, drivers 166 include a virtual driver 166A which implements virtual devices. Although virtual driver 166A may register with universal driver abstraction layer 910, it generally does not require the complexity of physical-to-logical mapping layer 920, and therefore, does not need to utilize the registries of physical-to-logical mapping layer 920. All other drivers 166 (e.g., drivers 166B-166E) will generally utilize these registries, since these drivers will typically need to interact with physical devices and transport protocols.

In an embodiment, universal driver abstraction layer 910 registers its own callback functions with device manager abstraction layer 162, while internally administering any callback functions registered by respective drivers 166. The callback functions that universal driver abstraction layer 910 registers with device manager abstraction layer 162 may comprise the following logic:

If the LL code has registered a device-type-specific callback function with universal driver abstraction layer 910, call the device-type-specific callback function on entry, and then again on exit;

For the "kDevMgrPutDevice" and "kDevMgrSetProperty" commands, call the driver-specific low-level callback, and, if not inhibited, handle notification by calling the DM_DevMgrNfy( ) function;

For the "kDevMgrGetProprty" command, call the low-level callback; and

For the "kDevMgrDeleteProperty" and "kDevMgrRemoveDevice" commands, call the low-level callback and handle notification automatically.

In an embodiment, universal driver abstraction layer 910 also provides built-in device and property iterators (e.g., to be used by device manager abstraction layer 162), which operate by use of standard registries, thereby allowing most drivers 166 to avoid having to implement this functionality themselves. However, a driver 166 may choose to override these default iterators by registering alternative iterators with universal driver abstraction layer 910.

In an embodiment, universal driver abstraction layer 910 provides a standardized universal driver thread which implements the logic necessary to initialize each driver 166 (and any physical devices), and run each driver 166 in a loop that polls for property changes from the physical devices. This logic may also handle termination and cleanup of the universal driver thread. The universal driver thread may be a "collaborative" thread, in that it is scheduled by the main loop logic of the architecture and, during execution for a driver 166, other threads, such as VM 230, and/or other drivers 166 are blocked. The advantage of such a collaborative universal driver thread is that it can use APIs that access global variables and registries without fear of causing confusion in other contexts. This is in contrast to preemptive "worker" threads that perform communication with transport layers asynchronously and in parallel with all other activity. Typically, worker threads must obtain their input and write their output by either becoming temporarily collaborative or queuing these activities for the collaborative universal driver thread to handle.

The basic logic for a collaborative universal driver thread may be implemented as follows, according to an embodiment:

---
Listing 17: Pseudocode for Universal Driver Thread
---

```
Function UD_UnivDriverThread:
    call DM_DevMgrInit( ) for the driver using parameters specified
in the registered driver 'initializer' function
    create and register a universal driver context
    if a driver-specific 'init' function was registered, call it
    set the driver parameters to those specified in the 'initializer'
    for all devices belonging to this driver loop
        if there is a driver specific initializer, call it
        if there is a device-type specific initializer, call it
        mark the device as initialized
    while ( not time to quit ) loop
        at regular intervals, yield control explicitly to the Marlin/Virtual
        Machine thread if the driver's specified polling interval has elapsed
            if the driver has registered a polling function, call it
                for all devices associated with the driver loop
                    if there is a registered device-type specific polling function
                        if the poll-rate element (second, minute, hour, day) has
                            changed then call the device-type specific polling
function - this allowsadaptive poll frequency
    for all devices belonging to this driver loop
        if there is a device-type specific terminator, call it
        if there is a driver specific terminator, call it
        if the device has a context record, dispose of it
    if there is a driver-specific 'term' function, call it
    call DM_DevMgrTerm( ) for the driver
    dispose of all universal driver contexts for this driver
    clear driver parameters
```

In an embodiment, this is the entire logic of universal driver abstraction layer 910, with the exception of a few utility functions. The bulk of the complexity is associated with the registry and mapping environment created and maintained by physical-to-logical layer 920, which is invoked explicitly by the code of a registered driver 166.

In embodiments, universal driver abstraction layer 910 has one or more of the following attributes:

- Provides a virtual driver, which includes the ability to associate "smart" behaviors with different virtual device types;
- Provides one or more APIs to simplify the creation of new drivers;
- Provides a universal driver abstraction to simplify the logic of drivers 166;
- Provides a physical/logical abstraction to map to and from registry representations of a physical device (pDev) and one or more associated logical devices (lDevs), when device properties change in either direction, by means of mapping snippets. The mapping snippets may be written in a second variant of the underlying base scripting language (the described adapter language being the first variant of the base scripting language); and/or
- Provides abstract support for each driver's interface to a debugging and maintenance console.

6.11. Virtual Driver

In an embodiment, virtual driver 166A is responsible for implementing virtual devices, i.e., devices that have no corresponding hardware. Since the properties of a virtual device do not reside in the standard property registries provided by the larger environment, when a virtual device property is written, for example, by a script, there is generally nothing that needs to be done since the new value has already been written to the registries. When a virtual device property is read by a script, its value may be obtained from the registries. Thus, in general, it is expected that virtual driver 166A has no active role over and above the behaviors provided by the universal driver callbacks described elsewhere herein.

In an embodiment, virtual driver 166A is able to register device implementers which allow the creation of virtual devices with complex and active property behaviors. Such virtual devices can be used to add functionality to the data architecture. To illustrate this concept, two examples will now be discussed: a "timer" device, and a "datastream" device.

Device implementers may be registered during initialization of virtual driver 166A, and essentially register additional device-type-specific callback functions that are called by universal driver abstraction layer 910, as illustrated in Listing 17. Virtual device types that register these callbacks may be referred to as "smart" virtual devices (which may be referred to herein as "s-vDevs"), whereas virtual devices that do not register these callback functions are effectively passive storage or "dumb" virtual devices (which may be referred to herein as "vDevs"). A typical s-vDev registration for the "timer" device might look as follows:

```
UD_DeviceImpl  di;
US_memzero (&di,sizeof(di) ) ;
US_strcpy(di.devType,"TimerDevice") ;        // This matches the device type in the schema
    di.devCallbackFn = VD_TimerDeviceCallbackFn;  // Register the device-specific fns. we'll
need, in this case we use all of them
    di.devPollFn = VD_TimerDevicePollFn;         // ...a custom poller function
    di.devInitTermFn = VD_TimerDeviceInitTermFn;  // ...an Init/Term fn get the timer
started
    di.devNeedCallFn = VD_TimerDeviceNeedCallFn; // ...and a function to say which
properties it wants to handle
    UD_RegisterDevImplementer (&di) ;
```

The "devInitTermFn" callback function is responsible for device-type-specific initialization and termination, as illustrated in the following example for the "timer" device:

```
static Boolean VD_TimerDeviceInitTermFn      ( // Custom Init/Term func. for a timer device
    constCharPtr        driverName,    // I:Driver name
    constCharPtr        aDevRef,       // I:Device reference
    long                globalContext, // I:Global driver context
    Boolean             init           // I:TRUE for initialization, FALSE for termination
    )                                  // R:TRUE for success, FALSE otherwise
{
```

```
if ( init )                                              // Initialization call . . .
{
  get "timerPeriod", "timerState", and "timeUnit" properties from registry
  if ( tstat is "START" | | tstat is "RUNNING" )
  {
    timeNow = time now;
    if ( , (tgtTime = get "tgtTime" property from registry) )
    {                                                    // If not done, compute it now...
      calculate delta based on timeUnit
      tgtTime = timeNow + delta;                         // Save to an invisible property so that
      set "tgtTime" property in registry, status "ack"
    }
    if ( tstat is "START" )                              // state immediately goes to RUNNING
      call DM_DevMgrNfy ( ) to set "timerState: to "RUNNING"
    set poll rate to 'max'
  } else                                                 // Presumably "EXPIRED" or "STOP"
    set poll rate to 'none';                             // don't waste time polling unless we're running!
} else                                                   // Termination call . . .
  ;
  return ret;
}
```

The corresponding polling function for the "timer" device is illustrated as follows:

```
static void VD_TimerDevicePollFn      (                  // Custom Timer Device poll function
    constCharPtr              driverName,                // I:Driver name
    long                      globalContext,             // I:Global driver context
    constCharPtr              aDevRef,                   // I:Device reference
    constCharPtr              aDevName,                  // I:Device name
    anonPtr                   devContext                 // IO:Device context
    )                                                    // R:void
{
  timeNow = UT_StringToDateTime(NULL,kGregorianCAL) ;
  RG_LookupDevice(aDevRef,_dN,kInputIsDeviceID+kOutputIsMarlinName) ;
  if ( !(tgtTime == get "tgtTime" property from registry) )
                                                         // should have been created
                                                         // during initialization . . .
  {                                                      // otherwise compute it now . . .
    stop the polling calls completely
    log an error
    goto ImmediateExit;
  }
  if ( tgtTime <= timeNow )
  {                                                      // Notify and set the timerState to EXPIRED
    delete the invisible '_tgtTime' property so we re-compute it next time they choose
START
    set "timerState" property to "EXPIRED" in the registry
    stop the polling calls completely
  } else
  {
    opts = 0;                                            // now pick the slowest poll rate that
    delta = tgtTime - timeNow;                           // will ensure an accurate end time
    if ( delta <= 2 * kOneSecond ) opts = kPollDevMaxRate;    //   we refine this poll rate
                                                         //   in our poller so we're
    else if ( delta <= 2 * kOneMinute ) opts = kPollDevPerSecond;   //   always causing
                                                         //   the smallest safe load
                                                         //   in the CPU
    else if ( delta <= 2 * kOneHour ) opts = kPollDevPerMinute;     //   to guarantee
                                                         //   accurate detection of timer expiry
    else if ( delta <= 2 * 1 ) opts = kPollDevPerHour;
    else opts = kPollDevPerDay;
    set poll rate to opts'                               // don't waste time polling faster than needed!
  }
ImmediateExit:
}
```

As shown above, the polling function handles all logic associated with expiration of the timer, while also dynamically altering the polling rate to minimize device implementation overhead.

The logic for handling what happens when the timer state is altered (e.g., by a user in a GUI of interface 114, or in a script), is found in the "kDevMgrSetProperty" case within the registered device-type callback function as follows:

```
case kDevMgrSetProperty:    // set property value (status by implication is 'pending')
    if ( aDevProperty is "timerState" )   // called after higher layers have updated the
                                          // property registry with
        get "timerState" property from registry
        if ( tstat is "START" )       // just started timer...re-use our initialization code
            VD_TimerDeviceInitTermFn(driverName,aDevRef,globalContext,YES);
        else if ( tstat is "STOP" )       // just stopped the timer...
            if ( get "tgtTime" from registry )
                delta = tgtTime - time now;
                if ( delta > 0 )          // if any time left, update device so that a start will
                {                         // pick up where we left off like a stopwatch
                    compute 'unit' from delta
                    update "timeUnit" and "timerPeriod" properties as appropriate
                } else                    // If you STOP and its EXPIRED, set the period to 0...
                    set "timerPeriod" property to 0 in registries
                stop all polling calls...
                delete the invisible '_tgtTime' property
    break;
```

The code above results in an active virtual timer device whose invocation is entirely controlled via universal driver abstraction layer 910. Other drivers 166 have the potential to make use of this functionality to create "hybrid" devices. When based on the physical/logical abstraction layer 910, these drivers can implement any logic within snippets of physical/logical abstraction layer 910 (e.g., written in a universal driver language similar to the adapter language and similarly based on the base scripting language).

Another example of a smart virtual device is a "datastream" device. The "datastream" device is a significantly more complex virtual device, for which up to, for example, ten "channel" property values can be driven from other device property values (e.g., via the registries, and thus, regardless of driver) and for which those channel property values and any changes to them can be accurately logged to platform 110 (e.g., and viewed in a GUI of interface 114). Thus, a detailed chronological history of any device properties can be created on platform 110. In essence, the "datastream" device acts as a built-in oscilloscope or logic analyzer that enables examination of the time history of device properties. The "datastream" device may be implemented using fundamentally similar registered callback functions as the "timer" device.

6.12. Physical/Logical Layer

In an embodiment, physical/logical layer 920 resides below universal driver abstraction layer 910 and maps physical device representations (pDevs) to logical device representations (lDevs) by using scripts associated with the pDev(s) and lDev(s) involved. These mappings may be written in the base scripting language, or in a subset of the base scripting language similar to the adapter language that was used to create snippets in driver layer 164. In the case of drivers 166 that are based on the universal driver abstraction layer 910, pDev and lDev properties may be held in an entirely separate set of registries, implemented in an identical or similar manner to the standard architecture registries, but visible only to drivers registered with universal driver abstraction layer 910.

In an embodiment, physical/logical layer 920 solves two problems: (1) mapping hardware data structures and command protocols to and from pDev properties; and (2) mapping pDev and lDev properties to and from each other by invoking mapping snippets, as appropriate, whenever a device property is changed in either direction. lDevs may be associated with devices known to the rest of the system (i.e., via driver layer 164) by publishing the lDevs. Physical devices may have complex structures that are designed to map exactly to the particular hardware arrangement and automate the process of transferring a hardware value to and from the transport protocol, such that the low-level driver code itself does not need to know how this is done. The low-level driver code simply reads and writes values, as, where, and when it is requested to do so with all parameters required by the transport being supplied by physical/logical layer 920. Thus, the low-level driver code is relatively simple, and the problem is moved into the specification of the pDevs, lDevs, and the mapping snippets used to join any given pDev(s) to one or more child lDevs, which, in turn, are mapped to the data architecture via driver layer 164.

As with the adapter language, the physical/logical language used to write the mapping snippets in physical/logical layer 920 may be a variant of the base scripting language. However, the context in which it runs is predefined by the pDevs and lDevs involved and the property(s) in either the pDevs or lDevs that caused the mapping snippet to run in the first place. Like the adapter language, the physical/logical language may have an implied direction from one device to another whenever a mapping snippet is run. When running in the direction from pDev to lDev, this direction may be known as "kToLogical", and when running in the direction from lDev to pDev, this direction may be known as "kToPhysical". Similarly to the adapter language, this directionality may be indicated by the use of either the "@" token which indicates that the property relates to the device on the source side of the mapping, or the "@@" token which indicates that the property relates to the device on the target side of the mapping. Properties on either side of the mapping can be specified, read, and written as desired in any snippet context simply by using the appropriate token.

To illustrate how the logic within physical/logical layer 920 works, a real-world example will be described. The example will use a general purpose input/output (GPIO) Modbus™ device to show how this device can be mapped via physical/logical layer 920 all the way to and from the data architecture device properties and the GUI of interface 114. The GPIO device chosen is the DataNab Ai8_R13 (a device with 8 analog inputs and 13 relay outputs). The example will attempt to map some of the generalized input/output (I/O) pins on this hardware device in order to create a hybrid device that behaves identically to a dedicated thermostate hardware device. To do this, an AIN on the GPIO device must be connected to a thermistor in order to measure temperature, and two relay outputs need to be connected to a control for an air conditioner and heater unit. With the appropriate mapping snippet, a hybrid device can be created that is indistinguishable from a real thermostat.

First, the Modbus™ specification for the GPIO device may be converted into a format used by physical/logical layer 920. In the described example, this format is XML. However, it should be understood that other formats are possible. Modbus™ defines devices in terms of 8-bit and 16-bit registers and one-bit logical "coils." These hardware registers have specific purposes and may be packed. Each register has a unique address within the device. This is a different way of representing data than the data architecture properties or the internal registries discussed elsewhere herein. The definition of the Ai8_R13 physical device type, in XML created from the device specification, may be as follows:

```
<Row>
  <Name>Ai8_R13</Name>
  <Parent>pDevice</Parent>
  <Flags>0x1</Flags>
  <Description>Modbus 8Ch Analog In / 13Ch Relay Out Module</Description>
  <DevType>ModbusDevice</DevType>
  <Manufacturer>DataNab</Manufacturer>
  <Params>3,6</Params>
  <Properties>
    <Property> <Name>reserved</Name> <Type>Int16[5]</Type> <Address>0</Address> <Used>N</Used> </Property>
    <Property> <Name>firmwareVersion</Name> <Type>Int16</Type> <Address>5</Address> <Used>N</Used> </Property>
    <Property> <Name>address</Name> <Type>UnsInt16</Type> <Address>6</Address> <Used>Y</Used> </Property>
    <Property> <Name>model</Name> <Type>Int16</Type> <Address>7</Address> <Used>N</Used> </Property>
    <Property> <Name>picFirmwareVersion</Name> <Type>Int16</Type> <Address>9</Address> <Used>N</Used> </Property>
    <Property> <Name>baudRate</Name> <Type>Int16</Type> <Address>15</Address> <Used>Y</Used> </Property>
    <Property> <Name>relay</Name> <Type>Int16[13]</Type> <Address>100</Address> <Used>Y</Used> </Property>
    <Property> <Name>switch1_8</Name> <Type>Int16</Type> <Address>116</Address> <Used>N</Used> </Property>
    <Property> <Name>switch9_13</Name> <Type>Int16</Type> <Address>117</Address> <Used>N</Used> </Property>
    <Property> <Name>input</Name> <Type>Int16[8][2]</Type> <Address>118</Address> <Used>N</Used> </Property>
    <Property> <Name>date</Name> <Type>Int16[8][5]</Type> <Address>134</Address> <Used>N</Used> </Property>
    <Property> <Name>mode</Name> <Type>Int16</Type> <Address>174</Address> <Used>N</Used> </Property>
    <Property> <Name>rawInput</Name> <Type>Int16[8]</Type> <Address>175</Address> <Used>Y</Used> </Property>
    <Property> <Name>scale</Name> <Type>Int16[8]</Type> <Address>183</Address> <Used>Y</Used> </Property>
  </Properties>
</Row>
```

The device properties are listed sequentially within the <Properties> field. In this example, each device property has a <Name> field based on the device specification, a <Type> field that matches the type of hardware, an <Address> field that specifies the property address in whatever format the driver requires or understands (e.g., an integer in this case), and a <Used> field that specifies whether or not this device property needs to be read and written or if it can be ignored. Notably, the device property types involve sized integers (e.g., Int8, Int16, Int32, etc.) and may also involve arrays up to two dimensions (e.g., Int16[8][5]). This simply reflects the hardware, which must be matched in order to take over the packing and unpacking work that would otherwise have to be performed by the low-level driver code. This implies that, since the mapping snippets, which must access these device properties when performing the physical-to-logical and/or logical-to-physical mappings, are based on the base scripting language, the base scripting language should be able to understand sized integers, as well as array indexing within device properties (e.g., "@@.input[3][4]"). While this feature has not been previously described with respect to the base scripting language, it may be inherent in the base scripting language and its variants, even though it may only typically be used within mapping snippets when required by hardware considerations. Generally, by the time that these device properties are output from the other side of driver layer 164, all evidence of non-standard data type sizes has been resolved either in physical/logical layer 920 or driver layer 164.

The definition of the logical thermostat device type (IThermostat), to and from which the GPIO device is mapped, may be as follows:

```
<Row>
  <Name>lDevice</Name>
  <Parent></Parent>
  <Flags>0x0</Flags>
  <Description>A logical Device</Description>
  <DevType>LogicalDevice</DevType>
  <Properties>
```

```
    <Property> <Name>id</Name> <Type>String</Type> </Property>
    <Property> <Name>name</Name> <Type>String</Type> </Property>
    <Property> <Name>type</Name> <Type>String</Type> </Property>
  </Properties>
</Row>
<Row>
  <Name>IThermostat</Name>
  <Parent>IDevice</Parent>
  <Flags>0x0</Flags>
  <Description>A logical Thermostat device</Description>
  <DevType>Thermostat, Device</DevType>
  <Properties>
    <Property> <Name>batteryCharge</Name> <Type>Integer</Type> </Property>
    <Property> <Name>batteryLow</Name> <Type>Boolean</Type> </Property>
    <Property> <Name>fanMode</Name> <Type>Integer</Type> </Property>
    <Property> <Name>hvacMode</Name> <Type>Integer</Type> </Property>
    <Property> <Name>operatingState</Name> <Type>Integer</Type> </Property>
    <Property> <Name>heatRelayIsOn</Name> <Type>Boolean</Type> </Property>
    <Property> <Name>coolRelayIsOn</Name> <Type>Boolean</Type> </Property>
    <Property> <Name>fanRelayIsOn</Name> <Type>Boolean</Type> </Property>
    <Property> <Name>tempScaling</Name> <Type>String</Type> </Property>
    <Property> <Name>temperature</Name> <Type>Real</Type> </Property>
    <Property> <Name>setPoint</Name> <Type>Real</Type> </Property>
    <Property> <Name>lockoutMode</Name> <Type>Integer</Type> </Property>
    <Property> <Name>minOnOffTime</Name> <Type>Integer</Type> </Property>
    <Property> <Name>tempDifferential</Name> <Type>Real</Type> </Property>
  </Properties>
</Row>
```

Notably, the definition of the logical thermostat device type lacks non-standard data type sizes, and is closer to the specification for the thermostat device type within the data architecture, although different in many respects.

As illustrated, IThermostat inherits some properties from the ancestral logical device type "IDevice"—namely, the "id", "name", and "type" properties, which bridge the gap, through the mapping implemented by driver layer 164, to the corresponding data architecture device type "Thermostat", which may itself be defined, as follows:

```
<Row>
  <Name>pubDevice</Name>
  <Parent></Parent>
  <Flags>0x0</Flags>
  <Description>A Public Device</Description>
  <DevType>Device</DevType>
  <Properties>
    <Property> <Name>id</Name> <Type>String</Type> </Property>
    <Property> <Name>name</Name> <Type>String</Type> </Property>
    <Property> <Name>type</Name> <Type>String</Type> </Property>
    <Property> <Name>group_name</Name> <Type>String</Type> </Property>
    <Property> <Name>group_ref</Name> <Type>String</Type> </Property>
  </Properties>
</Row>
<Row>
  <Name>Thermostat</Name>
  <Parent>pubDevice</Parent>
  <Flags>0x0</Flags>
  <Description>A thermostat device.</Description>
  <DevType>Device</DevType>
  <Properties>
    <Property> <Name>fanMode</Name> <Type>String</Type> </Property>
    <Property> <Name>fanOperatingState</Name> <Type>String</Type> </Property>
    <Property> <Name>hvacMode</Name> <Type>String</Type> </Property>
    <Property> <Name>operatingState</Name> <Type>String</Type> </Property>
    <Property> <Name>roomTemp</Name> <Type>Real</Type> </Property>
    <Property> <Name>setpoint</Name> <Type>Integer</Type> </Property>
    <Property> <Name>temperatureScale</Name> <Type>String</Type> </Property>
  </Properties>
</Row>
```

Like IThermostat, the public-device-type Thermostat inherits basic properties from an ancestral device type "pubDevice". As described elsewhere herein, driver layer 164 bidirectionally maps the properties in the IDev to corresponding properties in the public device type. Since IDev definitions are shared across all drivers registered with universal driver abstraction layer 910, IDev properties tend to be an aggregate of the basic properties needed across all different drivers in order to connect via driver layer 164. Thus, the process from pDev to IDev to public device is one of gradual simplification and abstraction into a form that should be easily understood by novice users.

All drivers 166 that are registered with universal driver abstraction layer 910 may share the IDev types. Thus, there may be only one entry in driver layer 164 for all of them under "Universal". This means that all drivers 166 will operate identically from the IDev layer upwards, without any need for the low-level driver code to even consider anything except the pDev definition, which itself may be intimately tied to the driver's code and addressing and command scheme.

For reference, some example driver layer 164 definitions for properties appearing in the IThermostat device type follow:

```
"Universal": {
    "property": {
        "name": "batteryLow",
        "type": "BooleanValue"
    }
}
"Universal": {
    "property": {
        "name": "hvacMode",
        "type": "IntegerValue"
    },
    "read": "@@.hvacMode = IndexSet(@.hvacMode + 1,
\"OFF\",\"COOL\",\"HEAT\",\"AUTO\");",
    "write": "a = SetIndex(@.hvacMode, \"OFF\",\"COOL\",
\"HEAT\",\"AUTO\");
@@.hvacMode = (a) ? a - 1 : 0;"
}
"Universal": {
    "property": {
        "name": "operatingState",
        "type": "IntegerValue"
    },
    "read": "@@.operatingState = IndexSet(@.operatingState + 1,
\"OFF\",\"COOLING\",\"HEATING\",\"IDLE\");"
}
```

Once all the device type definitions have been specified, actual instances of the pDev and IDev are created. These may be defined via XML as follows:

```
This is the pDev "MbBlahBlahXXX01" of device type
"Mb_Ai8_R13" (and Modbus address 254)
    <Row>
        <Id>MbBlahBlahXXX01</Id>
        <Driver>Modbus_rtu</Driver>
        <Type>Mb_Ai8_R13</Type>
        <Flags>kPhysicalDevice</Flags>
        <Address>254</Address>
        <Mappings>
            <Mapping>
                <TargetDevice>MbBlahBlahXXX01CH1</TargetDevice>
                <Properties>rawInput[0], relay[1], relay[2]</Properties>
                <Snippet>ToThermostat_Ai8_R13</Snippet>
                <Params>0,-20,120,1,2</Params>
            </Mapping>
        </Mappings>
    </Row>
    This is the IDev "MbBlahBlahXXX01CH1" of device type
    "IThermostat"
    <Row>
        <Id>MbBlahBlahXXX01CH1</Id>
        <Driver>Modbus_rtu</Driver>
        <Type>IThermostat</Type>
        <Flags>kPublishDevice</Flags>
        <Parent>MbBlahBlahXXX01</Parent>
```

-continued

```
        <Mappings>
            <Mapping>
                <TargetDevice>MbBlahBlahXXX01</TargetDevice>
                <Properties>hvacMode, setPoint, minOnOffTime,
    tempDifferential, temperature</Properties>
                <Snippet>ToThermostat_Ai8_R13</Snippet>
                <Params>0,-20,120,1,2</Params>
            </Mapping>
        </Mappings>
    </Row>
```

As illustrated, the pDev definition specifies the device address, in the format appropriate for the transport, and the device type. This information is used to create the device and begin communicating with the device via Modbus™ driver 166D. The properties of the device are defined in the Mb_Ai8_R13 device type, and the <Address>, <Access>, and <Type> fields instruct driver 166D how and when to read and write those device properties. Having read a property value from the hardware of a physical device, physical/logical layer 920 can receive the extracted value in the format specified in the pDev (e.g., Int16[8]), unpack it as necessary, and write the value to the internal driver pDev registry values. However, since pDevs are not connected via driver layer 164, none of these property values are visible to the rest of the system (i.e., on the other side of physical/logical layer 920).

To make these property values visible, they may be moved as appropriate into the IDevs defined in "MbBlahBlahXXX01CH1". The IDev device can be created directly from the given IDev specification. All of its property types are known and can be written into the IDev by the rest of the system via driver layer 164. However, in the other direction, additional logic can be used to get these properties into a form that can be written to the corresponding pDev.

Both of these bits of logic are specified in the <Mappings> field of the pDev and IDev. The <Mappings> field may contain any number of individual <Mapping> entries, which each specifies a driver mapping snippet to be run, the target device for the mapping (the source is implied by context), any parameters (if required) to be handed to the driver mapping snippet when it is run, and a list of source properties, any of which will trigger the specified driver mapping snippet to be run should they change in the implied write direction. For an IDev specification, the implied write direction is "kToPhysical", and the target device is, by definition, the parental pDev. For a pDev, there may be multiple child IDev devices. Thus, while the direction is always "kToLogical", the target device may vary with each mapping. This allows a complete set of mapping logic to be handled by a set of dedicated mapping snippets, each of which is focused on particular changed properties. This can be particularly useful for generalizing device handling, for example, in the case of ZWave™, where properties are discovered and can be handled independently based on dynamically-discovered command classes which the device announces that it is capable of supporting.

A definition of the referenced mapping snippet "ToThermostat_Ai8_R13" may be as follows in Listing 18:

Listing 18: Example Snippet "ToThermostat_Ai8_R13" Represented in XML

```
<Row>
    <Name>ToThermostat_Ai8_R13</Name>
    <Driver>Modbus_</Driver>
    <Description>Converts an Ai8_R13 analog input+relay(s) to a logical thermostat device.
```

Listing 18: Example Snippet "ToThermostat_Ai8_R13" Represented in XML

Input channels may be associated with up to two Ai8_R13 Relays by specifying 'heatRelay' and 'coolRelay' parameters which give the relay number involved (0..12). If the value passed is unknown, that relay is uncontrolled. The 'minTemp' and 'maxTemp' parameters define the real scaling (and offset) to be applied to the raw analog input (0..1023) to get temperature into the desired scale. The 'chan' parameter specifies which analog input to use (0..7). The logical device snippet itself performs all the logic necessary to simulate an actual (simple) thermostat device! Obviously the logical thermostat implementation can be made more sophisticated simply by changing the snippet.</Description>
  <ToLogical>
script ToThermostat_Ai8_R13(integer chan,real minTemp, real maxTemp, integer heatRelay, integer coolRelay)
{
  @@.batteryCharge = unknown;
  @@.batteryLow = unknown;
  @@.temperature = Round((((@.rawInput[chan] & 0x03FF) * (maxTemp − minTemp)/1024 + minTemp)*2)/2.0; // accuracy no more than 0.5 deg
  @@.fanRelayIsOn = unknown;
  if ( HasValue("coolRelay") ) @@.coolRelayIsOn = (@.relay[coolRelay] != 0); // reads back as either 0 or 1 despite writing 0/1000!
  else @@.coolRelayIsOn = unknown;
  if ( HasValue("heatRelay") ) @@.heatRelayIsOn = (@.relay[heatRelay] != 0); // ditto
  else @@.heatRelayIsOn = unknown;
  if ( not Known("@.hvacMode","l") ) @@.hvacMode = 0;
  if ( @@.hvacMode == 0 ) @@.operatingState = 0;          // off
  elseif ( @@.coolRelayIsOn ) @@.operatingState = 1;
  elseif ( @@.heatRelayIsOn ) @@.operatingState = 2;
  else @@.operatingState = 3;                             // idle
}
  </ToLogical>
  <ToPhysical>
script ToThermostat_Ai8_R13(integer chan,real minTemp, real maxTemp, integer heatRelay, integer coolRelay)
{
  if ( not HasValue("@._waitStart","L") )                 // initialization...
  {
    Invoke("ToThermostat_Ai8_R13_Init",params); // done this way to show possible!
  }
  @.minOnOffTime = 0;
  elapsed = (StringToTime( ) − @._waitStart >= TimeUnit("second") * @.minOnOffTime);
  on = 1000; off = 0;
  if ( elapsed and @.hvacMode == 1 )              // 1 = cool
  {
    @._heatOn = false;
    if ( HasValue("heatRelay") ) @@.relay[heatRelay] = off;    // <= 500 is off
    if ( @.temperature <= @.setPoint − @.tempDifferential )
    {
      if ( @._coolOn )
      {
        @._coolOn = false;
        @._waitStart = StringToTime( );
        if ( HasValue("coolRelay") ) @@.relay[coolRelay] = off;    // <= 500 is off
      }
    }
    if ( @.temperature >= @.setPoint + @.tempDifferential )
    {
      if ( not @._coolOn )
      {
        @._coolOn = true;
        @._waitStart = StringToTime( );           // remember when we set it on
        if ( HasValue("coolRelay") ) @@.relay[coolRelay] = on;    // >500 is on
      }
    }
  } elseif ( elapsed and @.hvacMode == 2 )         // 2 = heat
  {
    @._coolOn = false;
    if ( HasValue("coolRelay") ) @@.relay[coolRelay] = off;    // <= 500 is off
    if ( @.temperature >= @.setPoint + @.tempDifferential )
    {
      if ( @._heatOn )
      {
        @._heatOn = false;
        @._waitStart = StringToTime( );           // remember when we set it on
        if ( HasValue("heatRelay") ) @@.relay[heatRelay] = off;    // <= 500 is off
      }
    }
    if ( @.temperature <= @.setPoint − @.tempDifferential )
    {

Listing 18: Example Snippet "ToThermostat_Ai8_R13" Represented in XML

```
        if ( not @._heatOn )
        {
            @._heatOn = true;
            @._waitStart = StringToTime( );         // remember when we set it on
            if ( HasValue("heatRelay") ) @@.relay[heatRelay] = on;    // >500 is on
        }
    }
} elseif ( elapsed and @.hvacMode == 3 )         // 3 = auto
{
    if ( @.temperature >= @.setPoint + @.tempDifferential )
    {
        if ( @._heatOn )
        {
            @._heatOn = false;
            @._coolOn = false;
            @._waitStart = StringToTime( );     // use this to prevent immediate cooling
            if ( HasValue("coolRelay") ) @@.relay[coolRelay] = off;   // <= 500 is off
            if ( HasValue("heatRelay") ) @@.relay[heatRelay] = off;   // <= 500 is off
        } elseif ( not @._coolOn )
        {
            @._coolOn = true;
            @._waitStart = StringToTime( );         // remember when we set it on
            if ( HasValue("coolRelay") ) @@.relay[coolRelay] = on;    // >500 is on
            if ( HasValue("heatRelay") ) @@.relay[heatRelay] = off;   // <= 500 is off
            @._heatOn = false;
        }
    }
    if ( @.temperature <= @.setPoint - @.tempDifferential )
    {
        if ( @._coolOn )
        {
            @._coolOn = false;
            @._heatOn = false;
            @._waitStart = StringToTime( );     // use this to prevent immediate heating
            if ( HasValue("coolRelay") ) @@.relay[coolRelay] = off;   // <= 500 is off
            if ( HasValue("heatRelay") ) @@.relay[heatRelay] = off;   // <= 500 is off
        } elseif ( not @._heatOn )
        {
            @._heatOn = true;
            @._waitStart = StringToTime( );         // remember when we set it on
            if ( HasValue("heatRelay") ) @@.relay[heatRelay] = on;    // >500 is on
            if ( HasValue("coolRelay") ) @@.relay[coolRelay] = off;   // <= 500 is off
            @._coolOn = false;
        }
    }
} elseif ( @.hvacMode == 0 )          // 0 or anything else means off/do nothing
{
    @._heatOn = false;
    @._coolOn = false;
    @._waitStart = 0;
    if ( HasValue("coolRelay") ) @@.relay[coolRelay] = off;    // <= 500 is off
    if ( HasValue("heatRelay") ) @@.relay[heatRelay] = off;    // <= 500 is off
}
}
</ToPhysical>
</Row>
```

Since a hybrid thermostat is being created out of basically "dumb" GPIO signals, this snippet may represent the worst case as far as snippet complexity is concerned. Most mapping snippets may only be a few lines long. As illustrated, the code of the snippet, represented in XML in Listing 18, comprises two optionally-parameterized script definitions. Each of these two script definitions are written in a fully contained subset of the base scripting language (e.g., without the real-time features of the base scripting language).

In an embodiment, snippets in physical/logical layer 920 and driver layer 164 must always run to completion, without becoming suspended in infinite loops or performing other lengthy operations, since these snippets delay handling of other devices associated with the same driver. If persistent state is required between invocations of a snippet, it may be implemented by storing state values into visible or hidden properties (e.g., hidden properties are indicated by a leading underscore character "_" in the illustrated snippet of Listing 18) of the devices involved. For example, the thermostat logic in Listing 18 does this quite extensively. Notably, the snippet in Listing 18 also uses the extended array syntax of the base scripting language (e.g., "@@.relay[coolRelay]=off"), as well as its ability to pass parameters, to be used in a script, from the mapping specification in the device.

Associating devices with device types and filling out the necessary mappings could be somewhat complex. Thus, in an embodiment, the abstraction provided by physical/logical layer 920 provides templates (e.g., specified in XML) which may be chosen based on the physical device type. These templates may automate the process of creating the pDev, lDev(s), and mapping snippets for newly-added devices. For example, if a user connects a new hardware thermostat device to gateway 120 via a ZWave driver, the template below may be automatically provided (e.g., displayed in a user interface):

```
<TemplateName>Zw_RTC_ThermostatTempl</TemplateName>
<TemplateDescription>Publishes and handles an RTC Thermostat
</TemplateDescription>
<pDev>
    <Id>0</Id>
    <Driver></Driver>
    <Type>Zw_RTCThermostat</Type>
    <Flags>kPhysicalDevice,kInhibitDevice</Flags>
    <Address></Address>
    <Mappings>
        <Mapping>
            <TargetDevice>1</TargetDevice>
            <Properties>batte_batteLvl, sensrMulti_sensrVal,
thermOperState_prp1_operaState, thermMode_lvl_mode,
thermSetpo_value</Properties>
            <Snippet>ToThermostat_ZWaveTest</Snippet>
            <Params></Params>
        </Mapping>
    </Mappings>
</pDev>
<lDevs>
    <Row>
        <Id>1</Id>
        <Driver></Driver>
        <Type>lThermostat</Type>
        <Flags>kPublishDevice</Flags>
        <Parent>0</Parent>
        <Mappings>
            <Mapping>
                <TargetDevice>0</TargetDevice>
                <Properties>hvacMode, setPoint, minOnOffTime,
tempDifferential</Properties>
                <Snippet>ToThermostat_ZWaveTest</Snippet>
                <Params></Params>
            </Mapping>
        </Mappings>
    </Row>
</lDevs>
```

As illustrated, the template packages together the definitions for the pDev and lDev(s) and the associated mappings (which, collectively, may be referred to herein as a "processing tree"). Specific devices are referenced using a device index into the processing tree. When instantiating devices using the template, the index value "0" is replaced wherever it is used by the actual pDev reference which is assigned at runtime. Index values "1" and upwards represent lDev devices that have been created, and are similarly replaced during instantiation.

The differences between drivers, and how those differences are handled, will now be described through an example, according to an embodiment. A pDev type definition for a ZWave™ hardware thermostat is illustrated below:

```
<Row>
    <Name>Zw_RTCThermostat</Name>
    <Parent>pDevice</Parent>
    <Flags>0x1</Flags>
    <Description>Radio Thermostat Company of America (RTC) - Thermostat General V2 -
[b:0x4,g:0x8,s:0x6][t:0x6401,i:0x107]</Description>
    <DevType>ZWaveDevice</DevType>
    <Manufacturer>Radio Thermostat Company of Ame</Manufacturer>
    <Params>Zw_Thermostat_General_V2-0408-A008-704C</Params>
    <Properties>
        <Property> <Name>basic_value</Name> <Type>UnsInt8</Type>
<Address>0x20010300</Address> <Access>RW0</Access> <Used>Y</Used> </Property>
        <Property> <Name>clock_lvl_hour</Name> <Type>UnsInt8</Type>
<Address>0x8101060000</Address> <Access>RW10</Access> <Used>Y</Used> </Property>
        <Property> <Name>clock_lvl_weekd</Name> <Type>UnsInt8</Type>
<Address>0x8101060001</Address> <Access>RW10</Access> <Used>Y</Used> </Property>
        <Property> <Name>clock_minut</Name> <Type>UnsInt8</Type>
<Address>0x81010601</Address> <Access>RW10</Access> <Used>Y</Used> </Property>
        <Property> <Name>indic_value_offDisab</Name> <Type>Boolean</Type>
<Address>0x8701030001</Address> <Access>RW0</Access> <Used>Y</Used> </Property>
        <Property> <Name>indic_value_onEnabl</Name> <Type>Boolean</Type>
<Address>0x8701030002</Address> <Access>RW0</Access> <Used>Y</Used> </Property>
        <Property> <Name>indic_value</Name> <Type>UnsInt8</Type>
<Address>0x87010300</Address> <Access>RW0</Access> <Used>Y</Used> </Property>
        <Property> <Name>manufSpeci_manufId</Name> <Type>UnsInt16</Type>
<Address>0x72010500</Address> <Access>R0</Access> <Used>Y</Used> </Property>
        <Property> <Name>manufSpeci_produTypId</Name> <Type>UnsInt16</Type>
<Address>0x72010501</Address> <Access>R0</Access> <Used>Y</Used> </Property>
        <Property> <Name>manufSpeci_produId</Name> <Type>UnsInt16</Type>
<Address>0x72010502</Address> <Access>R0</Access> <Used>Y</Used> </Property>
        <Property> <Name>sensrMulti_sensrTyp</Name> <Type>String</Type>
<Address>0x31020500</Address> <Access>R0</Access> <Used>Y</Used> </Property>
        <Property> <Name>sensrMulti_lvl_size</Name> <Type>UnsInt8</Type>
<Address>0x3102050100</Address> <Access>R0</Access> <Used>Y</Used> </Property>
        <Property> <Name>sensrMulti_lvl_scale</Name> <Type>UnsInt8</Type>
<Address>0x3102050101</Address> <Access>R0</Access> <Used>Y</Used> </Property>
        <Property> <Name>sensrMulti_lvl_preci</Name> <Type>UnsInt8</Type>
<Address>0x3102050102</Address> <Access>R0</Access> <Used>Y</Used> </Property>
        <Property> <Name>sensrMulti_sensrVal</Name>
<Type>Int8[@.sensrMulti_lvl_size]</Type> <Address>0x31020502</Address> <Access>R0</Access>
<Used>Y</Used> </Property>
        <Property> <Name>thermMode_lvl_mode</Name> <Type>String</Type>
<Address>0x4002030000</Address> <Access>RW0</Access> <Used>Y</Used> </Property>
        <Property> <Name>thermMode_Sup_bm_X</Name> <Type>UnsInt8</Type>
<Address>0</Address> <Access>R</Access> <Used>Y</Used> </Property>
        <Property> <Name>thermMode_Sup_bm</Name> <Type>UnsInt8[@.thermMode_Sup_bm_X]</Type>
```

```xml
<Address>0x40020500</Address> <Access>R0</Access> <Used>Y</Used> </Property>
    <Property> <Name>thermOperState_prp1_operaState</Name> <Type>String</Type>
<Address>0x4202030000</Address> <Access>R0</Access> <Used>Y</Used> </Property>
    <Property> <Name>thermOperState_thermOperLogSup_bm_X</Name> <Type>UnsInt8</Type>
<Address>0</Address> <Access>R</Access> <Used>Y</Used> </Property>
    <Property> <Name>thermOperState_thermOperLogSup_bm</Name>
<Type>UnsInt8[@.thermOperState_thermOperLogSup_bm_X]</Type> <Address>0x42020400</Address>
<Access>R0</Access> <Used>Y</Used> </Property>
    <Property> <Name>thermOperState_Log_rptToFollo</Name> <Type>UnsInt8</Type>
<Address>0x42020600</Address> <Access>R16</Access> <Used>Y</Used></Property>
    <Property> <Name>thermOperState_Log_vg1</Name>
<Type>Struct[@.thermOperState_Log_rptToFollo]</Type> <Address>0x42020601</Address>
<Access>R16</Access> <Used>Y</Used> </Property>
    <Property> <Name>.prp1_operaStateLogTyp</Name> <Type>UnsInt8</Type>
<Address>0x420206010000</Address> <Access>R16</Access> <Used>Y</Used> </Property>
    <Property> <Name>.usageTodayHours</Name> <Type>UnsInt8</Type>
<Address>0x4202060101</Address> <Access>R16</Access> <Used>Y</Used> </Property>
    <Property> <Name>.usageTodayMinut</Name> <Type>UnsInt8</Type>
<Address>0x4202060102</Address> <Access>R16</Access> <Used>Y</Used> </Property>
    <Property> <Name>.usageYesteHours</Name> <Type>UnsInt8</Type>
<Address>0x4202060103</Address> <Access>R16</Access> <Used>Y</Used> </Property>
    <Property> <Name>.usageYesteMinut</Name> <Type>UnsInt8</Type>
<Address>0x4202060104</Address> <Access>R16</Access> <Used>Y</Used> </Property>
    <Property> <Name>thermFanMode_lvl_fanMode</Name> <Type>String</Type>
<Address>0x4401030000</Address> <Access>RW0</Access> <Used>Y</Used> </Property>
    <Property> <Name>thermFanMode_Sup_bm_X</Name> <Type>UnsInt8</Type>
<Address>0</Address> <Access>R</Access> <Used>Y</Used> </Property>
    <Property> <Name>thermFanMode_Sup_bm</Name>
<Type>UnsInt8[@.thermFanMode_Sup_bm_X]</Type> <Address>0x44010500</Address>
<Access>R0</Access> <Used>Y</Used> </Property>
    <Property> <Name>thermFanState_lvl_fanOperState</Name> <Type>String</Type>
<Address>0x4501030000</Address> <Access>R0</Access> <Used>Y</Used> </Property>
    <Property> <Name>thermSetpo_lvl_setpoTyp</Name> <Type>String</Type>
<Address>0x4302030000</Address> <Access>RW0</Access> <Used>Y</Used> </Property>
    <Property> <Name>thermSetpo_lvl_size</Name> <Type>UnsInt8</Type>
<Address>0x4302030100</Address> <Access>RW0</Access> <Used>Y</Used> </Property>
    <Property> <Name>thermSetpo_lvl_scale</Name> <Type>UnsInt8</Type>
<Address>0x4302030101</Address> <Access>RW0</Access> <Used>Y</Used> </Property>
    <Property> <Name>thermSetpo_lvl_preci</Name> <Type>UnsInt8</Type>
<Address>0x4302030102</Address> <Access>RW0</Access> <Used>Y</Used> </Property>
    <Property> <Name>thermSetpo_value</Name> <Type>Int8[@.thermSetpo_lvl_size]</Type>
<Address>0x43020302</Address> <Access>RW0</Access> <Used>Y</Used> </Property>
    <Property> <Name>thermSetpo_Sup_bm_X</Name> <Type>UnsInt8</Type>
<Address>0</Address> <Access>R</Access> <Used>Y</Used> </Property>
    <Property> <Name>thermSetpo_Sup_bm</Name>
<Type>UnsInt8[@.thermSetpo_Sup_bm_X]</Type> <Address>0x43020500</Address>
<Access>R0</Access> <Used>Y</Used> </Property>
    <Property> <Name>batte_batteLvl_batteLowWarni</Name> <Type>Boolean</Type>
<Address>0x8001030001</Address> <Access>R15</Access> <Used>Y</Used> </Property>
    <Property> <Name>batte_batteLvl</Name> <Type>UnsInt8</Type>
<Address>0x80010300</Address> <Access>R15</Access> <Used>Y</Used> </Property>
    <Property> <Name>endPoint</Name> <Type>Struct[2]</Type> <Address>[1,2]</Address>
<Used>Y</Used> </Property>
    <Property> <Name>.sensrMulti_sensrTyp</Name> <Type>String</Type>
<Address>0x31020500</Address> <Access>R0</Access> <Used>Y</Used> </Property>
    <Property> <Name>.sensrMulti_lvl_size</Name> <Type>UnsInt8</Type>
<Address>0x3102050100</Address> <Access>R0</Access> <Used>Y</Used> </Property>
    <Property> <Name>.sensrMulti_lvl_scale</Name> <Type>UnsInt8</Type>
<Address>0x3102050101</Address> <Access>R0</Access> <Used>Y</Used> </Property>
    <Property> <Name>.sensrMulti_lvl_preci</Name> <Type>UnsInt8</Type>
<Address>0x3102050102</Address> <Access>R0</Access> <Used>Y</Used> </Property>
    <Property> <Name>.sensrMulti_sensrVal</Name>
<Type>Int8[@.sensrMulti_lvl_size]</Type> <Address>0x31020502</Address> <Access>R0</Access>
<Used>Y</Used> </Property>
    <Property> <Name>_get_thermOperState_Log_bm</Name> <Type>UnsInt8[ ]</Type>
<Address>0</Address> <Access>W</Access> <Used>Y</Used> </Property>
    <Property> <Name>_get_thermSetpo_lvl_setpoTyp</Name> <Type>String</Type>
<Address>0</Address> <Access>W</Access> <Used>Y</Used> </Property>
  </Properties>
</Row>
```

Given ZWave's COMMAND_CLASS/COMMAND architecture and the fact that, in the case of ZWave™, devices advertise the classes and versions that they support, this illustrated pDev type definition may be automatically generated by querying the device at the time that it is connected (e.g., to gateway 120). This may be accomplished by parsing the ZWave™ XML specification to extract all readable and writable properties for any given command class version. These extracted properties may then be converted into property names and associated data types to yield the device type above in a fully automated manner during the connection process. In the case of ZWave™, the property address is a hex sequence, which corresponds to a path that is the command class, version, command, and other properties/values required to "GET" the property from the ZWave-based hardware, as detailed in the ZWave™ specification. ZWave™ driver 166B is able to interpret these paths in order to automatically construct all of the get and set commands for each property. This means that ZWave™ driver 166B can handle any new devices and older versions of devices without modification.

Notably, this automatically-generated pDev type uses substructure properties or arrays of substructure properties generated from the ZWave™ specification. These substructure properties start with the "." character in the above illustration. In an embodiment, the base scripting language is capable of addressing, not only fundamental arrays, but also substructure properties within those arrays. However, this feature of the base scripting language may rarely be used outside of mapping snippets for hardware transports that require such a feature.

Notably, the <Access> fields not only specify whether or not the property is readable and/or writable, but may also contain a polling priority (i.e., how frequently the property must be polled), which may be heuristically extracted from the ZWave™ specification, where priority "0" indicates "read once following reboot," priority 1 indicates a maximum polling rate (e.g., 125 ms intervals between polls), priority "2" indicates one half of the maximum polling rate, priority "3" indicates one quarter of the maximum polling rate, and so on, for example, to polling rates that may be set to minutes, hours, days, or longer. Subsequently, these rates can be dynamically altered on a per-device basis if necessary.

Drivers other than the illustrated ZWave™ driver 166B may interpret the <Address> field differently. For example, Phidget™ driver 166C may interpet the <Address> field as the name of the Phidget™ library function that must be called in order to obtain the corresponding property. It should be understood that more exotic interpretations of the <Address> field are similarly supported by physical/logical layer 920.

6.13. Physical/Logical API

In an embodiment, implementations of drivers 166 are registered with universal driver abstraction layer 910 by passing an initializer function to an RG_RegisterDriver( ) function of an API of physical/logical layer 920. An example of a typical initializer function taken from ZWave driver 166B is illustrated below:

```
static Boolean ZW_ZWaveInitializer    (      // Initialize the ZWave Device driver
            constCharPtr    driverName,       // I:Driver name
            constCharPtr    configTransport,  // I:Driver transport config string (many be
                                              // empty/NULL)
            constCharPtr    configAddress,    // I:Address config string (may be empty/NULL)
            constCharPtr    configParams      // I:Driver params config string (may be
empty/NULL)
                                      )       // R:TRUE for success, FALSE otherwise
{
    US_memzero(&dp,sizeof(dp));                         // Now kick off the ZWave driver itself...
    US_strcpy(dp.driverName,driverName);
    dp.llCallbackFn = ZW_ZWaveLowLevelCallback;
    dp.llDeviceIteratorFn = PL_UnivDriverDevIteratorFn;        // Let the UD layer iterate for us
    dp.llPropertyIteratorFn = PL_UnivDriverPropIteratorFn;     // ditto
    dp.init = ZW_InitZWaveFn;                    // Initialization function within driver thread
    dp.term = ZW_TermZWaveFn;                    // Termination function within driver thread
    dp.consoleHandler = ZW_ConsoleHandlerFn;     // Register our custom console command handler
    dp.workerConsoleHandler = ZW_WorkerConsoleHdlrFn;    // Corresponding handler in worker
                                                         // thread
    dp.consNwkResponderFn = ZW_ConsNwrkResponderFn;  // Implements network maint. logic
    dp.drvDevInit = ZW_DeviceZWaveInitFn;        // ZWave driver device initialization function
    dp.drvDevTerm = ZW_DeviceZWaveTermFn;        // ZWave driver device terminination function
    dp.poll = ZW_ZWavePollFn;                    // Gives driver time to poll & do stuff
    dp.heapSummaryFn = ZW_HeapSummary;           // Non-standard heap allocations to report!
    dp.globalContext = 0;
    th = UD_CreateDriverThread(&dp);             // create the driver thread we need
    while ( !UT_Quit( ) && (!UD_IsUnivDriverRunning(driverName,NULL,(longPtr)&gcP) || !gcP
|| !gcP->std.workerThread ) )
        UT_SuspendThread(100);                   // Wait till helper thread gets going...
    RETURN(ret);
}
```

This function is invoked if ZWave driver 166B is designated as active. Otherwise, the registration is latent. The result of a call to this initializer function is the creation of the universal driver thread discussed elsewhere herein, along with the set up of the various parameters and additional standard callback functions that the universal driver thread requires. Most of these driver callbacks resolve to nothing more than standard calls to abstract logic provided by physical/logical layer 920. Thus, the registrations may be omitted, such that defaults are used, but are included here to ease the ability to read stack crawls in the debugger. For example, the ZW_ZWaveLowLevelCallback( ) function above consists of a single line:
    ret=PL_StandardLowLevelCallback(driverName,
        aParser, aDevRef, rawDevName, aDevProperty,
        aCommand, aType, aValue, globalContext, options,
        status, flags);
Similarly, the ZW_ZWavePollFn( ) function also consists of a single-line call to the PL_StandardPollingLogic( ) function with appropriate parameters. The optional registrations of ZW_InitZWaveFn( ) and ZW_TermsZWaveFn( ) handle specialized initialization and termination activities within the newly-created universal driver thread. The function of all of the other registrations are amply described in the code above.

In an embodiment, physical/logical layer 920 provides access to one or more of the following additional functionalites:

Creation of standard preemptive worker threads to handle transport communication;

APIs for simplified access, via dedicated registries, to the properties of the pDevs and IDevs that make up the driver;

Iterators based on the device tree as defined in the XML device specifications, as opposed to those in the driver property registries;

Logic to run whichever mapping snippet(s) need to be run, whenever the corresponding property registry value is altered. In an embodiment, mapping snippets run directly within an interpretive base-language parser, rather than within a virtual machine. However, a virtual machine may be used, instead of or in addition to the base-language parser, if performance reasons dictate the use of a virtual machine to run compiled mapping snippets;

Logic to transfer any properties to and from the data architecture via driver layer 164;

Logic to handle a console interface for driver(s) 166;

API functions PL_ConvertToLogical( ) and PL_ConvertToPhysical( ) that handle the flow of all data through the abstraction of physical/logical layer 920;

Built-in base-language functions to handle the needs of driver layer 164;

API functions to package, enqueue, and dequeue property changes, coming from the physical devices via preemptive worker threads, into the registries within the universal driver thread;

API functions to package, enqueue, and dequeue property changes, coming from the registries within the universal driver thread, into the preemptive worker threads;

Abstract mutex API functions for use within preemptive driver code; and/or

Other utility functions commonly needed by drivers 166.

The PL_StandardWorkerThread( ) function of the API of physical/logical layer 920 is illustrated below, according to an embodiment:

```
void* PL_StandardWorkerThread (            // Standard LL driver preemptive worker thread logic
            PL_StandardGCheaderPtr   stdContextPtr,    // IO:Global Context record
            unsInt64                 devScanRate,      // I:Min interval betw scans for same device
                                                       // (ms.)
            unsInt32                 loopPause,        // I:Thread loop pause (in microseconds)
            unsInt64                 recvScanRate,     // I:Min interval between scans for H/W values
                                                       // (ms.)
            PL_GrabDevStateFnPtr     grabDevState,     // I:Driver-specific grab device state func.
            PL_RecvNewValsFnPtr      recvNewVals,      // I:Driver-specific receive new values func.
            PL_SendNewValsFnPtr      sendNewVals       // I:Driver-specific send new values function
            )                                          // R:NULL
{
    stdContextPtr->workerThread = pthread_self( );
    stdContextPtr->grabDevState = grabDevState;        // Remember these params in header,
                                                       // may need
    stdContextPtr->recvNewVals = recvNewVals;          // them in other contexts (e.g.,
                                                       // PL_StandardGrabAllDeviceStates)
    stdContextPtr->sendNewVals = sendNewVals;
    while ( !UT_Quit( ) )
    {
        UT_Sleep(loopPause);                           // sleep for a bit - non-collaborative right now
        if ( !UT_Quit( ) && grabDevState != NULL )
        {
            iterate to next device                     // basic 'polling' loop for the driver
            if not initialized
                call the initializer
                call 'grabDevState' to handle priority 0
                mark initialized
            if time for another scan
                call 'grabDevState'
            if ( !UT_Quit( ) && stdContextPtr->newWrites )
            {   // This means we have new stuff to be written to the H/W
                stdContextPtr->oldWrites = wlrP;       // polling thread will dispose of it for
                                                       // us.
                wlrP = stdContextPtr->newWrites;
                if ( wlrP )
                {
                    if ( sendNewVals != NULL )         // squirt 'em to hardware at our own pace
                        (sendNewVals) (stdContextPtr->driverName,stdContextPtr,wlrP);
                    stdContextPtr->newWrites = NULL;   // tell collaborative thread ready for
                                                       // more
                }
            }
            if ( !UT_Quit( ) && recvNewVals )          // receives new values we may have got
                                                       // from H/W
            {
                tn = UT_GetTimeInMilliseconds( );
                if ( tn - ltn > recvScanRate )         // call receive new vals (event driven) fn
                {
                    (recvNewVals) (stdContextPtr->driverName,stdContextPtr);
                    ltn = tn;
                }
            }
        }
        DU_ExecuteConsoleCmd(stdContextPtr);           // Execute commands for console & return
                                                       // results
```

```
        stdContextPtr->workerLoops++;
    }
    stdContextPtr->workerThread = 0;        // This thread is dead!
    return ret;
}
```

In an embodiment, the additional functions, whose addresses are passed as parameters to the above function, actually form the standard manner in which all drivers 166 register their custom code with physical/logical layer 920. These logical functions (grabDevState, recvNewVals, sendNewVals) make use of additional API functions, provided by physical/logical layer 920, in conjunction with driver-specific transport code to handle everything required to implement both polling and event-driven behaviors. These logical functions may tend to look similar across drivers 166, differing only in the details of what is required to communicate with physical devices via the underlying driver transport layer. Apart from these logical functions, all other logic involved in traversing physical/logical layer 920, by invoking the appropriate mapping snippet(s), may be handled transparently by the abstraction of physical/logical layer 920.

connection may be implemented by a console interface that enables direct commands (e.g., text-based commands) to be input by the user and results of those commands (e.g., text-based output) to be displayed to the user.

In an embodiment, the console interface may be switched by user command between communicating to the overall device manager 160 (and script execution environment 150) and communicating to a specific driver 166 which implements a suite of driver-specific commands and capabilities to access the architecture below driver layer 164. This dual access allows easier debugging in the event of genuine hardware failures or other issues.

In an embodiment, typing "help" into the console will produce the following list of available console commands:

```
MaDMan:help
    Enter any of the following commands:
        activate script name                        -- activate named Marlin script.
        deactivate script name                      -- de-activate named Marlin script.
        show device/script/asm devRef/name          -- show public device properties or Marlin
script/MVM assembler content.
        add script name                             -- add a Marlin script.
        remove device/script devRef/name            -- remove public device or Marlin script.
        replace script name                         -- replace a Marlin script.
        rename device/script devRef/name nuName     -- rename public device or Marlin script.
        scripts                                     -- list all known (and then active) Marlin
scripts.
        configs                                     -- list all configuration string settings.
        config option value                         -- set a configuration string setting.
        debug [-] [option]                          -- set [or clear] a debugging option ("debug -
" clears all but basic options).
        debugs [active]                             -- list all possible [or active] debugging
options.
        devices [driverName]                        -- list all public devices [for driver name].
        mappings                                    -- list all display adapter mappings.
        mapping property                            -- display adapter layer mappings for a
specified public device property.
        globals                                     -- list all global values.
        global [-]$gName value                      -- set [or delete] the value of a global (use
quotes for strings).
        set [-]@[devRef].propName value             -- set [or delete] value of a public device
property (use quotes for strings).
        driver driverName                           -- pass console control to the driver name
specified ('exit' to return).
        drivers                                     -- list all known (and then active) drivers.
        help                                        -- print this help message.
        memory                                      -- print current memory usage.
        dump                                        -- dump entire state to console.
        flush driverName                            -- flush all property state registries and
devices for a (non-active) driver.
        version                                     -- print software version information.
        quit                                        -- quit the application.
        +                                           -- repeat the previous command.
MaDMan:
```

6.14. Development Console

In an embodiment, a direct connection to device manager 160 (and/or other components, such as script execution environment 150) can be provided for use by developers, value-added resellers, and/or technical support to debug and/or configure each gateway 120 in detail. This direct The first few commands relate to controlling editing, adding, renaming, and deleting scripts. Advanced developers may dispense with the scripting GUI entirely and develop scripts directly in the base scripting language, thereby gaining access to features not expressible through the scripting GUI.

The next set of commands provides the ability to examine and modify configuration and debugging options and settings. There are an extensive set of these debugging and configuration capabilities which apply to script execution environment 150, device manager 160, as well as drivers 166.

The next set of commands allows the display and alteration of public device properties (as opposed to driver-specific private properties), snippets of driver layer 164, global parameters, etc.

The "memory" command displays an up-to-date list of all memory allocations and usage.

The "dump" command displays the state of all persistent data (i.e., data whose values persist across reboots or power downs, e.g., stored in non-volatile memory). Generally, all important values and state are held as persistent data. Thus, issuing this command may provide a snapshot of all significant state.

The "flush" command may be used to clean out the state from all of the registries of inactive drivers.

The "version" command prints details of the current software version.

The "quit" command terminates the console application.

The "+" command repeats the previous command that was input.

The "driver" command allows the user to switch to communicating with any of the active drivers listed in the output from the "drivers" command. For example, the sequence below switches the focus of the console to virtual driver 166A, and then displays the command suite available to communicate directly with virtual driver 166A. As illustrated, the console prompt changes to reflect the driver name that is the current focus of the console:

```
MaDMan:drivers
        ---------------- Known Driver Registry ----------------
        Virtual
        CatchAll
        Modbus_rtu
        Modbus_tcp
        Phidget_usb | usb | |
        Phidget_tcp
        ZWave_ser
        ---------------- Active Driver Registry ----------------
        CatchAll
        Virtual
        Phidget_usb
MaDMan:driver Virtual
Virtual:help
        Enter any of the following commands:
        help                                    -- print this help message.
        exit                                    -- exit driver console context (return to main).
        +                                       -- repeat the previous command.
        device dRef                             -- display properties for a device.
        set @[dRef].propName value              -- set value of a device property (use quotes for
strings).
        show dtype name                         -- show definition for device type.
        add dtype name                          -- add device type.
        remove dtype name                       -- remove device type.
        replace dtype name                      -- replace device type.
        rename dev/dtype dRef/name nuVal        -- re-name a device/device type.
        network [xml]/[add/remove/clear]        -- Display device list [in xml form] or add/remove
device.
        devtypes                                -- show allowed device types.
Virtual:
```

Since virtual driver 166A is not layered on top of a physical transport and does not use physical/logical layer 920, its command set is a syntax-compatible subset of those commands provided automatically for other drivers by the abstraction of physical/logical layer 920. For example, if the Phidget driver 166C ("Phidget_usb") had been selected, instead of virtual driver 166A, the following available commands would be shown:

```
MaDMan:driver Phidget_usb
Phidget_usb:help
        Enter any of the following commands:
        help                                    -- print this help message.
        exit                                    -- exit driver console context (return to main).
        +                                       -- repeat the previous command.
        device dRef [enable/disable]            -- display properties for a physical/logical
device or enable/disable device.
        set @[dRef].propName value              -- set value of a physical/logical device
property (use quotes for strings).
        show 'component' dRef/name              -- show definition for 'component'.
        add 'component' [dRef/name]             -- add 'component'.
        remove 'component' dRef/name            -- remove 'component'.
```

| | |
|---|---|
| replace 'component' dRef/name | -- replace 'component'. |
| rename 'component' dRef/name nuVal | -- re-reference (ldev/pdev) or re-name (others) a 'component'. |
| network [xml]/[add/remove/clear/other] add/remove/clear nwk/dev branch (int. & ext.) | -- Display network [in xml form] or or other. |
| pdevs | -- list all physical devices (for this driver). |
| ldevs | -- list all logical devices (for this driver). |
| snippets [*] | -- display available snippets for this [all] driver(s). |
| [l]devtypes | -- show all logical dev types (common to all drivers). |
| pdevtypes | -- show physical device types (for all drivers). |
| templates | -- show list of known processing templates (for all drivers). |

Note: 'component': any of [l]dev (logical device), pdev (physical device), dtype (device type), snip (mapping snippet), templ (processing template)
Phidget_usb:

This driver command set, which is largely provided by the abstraction of physical/logical layer 920, is largely identical across all drivers 166, other than virtual driver 166A. Drivers 166 can register additional driver-specific commands with the console (and the help menu) within their respective initializer functions.

The "device" command displays all known properties for the pDev or lDev identified by "dRef". The "device" command may also be used to enable or disable a given device. Disabled devices continue to exist, but do not read or write values from hardware of any physical device and do not trigger any mapping snippets. Temporarily disabling devices may be useful for isolating the cause of a fault.

The "set" command directly sets an lDev or pDev property from the console. If that change triggers a mapping snippet, physical/logical layer 920 will run the triggered mapping snippet and may result in changes on the other side of the mapping. Once again, this ability to directly set device properties in a driver can be useful in development and debugging situations.

The "show" command displays the specification (e.g., in XML) for any driver "component." A driver component can be, for example; an lDev, pDev, device type, mapping snippet, or template. Examples of the content of all of these different component types have been provided elsewhere herein.

The "add" command allows a user to define a new component and then input its content into the console (e.g., by typing or copy-and-pasting the component definition into the console). The input is written to persistent storage and available for subsequent use. The "add" command may enforce certain internal naming conventions for different component types. The low-level "add" command should only be used when constructing processing trees by hand. New component definitions are parsed when input, in order to ensure that they are syntactically correct. Any component definition that fails to parse correctly will not be written to persistent storage.

The "network add" command may be used to add new devices. The "network add" command incorporates additional behaviors, including the ability to automatically detect each device type and create the entire processing tree using template(s) associated with the detected device type.

The "remove" command disposes of a given driver component and all references to the removed driver component in any registries and persistent storage. Disposal of a device may imply additional cleanup, depending on the driver involved, and therefore, is better handled by use of the "network remove" command to avoid inconsistencies with hardware state.

The "replace" command allows a user to replace a component definition with a new definition (e.g., by typing or copy-and-pasting the new component definition into the console), and therefore, allows the user to edit existing component definitions. Again, the console only replaces the old component definition with the new component definition if the new component definition parses correctly.

The "rename" command allows a user to persistently name a component and all references to the component within any processing tree or registry.

The "pdevs" command lists basic details for all pDevs associated with the selected driver.

The "ldevs" command lists basic details for all lDevs associated with the selected driver.

The "snippets" command lists basic details for all driver mapping snippets associated with the selected driver. A wildcard (e.g., "*") can be used to examine all snippets regardless of the selected driver.

The "ldevtypes" command lists all known logical device types. Since lDev types are shared across all drivers, this list is independent of the selected driver.

The "pdevtypes" command lists all known physical device types across all drivers.

The "templates" command lists all known driver templates across all drivers.

The "network" command provides the basic administration of the selected driver's transport "network." This administration primarily comprises a standardized process for the addition and removal of hardware devices, and is provided by the abstraction of physical/logical layer 920. Different transport layers have different capabilities with respect to sensing when devices have been connected or disconnected. Thus, in order to keep behaviors standard across all drivers (e.g., to ease the learning curve for users), the entire "network add" and "network remove" process should be configured through registration of a custom function, such as the network responder function, represented by the ZW_ConsNwrkResponderFn( ) function in the example initializer function for ZWave driver 166B. The network responder function may be called within the console thread, and allows the logic to control the process of network administration, so as to avoid the possibility of confusion when add or remove operations fail. Example code for the ZW_ConsNwrkResponderFn( ) may be as follows:

```
Boolean ZW_ConsNwrkResponderFn          (          // Handler for custom ZWave
console commands
                long            globalContext, // I:Driver global context
                int32           action,        // I:The decision/action required
                charHdl         response,      // IO:If non-NULL on return
contains driver's response
                ...             // I:Additional parameters depending on action and options
                                )   // R:TRUE if action supported/successful, FALSE
                                    // otherwise
{
    gcP = (ZW_GlobalContextPtr)globalContext;
    va_start(ap,response);
    switch ( action )
    {
        case kNwkPhysLogBased: ret = YES; break;           // of course!
        case kNwkSupportsNodeIterator: ret = YES; break;   // yep, we support this
        case kNwkSupportsAutoDetectMode: ret = YES; break; // yep, we support this
        case kNwkSupportsAutoRemoveMode: ret = YES; break; // yep, we support this
        case kNwkHasAutoTypeFinder: ret = YES; break;      // yep, we support this
        case kNwkAllowsManualAdd: ret = NO; break;         // nope, the only way to add
                                                           // devices is through addmode
        case kNwkAllowsManualRemove: ret = NO; break;      // nope, the only way is
                                                           // through removemode
        case kNwkIteratorReset:                            // reset the network node
iterator
            gcP->responder.currNode = 0;
            gcP->consoleCmd.cmd = kNetworkStructureCmd;    // pipe this to our handler to
                                                           // deal with in worker thread
            ch = DU_ForwardConsoleCmd(&gcP->std,(long)&gcP->consoleCmd);
            KILL_HDL(ch);   // This will make sure the network structure is up to date
            ret = YES;
            break;
        case kNwkIteratorStep:                  // get the next network node information
            i = gcP->responder.currNode;
            depthP = va_arg(ap,int32Ptr);
            if ( i < ZW_MAX_NODES )
            {
                if ( gcP->network_info.nodes[i].basic != 0 )
                {
                    US_SprintfCatHdl(response,"<Node>" EOL_STR);
                    US_SprintfCatHdl(response,"\t<NType>netDevice</NType>" EOL_STR);
                    US_SprintfCatHdl(response,"\t<Address>%d</Address>" EOL_STR,i);
                    if ( i == gcP->network_info.nodeID )
                        US_SprintfCatHdl(response,"\t<ThisNode>HomeID: 0x%08X</ThisNode>"
EOL_STR,gcP->network_info.homeID);
                    US_SprintfCatHdl(response,"\t<Info>Basic: 0x%02X, Generic: 0x%02X,
Specific: 0x%02X</Info>" EOL_STR,
                            gcP->network_info.nodes[i].basic, gcP-
>network_info.nodes[i].generic,gcP->network_info.nodes[i].specific);
                    US_SprintfCatHdl(response,"\t<Neighbors>%s</Neighbors>" EOL_STR,gcP-
>network_info.nodes[i].neighbors);
                    US_SprintfCatHdl(response,"</Node>" EOL_STR);
                    // Here we would walk sub-nodes (and bump depthP)
                }
                gcP->responder.currNode++;
                ret = YES;
            }
            break;
        case kNwkGetAutoDetectInstructions:     // Get instructions to enter auto-detect mode
            US_SprintfCatHdl(response,EOL_STR "Press the button on the ZWave device you
wish to add. This may involve multiple actions. Consult device manual for details.");
            ret = YES;
            break;
        case kNwkGetNodeRemoveInstructions:     // Get instructions to enter node remove mode
            US_SprintfCatHdl(response,EOL_STR "Press the button on the ZWave device you
wish to remove. This may involve multiple actions. Consult device manual for details.");
            ret = YES;
            break;
        case kNwkEnterAutoDetectMode:           // go into auto-detect mode
        case kNwkEnterNodeRemoveMode:           // go into node remove mode
            gcP->consoleCmd.cmd = (action == kNwkEnterAutoDetectMode) ? kAddModeCmd :
kRemoveModeCmd;
            gcP->consoleCmd.stop = FALSE;                  // pipe this to our handler to deal
                                                           // with in the worker thread
            ch = DU_ForwardConsoleCmd(&gcP->std,(long)&gcP->consoleCmd);
            puts(*ch);
            KILL_HDL(ch);
            ret = YES;
            break;
        case kNwkIsModeCompleted:               // poll to see if selected mode is complete...
            if ( gcP->consoleCmd.cmd == kAddModeCmd )
```

```
                {
                    ret = NO;
                    if ( (gcP->flags & (kAddModeStarted+kStartAddMode)) == 0 )
                    {
                        if ( gcP->nuNodeID != 0 )
                        {           // return a string for the address of the node that got added
                            US_SprintfCatHdl(response,"%d",gcP->nuNodeID);
                            gcP->nuNodeID = 0;
                        }           // Note:if it failed, we'll return an empty string!
                        ret = YES;
                    }
                } else if ( gcP->consoleCmd.cmd == kRemoveModeCmd )
                {
                    ret = NO;
                    if ( (gcP->flags & (kRemoveModeStarted+kStartRemoveMode)) == 0 )
                    {
                        if ( gcP->nuNodeID != 0 )
                        {       // return a string for address of the node that got removed
                            US_SprintfCatHdl(response,"%d",gcP->nuNodeID);
                            gcP->transitionNode = gcP->nuNodeID;
                            gcP->transitionTime = UT_GetTimeInMilliseconds( );
                            gcP->nuNodeID = 0;
                        }                   // Note:if it failed, we'll return an empty string!
                        ret = YES;
                    }
                }
            }
            break;
        case kNwkExitCurrentMode:                           // forced exit of current mode
            if ( gcP->consoleCmd.cmd == kAddModeCmd || gcP->consoleCmd.cmd == kRemoveModeCmd )
            {
                gcP->consoleCmd.stop = TRUE;
                gcP->condFlags[kCallbackStatusCond] = TRUE;     // Mark the condition flag
                ZW_WakeupThread(-1, gcP->std.workerThread);     // Wake the waiting thread
                UT_SuspendThread(2500000);      // wait a bit (2.5 seconds) to make sure
                                                // worker saw message
                ch = DU_ForwardConsoleCmd(&gcP->std,(long)&gcP->consoleCmd);
                puts(*ch);
                KILL_HDL(ch);
                ret = YES;
            }
            break;
        case kNwkDeduceTypeAndAddDevice:    // Deduce device type given address,
                                            // add/return pDevRef
            cp = va_arg(ap,charPtr);        // device address (as a string) passed in -
                                            // now register
            gcP->consoleCmd.nodeid = (unsInt8)strtol(cp,NULL,10);
            gcP->consoleCmd.stop = FALSE;   // pipe this to our handler to deal with in
                                            // the worker thread
            gcP->consoleCmd.cmd = kDeduceTypeAndAddCmd;
            ch = DU_ForwardConsoleCmd(&gcP->std,(long)&gcP->consoleCmd);
            US_SprintfCatHdl(response,"%s",*ch);
            KILL_HDL(ch);
            ret = YES;
            break;
        case kNwkListDeviceTypes:                           // List allowable pDev types
            // This will never get called, upper level code can do it automatically!
            break;
        case kNwkPerformManualAdd:          // Manually add a device at a given address
        case kNwkPerformManualRemove:       // Manually remove a device at a given address
            // For this driver this will never get called because we said no to
'kNwkAllowsManualAdd'/'kNwkAllowsManualRemove'
            devAddr = va_arg(ap,charPtr);   // device address (as a string) passed in
            devType = va_arg(ap,charPtr);   // device type (as a string) passed in
// do it, add it to our internal network map (used by the iterator) and return the
// resultant devRef in 'result'
            break;
        case kNwkResetCommsLink:    // Reset the comms. link/network map
            gcP->consoleCmd.cmd = kFactoryDefaultsCmd;      // pipe this to our handler to
                                                            // deal with in the worker thread
            ch = DU_ForwardConsoleCmd(&gcP->std,(long)&gcP->consoleCmd);
            puts(*ch);
```

```
            KILL_HDL(ch);
            ret = YES;
            break;
        }
    va_end(ap);
    return ret;
}
```

As illustrated in the above example, the network responder function responds appropriately to each of the logical actions that the network responder function is asked to perform by the abstraction logic of physical/logical layer 920. Notably, the DU_ForwardConsoleCmd( ) function of the API is used to pass the command from the collaborative console thread (e.g., which cannot directly access the hardware of the physical devices) to and from the preemptive worker threads (e.g., which can directly access the hardware of the physical devices). Network responder functions for drivers other than ZWave driver 166B may be implemented in a similar manner.

7. Communications Layer

In an embodiment, communications layer 140 handles TCP communication either with controller 130 in gateway 120 or, in other configurations, directly with platform 110 (e.g., a remote cloud service). Messages may be received and sent in separate preemptive "worker" threads within script execution environment 150. All messages may consist entirely of text packets encoded in the data format of the data architecture. Data architecture commands of all types are simply packets, encoded in the data format (e.g., JSON) of the data architecture, containing specific elements which embody the command and/or other data of significance.

In an embodiment, in script execution environment 150, a "receive" worker receives messages to the script execution environment 150 (e.g., from platform 110 and/or controller 130) and queues them in a receive queue, while the main process thread pulls queued messages from the receive queue and processes them. Similarly, in script execution environment 150, the main process thread encodes messages from script execution environment 150 (e.g., to platform 110 and/or controller 130) in the data format of the data architecture and queues the encoded messages in a send queue, while a "send" worker pulls queued messages from the send queue and transmits them via TCP to the intended destination.

In an embodiment, the information necessary to establish communication with the appropriate destination (e.g., platform 110 and/or controller 130) is passed to an initialization routine of communications layer 140. This information may comprise, for example, an IP address, port, username, and/or password or key. Once communication with a particular instance of a destination has been established, all subsequent communications to that destination may be with that particular instance. The data architecture is such that, if a data value is changed by an executing script in script execution environment 150 on a gateway 120, this change is normally sent to controller 130 as a "change" command, and then automatically relayed to platform 110. From platform 110, the "change" command may be further relayed, for example, to the scripting GUI, to other gateways 120, to other processes that are subscribed to the data that has been changed, etc. One such process is device manager 160 running on the same gateway 120.

Figure 8A:
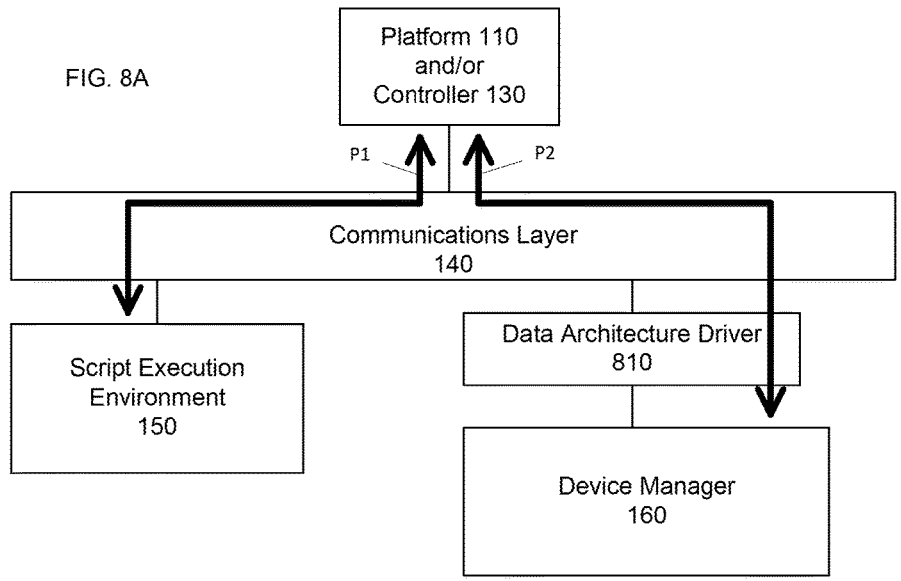
FIGS. 8A and 8B illustrate variants of a control infrastructure, according to an embodiment.

FIG. 8A illustrates the stand-alone variant of the infrastructure, in which script execution environment (comprising script manager 210 and VM 230) and device manager 160 are executed as different processes, potentially on different machines, according to an embodiment. For example, script execution environment 150 may be executed in the cloud (e.g., on platform 110, instead of on a gateway 120), whereas device manager 160 may be executed in a process on a gateway 120. In this case, one script execution environment 150 could be used to control multiple device managers 160 on multiple gateways 120. Furthermore, messages between script execution environment 150 and device manager 160 would be passed over a network, such as the Internet, between platform 110 and gateway 120. Alternatively, script execution environment 150 and device manager 160 may be executed in different processes on the same gateway 120. In this case, messages between script execution environment 150 and device manager 160 are not passed directly between the two, but rather are relayed through communications layer 140 and/or controller 130. The communication path P1 from script execution environment 150 to communications layer 140 to controller 130 or platform 110, and the communication path P2 from controller 130 or platform 110 to communications layer 140 to data architecture plug-in driver 810 to device manager 160 are characteristic of the communication paths used for communication between script execution environment 150 and device manager 160 in the stand-alone variant of the infrastructure.

As mentioned above, stand-alone variant of script execution environment 150 and device manager 160 can be run outside of a gateway 120 (e.g., in the cloud). Script execution environment 150 can also be run for other machine architectures (e.g., PC, server, etc.), without modification. A stand-alone cloud-based variant of script execution environment 150 may be useful for architectural nodes that have authority over larger numbers of gateways 120 and run scripts that span devices connected to many different gateways 120, possible with wide geographical distribution. Multiple script execution environments 150 may communicate directly within or via platform 110. For example, a first script execution environment 150 on a first gateway 120 may communicate with a second script execution environment 150 on a second gateway 120 by passing a message through communications layer 140 on the first gateway to platform 110, which relays the message through communications layer 140 on the second gateway to the second script execution environment 150. However, such communications, bypassing controller 130, are generally only applicable for testing or for script execution environments 150 running outside the gateway 120 that they are controlling. For script execution environments 150 executing within a gateway 120, communications will normally be with controller 130 of that gateway 120.

Figure 8B:
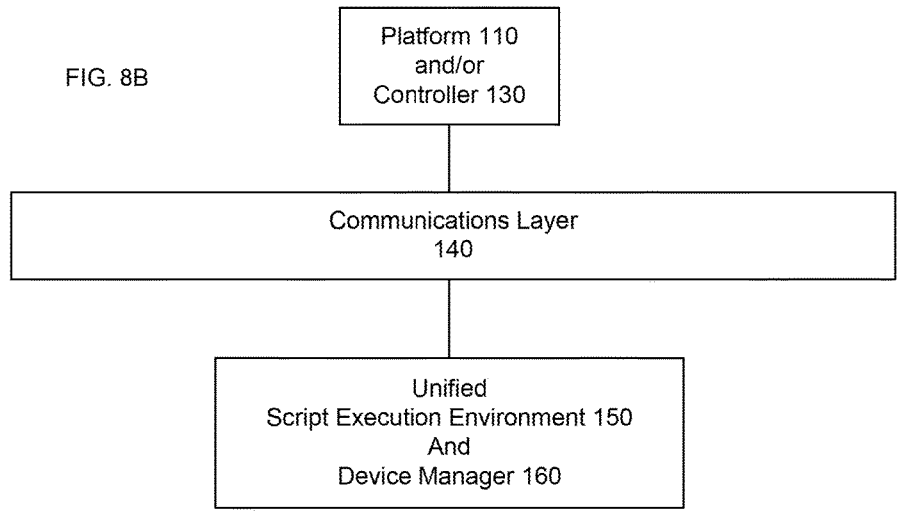

However, in an embodiment, the normal configuration for a gateway 120 is to execute script execution environment 150 and device manager 160 as a single, unified process (but potentially having multiple threads). This configuration is illustrated in FIG. 8B, according to an embodiment. Notably, unified script execution environment 150 and device manager 160 correspond to unified device manager & script manager thread 715 in FIG. 7. In this configuration, any change to a property of a device managed by device manager 160 is passed directly from VM 230 to device manager 160 through an internal API. Advantageously, this approach can reduce the latency between script actions and the corresponding change in the actual external hardware, and vice versa. Since device manager 160 will also notify the local controller 130 when any device property changes (e.g., via the path from device manager 160 to communications layer 140 to controller 130), the rest of the system will be kept abreast of the change after the fact, as opposed to requesting the change as in embodiments of the stand-alone variant. Thus, the device property value will always be up-to-date with the true hardware state (possibly with a slight latency due to communication channels).

8. Graphical User Interface (GUI)

In an embodiment, platform 110 provides an interface 114 that comprises a web application that provides users with the ability to read, control, and create scripts for automation devices in both the fields of industrial control and home automation, as well as any other domains. This web application may combine the data architecture, the disclosed scripting language, a graphical user interface, and the device manager.

In an embodiment, the web application provides web access to the data architecture through an exposed application programming interface (API). The API may be used by a wide range of client applications, including, for example, other web applications (e.g., designed for specific applications), mobile devices, third-party machine-to-machine frameworks, etc.

In an embodiment, the web application provides a GUI which enables users to create, edit, and deploy scripts to one or more gateways 120. The web application may enable expert users to control gateways 120 with granular detail while still providing an intuitive user interface for novice users.

In an embodiment, the web application supports multiple device control standards within a single application, synchronizes properties across multiple clients, provides a functional system even in the absence of Internet connectivity, creates a viable product for multiple domains (e.g., home, commercial, and industrial domains), and allows a user to control a large number of gateways 120 and/or automation devices.

9. Example Use Cases

Some example use cases will now be described. It should be understood that these use cases are provided merely to illustrate a few non-limiting, practical applications of control scripts.

9.1. Food Truck Refrigeration Temperature Monitoring

In this example use case, a user runs a chain of food trucks. The food coolers and freezers that support each food truck are critical to the success of each individual food truck and the chain as a whole, as well as their compliance with federal and state food care regulations. Proper refrigeration or freezing of food impacts its taste, appearance, nutrient content, and safety. Thus, state and federal food and drug administrations (FDAs) require that temperatures of all commercial refrigeration units be closely monitored. If the temperature of a refrigeration unit goes above or below recommended ranges for longer than a certain time, the food stored in the affected refrigeration unit cannot be used.

Unfortunately, almost all commercial refrigeration units place the thermostat near the unit's door. To ensure that normal, momentary opening and closing of the unit's door does not cause an incorrect temperature reading, a secondary temperature monitor should be installed away from the unit's door. If a temperature rise occurs when the unit's door is open, after the door has been closed for 5-10 minutes, the temperature in the unit should return to within a normal operating range. If the temperature does not return to within the normal operating range, then each state FDA has established protocols for determining whether or not food in that unit can be used or sold.

To verify compliance with these regulations, each state FDA publishes and audits periodic reports of temperature ranges that are outside of the normal operating range. In this example, the user has established her own policies for what she wants employees to do if a unit's temperature is outside of the normal operating range for a certain period of time, and what those employees should do with food stored in such a unit.

The average temperature range for operation of a commercial, reach-in refrigerator unit is generally between 36° F. and 45° F. If food is stored at a temperature lower than 36° F., there is a risk of freezing foods that should not be frozen (e.g., milk and other dairy products), and, if food is stored at a temperature higher than 45° F., there is a risk that the food will spoil. The U.S. FDA mandates that refrigerated products must be kept at 41° F. or lower. But the colder the food is while not becoming frozen, the longer it will last, making 38° F. an ideal temperature for commercial refrigeration.

The average temperature range for operation of a commercial, reach-in freezer unit is generally between 5° F. and −10° F. If food is stored at a temperature lower than −10° F., there is a risk of freezer burn, and, if food is stored at a temperature higher than 5° F., the food may not freeze properly and/or may not remain viable.

To monitor and report refrigeration temperatures, ensure food freshness, and comply with state and federal FDA requirements and audits, the user in this example wishes to:
  install temperature sensors away from the doors of each truck's reach-in refrigerator and reach-in freezer to ensure the most accurate reading and minimize the impact of the door's opening and closing;
  setup monitoring, reporting, and alerting for the appropriate refrigerator and freezer temperatures; and
  setup integrated refrigerator and freezer door monitoring to help determine whether an alert or warning for an out-of-range temperature may have been caused by the unit's door being open too long or by potential failure of the unit.

The user can implement these wishes using the disclosed infrastructure by, in each food truck, installing (a) a gateway (e.g., gateway 120) with a cellular data connection, (b) a temperature sensor in the reach-in refrigerator unit away from the unit's door and connected to the gateway, (c) a temperature sensor in the reach-in freezer unit away from the unit's door and connected to the gateway, (d) a reach-in refrigerator door sensor connected to the gateway, (e) a reach-in freezer door sensor connected to the gateway, and (f) an audible sound device connected to the gateway.

Next, the user may configure the installation via the GUI of interface 114 of platform 110 by: (a) naming each installed gateway, wherein each gateway represents one food truck (e.g., via a management GUI of interface 114); (b) creating both a logging script and alerting script for the reach-in refrigerator unit (e.g., via the scripting GUI of interface 114); and (c) creating both a logging script and alerting script for the reach-in freezer unit (e.g., via the scripting GUI of interface 114).

The logging script for each of the refrigerator unit and freezer unit sends periodic temperature measurements from the temperature sensor in the respective unit to platform 110 (via the cellular data connection). The logging period can be set in a variety of manners (e.g., hourly, daily, daily at specific times, every six hours, etc.), as desired by the user and specified in the scripting GUI. In addition, the temperature measurements periodically sent by each logging script may be stored at platform 110 and downloaded by the user in one or a plurality of data formats (e.g., a spreadsheet format such as Microsoft Excel™, comma-separated values (CSV), Portable Document Format (PDF), etc.).

The alerting script for each of the refrigerator unit and freezer unit triggers an audible alarm via the installed audible sound device for a first period of time if the temperature measurement from the temperature sensor in the respective unit is outside the normal operating range for a second period of time, and sends a log entry to platform 110 (via the cellular data connection) comprising the date and time that the temperature measurement went outside the normal operating range, the temperature measurement from the respective temperature sensor every set time interval from the time that the temperature measurement is detected to be outside the normal operating range until the temperature measurement returns the normal operating range, and/or the date and time that the temperature measurement returned to the normal operating range. The script for the refrigerator unit may define the normal operating range as between 35° F. and 41° F., whereas the script for the freezer unit may define the normal operating range as between −10° F. and 5° F. The first period of time may be defined as thirty seconds, the second period of time may be defined as five minutes, and the set time interval may be defined as one minute. Of course, the user may set the value of these variables to anything she desires (e.g., via the scripting GUI of interface 114). In addition, both alerting scripts may turn off the audible alarm if the temperature measurement returns to the normal operating range prior to expiration of the first period of time. Furthermore, the alert log entries may be stored at platform 110 and downloaded by the user in one or a plurality of data formats.

As an alternative or in addition to the audible alert, the alerting script for each of the refrigerator unit and freezer unit may also send a warning message when the alert condition is satisfied. For example, whenever the temperature measurement from the temperature sensor in the respective unit is outside the normal operating range for a period of time (configurable by the user), the alerting script may send a warning message through platform 110 or directly via the cellular data connection, as well as sending a log entry to platform 110 as described above. For example, the warning message may be a text message (e.g., Short Message Service (SMS) message) or email message that comprises the name of the gateway which sent the warning message. (which may be named for the food truck in which it is installed, e.g., "Truck 1"), the date and time of the alert, and/or one or more temperature measurements related to the alert. Similarly, each alerting script may also send an all-clear message, when the temperature measurement returns to the normal operating range, to indicate that the alert condition has been cleared. In each case, when creating the alerting script via the scripting GUI, the user can specify one or more recipients (e.g., by selecting a contact record from a contact database, entering a mobile phone number and/or email address, etc.) for the warning message.

After creating the logging and alerting scripts for both of the refrigerator and freezer units, the user may interact with the GUI of interface 114 of platform 110 to download the four scripts to each gateway installed in each food truck.

In this example, the warning messages notify the user of potential regulatory violations, so that she can verify and document compliance with appropriate operating procedures. In addition, the log entries, along with the user's documentation of compliance with appropriate operating procedures, can be used for compliance with state FDA audits.

9.2. Food Truck Refrigeration Door Monitoring

This use case example will utilize the same user as above. Because of the close quarters and fast pace required to prepare and serve food from a food truck, cooking staff often leave the doors of the food truck's reach-in refrigerator or freezer unit open. As discussed above, this can cause problems with food safety and result in health violations. Accordingly, the user has established food handling, preparation, cooking, and serving standards and training for all of her employees. To monitor her employees' performance, the user randomly visits her food trucks to taste the food and observe her employees. However, the employees may be less diligent about following the established standards when the user is not present. Thus, the user wishes to discreetly monitor the doors of the refrigerator and freezer units on each food truck.

The user can implement these wishes using the disclosed infrastructure by, in each food truck, installing (a) a gateway (e.g., gateway 120) with a cellular data connection, (b) a reach-in refrigerator door sensor connected to the gateway, (c) a reach-in freezer door sensor connected to the gateway, and (d) an audible sound device connected to the gateway.

Next, the user may configure the installation via the GUI of interface 114 of platform 110 by: (a) naming each installed gateway, wherein each gateway represents one food truck (e.g., via a management GUI of interface 114); (b) creating both a logging script and alerting script for the reach-in refrigerator unit (e.g., via the scripting GUI of interface 114); and (c) creating both a logging script and alerting script for the reach-in freezer unit (e.g., via the scripting GUI of interface 114).

The logging script for each of the refrigerator unit and freezer unit sends log entries, each comprising the date, time, and transition (e.g., opened or closed), for each transition between the open and closed state of the doors for the respective units detected by the respective door sensors, to platform 110 (via the cellular data connection). Log entries may be sent as they are created (e.g., at the time that the doors are opened or closed). These log entries may be stored at platform 110 and downloaded by the user in one or a plurality of data formats.

The alerting script for each of the refrigerator unit and freezer unit triggers an audible alarm via the installed audibleسound device for a first period of time if the door sensor detects that the door of the respective unit is open for a second period of time, and sends a log entry to platform 110 (via the cellular data connection) comprising the date, time, and/or duration that the door was opened. The first period of time may be defined as thirty seconds, and the second period of time may be defined as two minutes. Of course, the user may set the value of these variables to anything she desires (e.g., via the scripting GUI of interface 114). In addition, both alerting scripts may turn off the audible alarm if the door returns to the closed state prior to expiration of the first period of time. Furthermore, the alert log entries may be stored at platform 110 and downloaded by the user in one or a plurality of data formats.

After creating the logging and alerting scripts for both of the refrigerator and freezer units, the user may interact with the GUI of interface 114 of platform 110 to download the four scripts to each gateway installed in each food truck.

10. Example Processing Device

Figure 10:
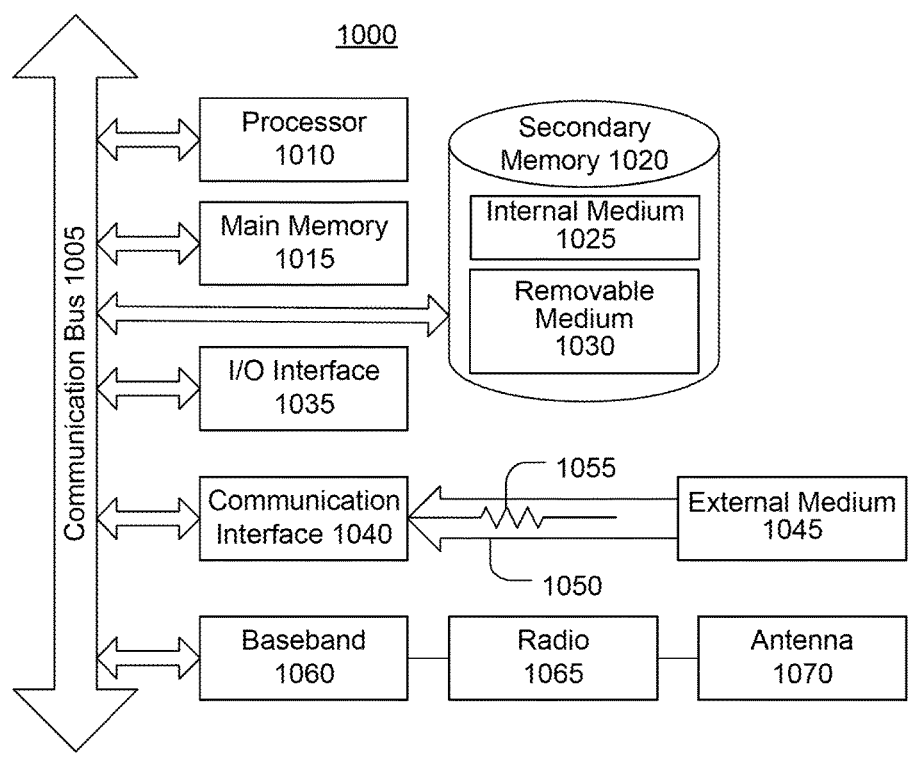
FIG. 10 illustrates a processing system on which one or more of the processes described herein may be executed, according to an embodiment.

FIG. 10 is a block diagram illustrating an example wired or wireless system 1000 that may be used in connection with various embodiments described herein. For example system 1000 may be used as or in conjunction with one or more of the mechanisms, processes, methods, or functions (e.g., to store and/or execute any of the disclosed logic and/or one or more software modules) described above, and may represent components of platform 110, gateway 120 (e.g., the controller 130 of gateway 120), and/or any of the devices described herein. System 1000 can be a server or any conventional personal computer, or any other processor-enabled device that is capable of wired or wireless data communication. Other computer systems and/or architectures may be also used, as will be clear to those skilled in the art.

System 1000 preferably includes one or more processors, such as processor 1010. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 1010. Examples of processors which may be used with system 1000 include, without limitation, the Pentium® processor, Core i7® processor, and Xeon® processor, all of which are available from Intel Corporation of Santa Clara, Calif.

Processor 1010 is preferably connected to a communication bus 1005. Communication bus 1005 may include a data channel for facilitating information transfer between storage and other peripheral components of system 1000. Communication bus 1005 further may provide a set of signals used for communication with processor 1010, including a data bus, address bus, and control bus (not shown). Communication bus 1005 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 1000 preferably includes a main memory 1015 and may also include a secondary memory 1020. Main memory 1015 provides storage of instructions and data for programs executing on processor 1010, such as one or more of the functions and/or modules discussed above. It should be understood that programs stored in the memory and executed by processor 1010 may be written and/or compiled according to any suitable language, including without limitation C/C++, Java, JavaScript, Perl, Visual Basic, .NET, and the like. Main memory 1015 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 1020 may optionally include an internal memory 1025 and/or a removable medium 1030. Removable medium 1030 is read from and/or written to in any well-known manner. Removable storage medium 1030 may be, for example, a magnetic tape drive, a compact disc (CD) drive, a digital versatile disc (DVD) drive, other optical drive, a flash memory drive, etc.

Removable storage medium 1030 is a non-transitory computer-readable medium having stored thereon computer-executable code (i.e., software) and/or data. The computer software or data stored on removable storage medium 1030 is read into system 1000 for execution by processor 1010.

In alternative embodiments, secondary memory 1020 may include other similar means for allowing computer programs or other data or instructions to be loaded into system 1000. Such means may include, for example, an external storage medium 1045 and a communication interface 1040, which allows software and data to be transferred from external storage medium 1045 to system 1000. Examples of external storage medium 1045 may include an external hard disk drive, an external optical drive, an external magneto-optical drive, etc. Other examples of secondary memory 1020 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 1000 may include a communication interface 1040. Communication interface 1040 allows software and data to be transferred between system 1000 and external devices (e.g. printers), networks, or other information sources. For example, computer software or executable code may be transferred to system 1000 from a network server via communication interface 1040. Examples of communication interface 1040 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device. Communication interface 1040 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 1040 are generally in the form of electrical communication signals 1055. These signals 1055 may be provided to communication interface 1040 via a communication channel 1050. In an embodiment, communication channel 1050 may be a wired or wireless network, or any variety of other communication links. Communication channel 1050 carries signals 1055 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs or software) is stored in main memory 1015 and/or the secondary memory 1020. Computer programs can also be received via communication interface 1040 and stored in main memory 1015 and/or secondary memory 1020. Such computer programs, when executed, enable system 1000 to perform the various functions of the disclosed embodiments as described elsewhere herein.

In this description, the term "computer-readable medium" is used to refer to any non-transitory computer-readable storage media used to provide computer-executable code (e.g., software and computer programs) to system 1000. Examples of such media include main memory 1015, secondary memory 1020 (including internal memory 1025, removable medium 1030, and external storage medium 1045), and any peripheral device communicatively coupled with communication interface 1040 (including a network information server or other network device). These non-transitory computer-readable mediums are means for providing executable code, programming instructions, and software to system 1000.

In an embodiment that is implemented using software, the software may be stored on a computer-readable medium and loaded into system 1000 by way of removable medium 1030, I/O interface 1035, or communication interface 1040. In such an embodiment, the software is loaded into system 1000 in the form of electrical communication signals 1055. The software, when executed by processor 1010, preferably causes processor 1010 to perform the features and functions described elsewhere herein.

In an embodiment, I/O interface 1035 provides an interface between one or more components of system 1000 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

System 1000 also includes optional wireless communication components that facilitate wireless communication over a voice network and/or a data network. The wireless communication components comprise an antenna system 1070, a radio system 1065, and a baseband system 1060. In system 1000, radio frequency (RF) signals are transmitted and received over the air by antenna system 1070 under the management of radio system 1065.

In one embodiment, antenna system 1070 may comprise one or more antennae and one or more multiplexors (not shown) that perform a switching function to provide antenna system 1070 with transmit and receive signal paths. In the receive path, received RF signals can be coupled from a multiplexor to a low noise amplifier (not shown) that amplifies the received RF signal and sends the amplified signal to radio system 1065.

In alternative embodiments, radio system 1065 may comprise one or more radios that are configured to communicate over various frequencies. In an embodiment, radio system 1065 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 1065 to baseband system 1060.

If the received signal contains audio information, then baseband system 1060 decodes the signal and converts it to an analog signal. Then the signal is amplified and sent to a speaker. Baseband system 1060 also receives analog audio signals from a microphone. These analog audio signals are converted to digital signals and encoded by baseband system 1060. Baseband system 1060 also codes the digital signals for transmission and generates a baseband transmit audio signal that is routed to the modulator portion of radio system 1065. The modulator mixes the baseband transmit audio signal with an RF carrier signal generating an RF transmit signal that is routed to antenna system 1070 and may pass through a power amplifier (not shown). The power amplifier amplifies the RF transmit signal and routes it to antenna system 1070 where the signal is switched to the antenna port for transmission.

Baseband system 1060 is also communicatively coupled with processor 1010, which may be a central processing unit (CPU). Processor 1010 has access to data storage areas 1015 and 1020. Processor 1010 is preferably configured to execute instructions (i.e., computer programs or software) that can be stored in main memory 1015 or secondary memory 1020. Computer programs can also be received from baseband processor 1060 and stored in main memory 1010 or in secondary memory 1020, or executed upon receipt. Such computer programs, when executed, enable system 1000 to perform the various functions, of the disclosed embodiments. For example, data storage areas 1015 or 1020 may include various software modules.

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit, or step is for ease of description. Specific functions or steps can be moved from one module, block, or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system comprising:
    a script execution module comprising
        a compiler that compiles scripts, represented in a base scripting language, into virtual-machine programs, wherein the scripts comprise instructions that reference device properties,
        a virtual machine that executes virtual-machine programs, and
        a script manager that stores scripts in a script registry, retrieves scripts from the script registry, and loads scripts into the compiler; and
    one or more gateways, wherein each of the one or more gateways is communicatively connected to one or more physical devices, and wherein each of the one or more gateways comprises
        at least one hardware processor,
        one or more drivers, wherein each of the one or more drivers communicates with at least one of the one or more physical devices using a communication protocol to read, write, or read and write device properties of the physical device, and
        a device manager that, when executed by the at least one hardware processor, maps device properties referenced in the virtual-machine programs to device properties used by the one or more drivers, according to a mapping.

2. The system of claim 1, wherein the one or more gateways comprise a plurality of gateways.

3. The system of claim 1, wherein each of the one or more gateways further comprises the script execution module.

4. The system of claim 3, wherein, for each of the one or more gateways, the script execution module and the device manager are executed, by the at least one hardware processor of the gateway, as a single unified process.

5. The system of claim 4, wherein, for each of the one or more gateways, each of the one or more drivers is executed, by the at least one hardware processor of the gateway, in a separate process from the other ones of the one or more drivers and the single unified process.

6. The system of claim 3,
    wherein each of the one or more gateways further comprises a communications layer, and
    wherein, for each of the one or more gateways, the script execution module and the device manager are executed, by the at least one hardware processor of the gateways, as separate processes, and wherein the process of the script execution module and the process of the device manager communicate with each other via the communications layer of the gateway.

7. The system of claim 1, further comprising a platform that is communicatively connected to each of the one or more gateways via at least one network.

8. The system of claim 7,
    wherein the platform comprises at least one hardware processor and the script execution module,
    wherein each of the plurality of gateways further comprises a communications layer,
    wherein the script execution module is executed, by the at least one hardware processor of the platform, as a first process,
    wherein, for each of the plurality of gateways, the device manager is executed, by the at least one hardware processor of the gateway, as a second process, and
    wherein, for each of the plurality of gateways, the first process communicates with the second process on the gateway via the at least one network and the communications layers on the gateway.

9. The system of claim 7, wherein the platform comprises a memory that stores a schema that defines the mapping used by the device manager, and wherein each of the one or more gateways, upon initialization, downloads the schema from the platform over the at least one network.

10. The system of claim 9, wherein the schema defines the mapping using an adapter programming language that is a subset of the base scripting language.

11. The system of claim 7, wherein the platform comprises a web application that, when executed by the at least one hardware processor of the platform, generates a scripting graphical user interface (GUI) for creating scripts.

12. The system of claim 11, wherein the scripting GUI comprises one or more inputs for linking graphical elements, each representing a construct of the base scripting language, into a graphical representation of a script, and wherein the at least one hardware processor of the platform converts the graphical representation of the script into an intermediate text-based format.

13. The system of claim 12, wherein the script execution module further comprises a script converter that converts the intermediate text-based format of the script into a script conforming to the base scripting language.

14. The system of claim 1, wherein each device property for each of the one or more physical devices communicatively connected to each of the one or more gateways is associated with a value for the device property, and a status that indicates whether or not an authority has acknowledged that the value for the device property represents an actual value for the device property.

15. The system of claim 14, wherein the authority is the driver that communicates with a physical device having the device property.

16. The system of claim 14, wherein the base scripting language provides an assign-and-wait-while-pending operator that, when used in an instruction that assigns a value to a device property within a script that is compiled into a virtual-machine program and executed by the virtual machine, causes the virtual machine to assign the value to the device property and wait until the status associated with the device property indicates that the authority has acknowledged that the assigned value represents an actual value for the device property before proceeding to any other compiled instruction in the virtual-machine program.

17. The system of claim 1, wherein the base scripting language provides a trigger construct comprising a trigger condition and a body, and wherein the trigger construct, when used in a script that is compiled into a virtual-machine program and executed by the virtual machine, causes the virtual machine to execute instructions corresponding to the body whenever a transition occurs from a first state in which the trigger condition is not satisfied to a second state in which the trigger condition is satisfied.

18. The system of claim 17, wherein the trigger construct further comprises a hysteresis amount by which the trigger condition must be satisfied before a transition occurs from the first state to the second state.

19. The system of claim 1, wherein the base scripting language provides an every construct defining a time interval and comprising a body, and wherein the every construct, when used in a script that is compiled into a virtual-machine program and executed by the virtual machine, causes the virtual machine to execute instructions corresponding to the body after each of a plurality of consecutive lapses of the defined time interval.

20. The system of claim 1, wherein the base scripting language provides a pause construct defining a time period, and wherein the pause construct, when used in a script that is compiled into a virtual-machine program and executed by the virtual machine, causes the virtual machine to pause for a length of the defined time period before proceeding to any other compiled instruction in the virtual-machine program.

21. The system of claim 1, wherein the base scripting language provides an activation construct identifying a script, and wherein the activation construct, when used in a parent script that is compiled into a parent virtual-machine program and executed by the virtual machine, causes the virtual machine to activate the identified script as a child script to the parent script.

22. The system of claim 21, wherein activating the identified script as a child script comprises executing a child virtual-machine program compiled from the child script.

23. The system of claim 22, wherein the base scripting language provides a keyword that, when used with the activation construct in the parent script that is compiled into the parent virtual-machine program and executed by the virtual machine, causes the virtual machine to execute the child virtual-machine program in parallel with the parent virtual-machine program.

24. The system of claim 23, wherein, when the keyword is not used with the activation construct in the parent script that is compiled into the parent virtual-machine program and executed by the virtual machine, the virtual machine executes the child virtual-machine program before proceeding to any other compiled instruction in the parent virtual-machine program.

25. The system of claim 1, wherein the virtual machine executes a plurality of virtual machine programs in parallel.

26. The system of claim 7,
wherein each of the one or more gateways further comprises the script execution module,
wherein, for each of the one or more gateways, the script manager of the gateway synchronizes its script registry over the at least one network with a mirrored script registry associated with the gateway and stored on the platform.

27. The system of claim 26, wherein, for each of the one or more gateways, even when the gateway is unable to communicate with the platform over the at least one network, the script manager retrieves scripts from the script registry, the compiler compiles the retrieved scripts into virtual-machine programs, and the virtual machine executes the virtual-machine programs.

28. The system of claim 7, wherein each of the one or more gateways further comprises the script execution module, and wherein the platform comprises a web application that, when executed by the at least one hardware processor of the platform, generates a graphical user interface (GUI) for selecting one or more scripts to be sent to and stored in the script registry of at least each of a subset of the one or more gateways.

29. The system of claim 28, wherein the GUI comprises one or more inputs for grouping a plurality of physical devices into a device group that is represented as a virtual device, and wherein the base scripting language treats references to virtual devices identically to references to physical devices.

30. The system of claim 29, where a device group may comprise one or more virtual devices.

31. The system of claim 29, wherein the device manager, when performing the mapping for a device property of a virtual device that is referenced in a virtual-machine program and represents a device group, for each physical device in the device group:
when the physical device does not possess a device property corresponding to the device property of the virtual device, does not map the device property of the virtual device to any device property used by the one or more drivers, and,
when the physical device does possess a device property corresponding to the device property of the virtual device, maps the device property of the virtual device to the corresponding device property.

32. The system of claim 1, wherein the device manager further comprises:
a device manager abstraction layer that maps device properties referenced in the virtual-machine program to logical device properties, according to a first mapping; and a universal driver abstraction layer that maps the logical device properties to physical device properties used by the one or more physical devices, according to a second mapping.

33. The system of claim 32, wherein the first mapping is defined using a first variant of the base scripting language, and wherein the second mapping is defined using a second variant of the base scripting language that is different than the first variant.

34. The system of claim 32, wherein, for at least one of the one or more drivers that communicates with at least one of the one or more physical devices, the universal driver abstraction layer stores values for device properties of the at least one physical device in one or more internal registries, and wherein the universal driver abstraction layer updates the values stored in the one or more internal registries by polling the at least one physical device using one or more callback functions that the at least one driver has registered with the universal driver abstraction layer.

35. The system of claim 34, wherein the at least one driver comprises a plurality of drivers.

36. The system of claim 34, wherein the at least one physical device comprises a plurality of physical devices.

37. The system of claim 1, wherein the device manager comprises a user interface, and wherein the user interface comprises a text-based console which is configured to receive one or more text-based commands from a user and display text-based output in response to the one or more commands.

38. The system of claim 37, wherein the console is further configured to switch between a first context which provides user interaction with the device manager and a second context which provides user interaction with at least one of the one or more drivers.

39. A method comprising using at least one hardware processor on a gateway device that is communicatively connected to one or more physical devices to:
receive a script from a platform over at least one network;
automatically compile the received script into a virtual-machine program; and,
in response to an activation command for the script,
load the virtual-machine program into a virtual machine,
by the virtual machine, execute the virtual-machine program, wherein execution of the virtual-machine program comprises one or more references to device properties,
in response to one or more of the references to device properties during execution of the virtual-machine program, automatically map at least one device property referenced during execution of the virtual-machine program to a device property used by at least one driver stored on the gateway device, and,
by the at least one driver, communicate with at least one of the one or more physical devices using a communication protocol to read, write, or read and write an actual property, of the at least one physical device, corresponding to the device property used by the at least one driver.

40. A non-transitory computer-readable medium having instructions stored thereon, wherein the instructions, when executed by a processor, cause the processor to:
receive a script from a platform over at least one network;
automatically compile the received script into a virtual-machine program; and,
in response to an activation command for the script,
load the virtual-machine program into a virtual machine,
by the virtual machine, execute the virtual-machine program, wherein execution of the virtual-machine program comprises one or more references to device properties,
in response to one or more of the references to device properties during execution of the virtual-machine program, automatically map at least one device property referenced during execution of the virtual-machine program to a device property used by at least one driver stored on the gateway device, and,
by the at least one driver, communicate with at least one of the one or more physical devices using a communication protocol to read, write, or read and write an actual property, of the at least one physical device, corresponding to the device property used by the at least one driver.

* * * * *